United States Patent [19]
Hashimoto et al.

[11] Patent Number: 5,963,667
[45] Date of Patent: Oct. 5, 1999

[54] MULTIPLEXING OPTICAL SYSTEM AND FEATURE VECTOR TRANSFORMATION APPARATUS USING THE SAME; FEATURE VECTOR DETECTING AND TRANSMITTING APPARATUS; AND RECOGNITION AND CLASSIFICATION SYSTEM USING THESE APPARATUSES

[75] Inventors: Takeshi Hashimoto, Hidaka; Ikutoshi Fukushima, Fuchu; Mitsuru Namiki, Hannoh, all of Japan

[73] Assignee: Olympus Optical Co., Ltd., Tokyo, Japan

[21] Appl. No.: 08/815,945

[22] Filed: Mar. 13, 1997

[30] Foreign Application Priority Data

Mar. 26, 1996 [JP] Japan ................................. 8-070016

[51] Int. Cl.⁶ .................................................. G06K 9/00
[52] U.S. Cl. ........................................... 382/190; 382/280
[58] Field of Search ..................... 359/572, 900, 359/11, 10, 27, 28, 15, 107, 30, 562, 850; 250/492.1; 382/153, 154, 190, 248, 250, 254, 255, 260, 274, 275, 276, 277, 278, 279, 280, 282, 284, 285, 286, 293, 298, 308, 309, 312, 321

[56] References Cited

U.S. PATENT DOCUMENTS

| | | | |
|---|---|---|---|
| 4,846,552 | 7/1989 | Veldkamp et al. | 350/162.2 |
| 5,317,651 | 5/1994 | Refregier et al. | 382/31 |
| 5,369,511 | 11/1994 | Amos | 359/15 |
| 5,371,808 | 12/1994 | Wilson et al. | 382/14 |
| 5,416,616 | 5/1995 | Jenkins et al. | 359/11 |
| 5,454,047 | 9/1995 | Chang et al. | 382/280 |
| 5,481,269 | 1/1996 | Imhoff et al. | 342/90 |

FOREIGN PATENT DOCUMENTS

| | | | |
|---|---|---|---|
| 1-227123 | 9/1989 | Japan | G02B 27/46 |
| 3-144814 | 6/1991 | Japan | G06E 1/00 |
| 3-148623 | 6/1991 | Japan | G02B 27/46 |
| 4-355732 | 12/1992 | Japan | G02F 3/00 |

OTHER PUBLICATIONS

Veronin et al: "Optical Image Segmentation using Neural-Based Wavelet Filtering Techniques", Optical Engineering, Feb. 1992, vol. 31, No. 2—pp. 287–293.

Hill: "Some Aspects of a Large Capacity Holographic Memory", Applied Optics, vol. 11, No. 1, Jan. 1972, pp. 182–191.

Kamemaru et al: "Febrication of a Biological Visual Perception System Using a Microlens Array in a Hybrid Pattern Recognition System", JPN. J. Appl. Phys., vol. 31 (1992) pp. 1682–1688—Part 1, No. 5B, May 1992.

Primary Examiner—Jose L. Couso
Assistant Examiner—Bijan Tadayon
Attorney, Agent, or Firm—Pillsbury Madison & Sutro LLP

[57] ABSTRACT

A multiplexing optical system necessary for transforming input information into effective feature vectors at high speed and with high accuracy, without loss of a spatial frequency component of multiplexed object vector information, for example. Also presented are a feature vector transformation apparatus using the multiplexing optical system, and others. The multiplexing optical system performs a Fourier transform in parallel on multiplexed vector information lying in an input plane (R) as an object to be processed. The system includes a Fourier transform lens (30) for performing a Fourier transform in parallel, and satisfies the condition of $(k_R \lambda f_F/a < p)$ in an arbitrary cross-section containing an optical axis, where $k_R$ is the number of components of each multiplex portion (10, 11) of the multiplexed vector information; p is the pitch between zero-order portions of Fourier transformed information concerning adjacent multiplex portions obtained in the Fourier transform plane (F); a is an effective display size of each multiplex portion; $\lambda$ is the wavelength of light used; and $f_F$ is the focal length of the Fourier transform lens (30).

35 Claims, 28 Drawing Sheets

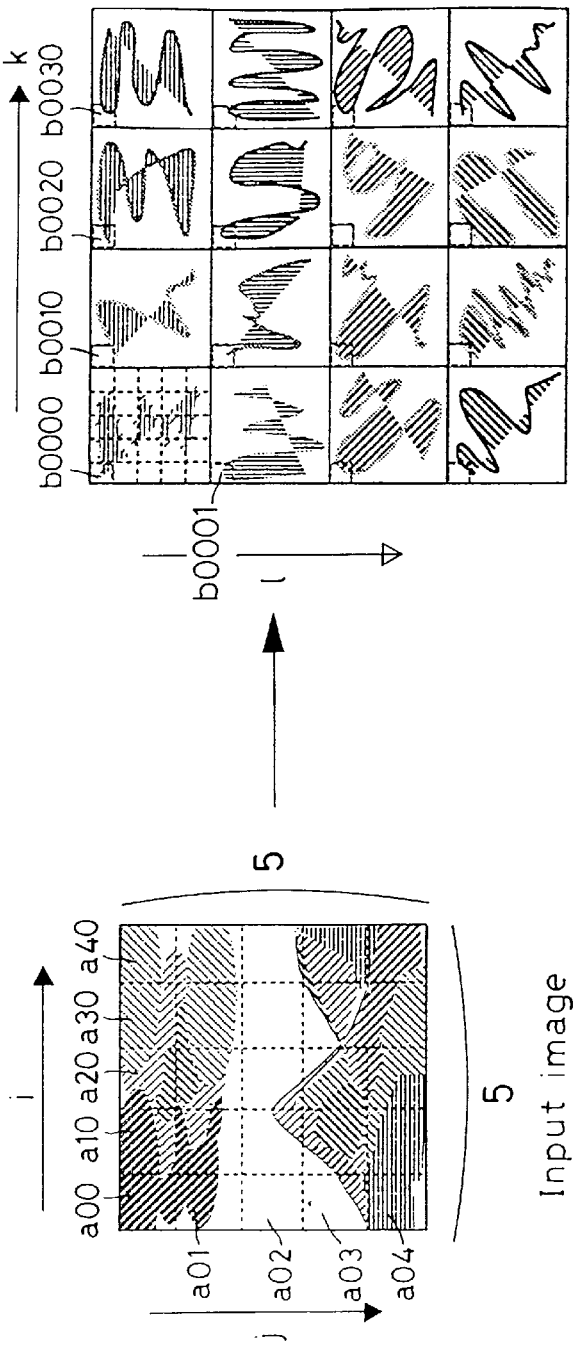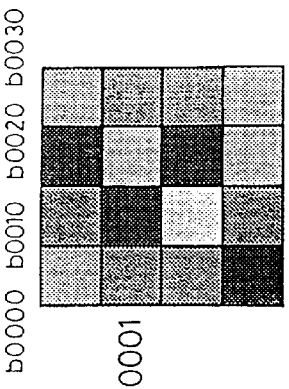
FIG.7(a) Input image
FIG.7(b) Filtered 16 images
FIG.7(c) Feature vector corresponding to a00

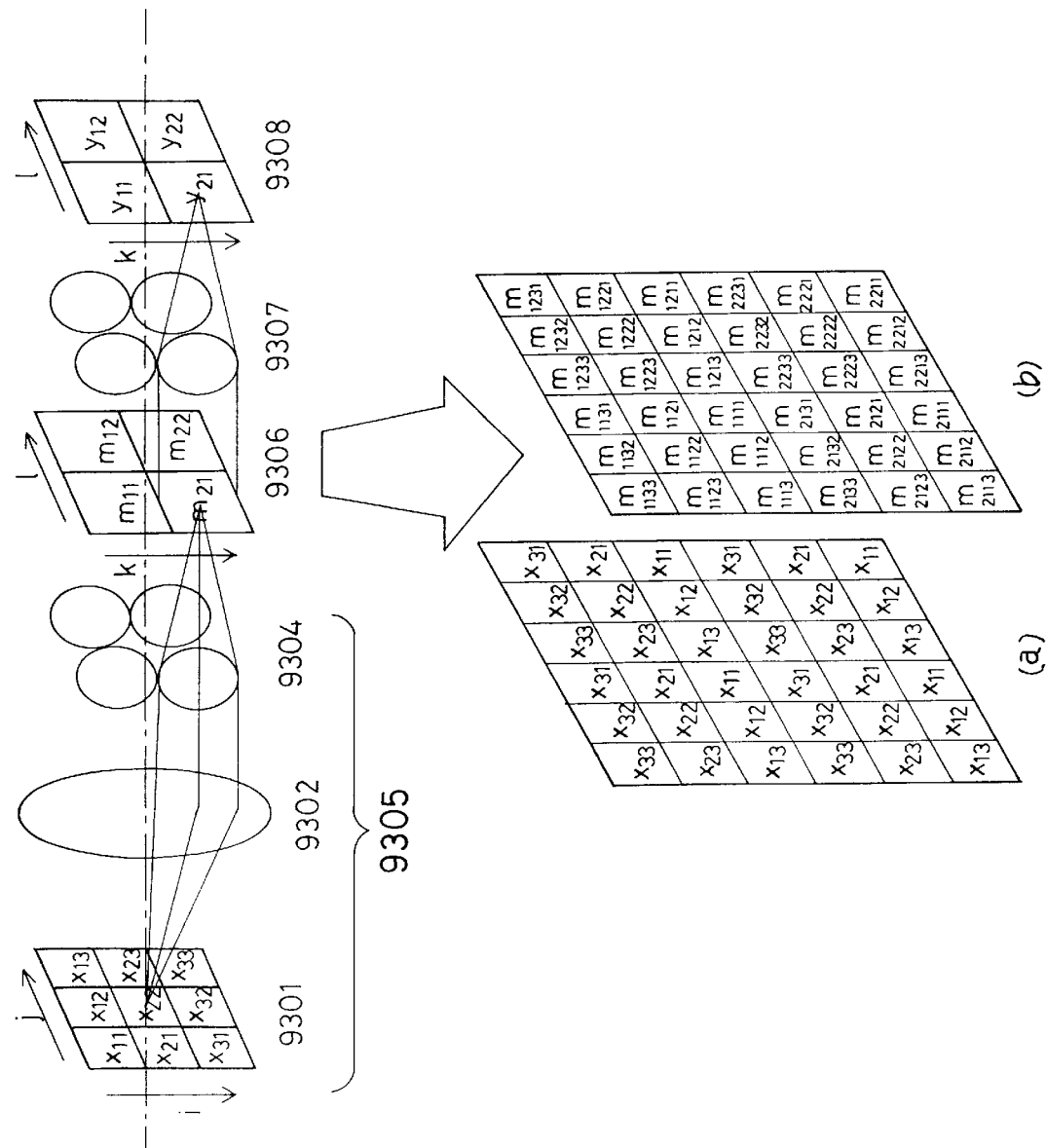

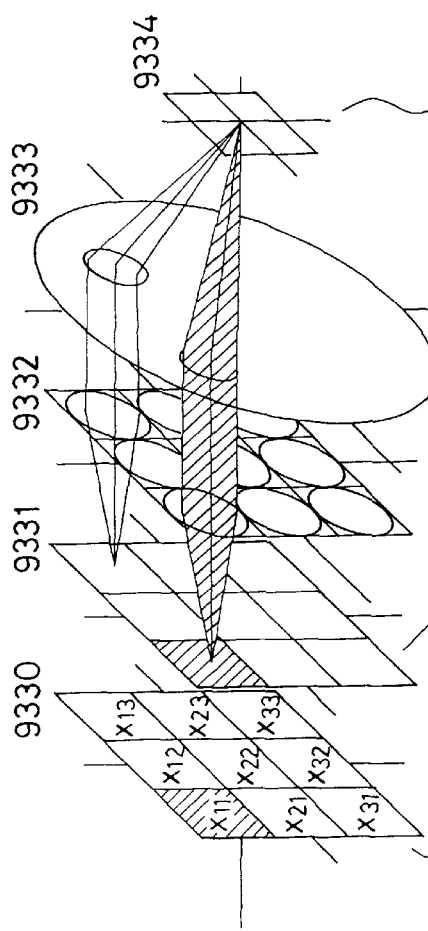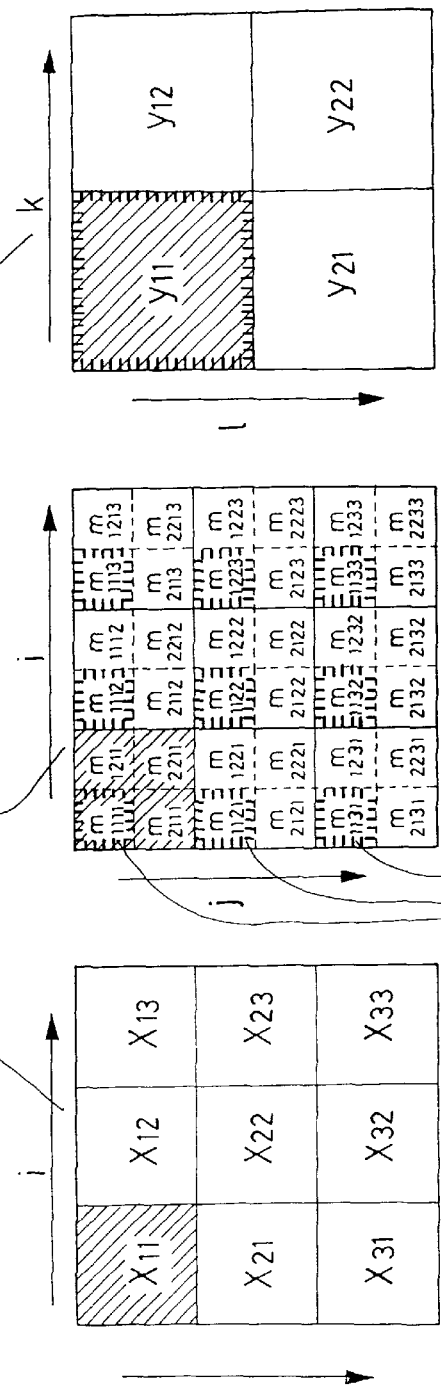

MULTIPLEXING OPTICAL SYSTEM AND FEATURE VECTOR TRANSFORMATION APPARATUS USING THE SAME; FEATURE VECTOR DETECTING AND TRANSMITTING APPARATUS; AND RECOGNITION AND CLASSIFICATION SYSTEM USING THESE APPARATUSES

BACKGROUND OF THE INVENTION

The present invention relates to a multiplexing optical system and a feature vector transformation apparatus using the same, and also relates to a feature vector detecting and transmitting apparatus and a recognition and classification system using these apparatuses. More particularly, the present invention relates to a system for transforming input information into a plurality of feature vectors at high speed and with high accuracy to perform recognition and classification.

Conventionally, recognition and classification of various kinds of information, e.g. images and signals, are performed by computing a degree of similarity between a particular image or signal, which is regarded as a vector quantity, and another vector quantity used as a criterion for comparison.

As a device for the similarity computation, a combination of a matched filter and a correlator or a joint transform correlator has heretofore been used. The conventional method using such a similarity computing device provides an adequate performance to recognize and classify known and simple information isolated from a background. However, to directly handle an image or signal having complicated features, the conventional method needs to simultaneously process not only useful information but also information that does not much contribute to recognition and classification, and such useless information becomes an error factor. The above-mentioned device for similarity computation responds undesirably sensitively to a slight deformation, rotation, scaling, etc., and is therefore likely to cause an error.

To solve these problems, many attempts have recently been made in which various kinds of information, e.g. images and signals, are not directly processed, but each object is transformed into features contributing greatly to recognition and classification by preprocessing, and recognition is made by using the transformed features on a neural network or the like. Taking the case of images, for example, typical features of images include textures, structural features, colors, temporal features, etc. Regarding textures, feature quantities are obtained by computing a gray-level histogram, a co-occurrence matrix, a difference statistical quantity, etc. Regarding structural features, e.g. edges, lines, and contours, feature quantities are obtained by convolution of Laplacian filter or Hough transform. Regarding colors, feature quantities are obtained by transformation into RGB space or HSV space or into a spectrum. Regarding temporal features, feature quantities are obtained by computation of an optical flow or by transformation into wavelets. Transformation into feature quantities by these preprocessing operations takes a great deal of time particularly when a two-dimensional image is handled as an object vector. In such a case, serial computations on an ordinary computer are impracticable. Therefore, optical methods or methods capable of parallel processing using a parallel computer, for example, have heretofore been used. To improve accuracy and capacity in particular, it is conventional practice to use not only one kind of feature quantity but a combination of a plurality of feature quantities to effect recognition and classification.

Examples of conventional optical methods among those described above include "Visual Recognition System by Microlens Array" proposed by Shunichi Kamemaru in Image Information (I), pp. 65–70 (the January 1993 issue). The proposed method uses an apparatus as shown in FIG. 27. More specifically, an object to be recognized is divided into partial elements before being multiplexed, and values of correlation between the partial elements and a plurality of reference elements are simultaneously computed by a multiple correlator consisting essentially of a plurality of conventional matched filters and a plurality of conventional correlators, which are arranged in parallel. The results of the computation are inputted to an input layer of a back propagation type neural network prepared in the computer, thereby effecting recognition. It is reported that it was possible with this method to recognize four characters, i.e. D, K, O, and X, and one space.

A similar method is disclosed in Japanese Patent Application Unexamined Publication (KOKAI) Number (hereinafter referred to as "JP(A)") 4-355732. This method uses an apparatus as shown in FIG. 28 to multiplex an object to be recognized. Values of correlation between the multiplexed object and a plurality of reference objects are simultaneously computed by a multiple correlator consisting essentially of a plurality of conventional joint transform correlators arranged in parallel. The results of the computation are further divided into some regions to improve accuracy and inputted to an input layer of a back propagation type neural network prepared in the computer to effect recognition (FIG. 28 shows only the optical system of the apparatus used in the method). In an embodiment of the conventional method, an example of recognition of object patterns (objects to be recognized) of H and E and reference patterns (reference objects) of I and V are described.

In the above-described two prior arts, transformation into a plurality of feature quantities is performed in parallel and simultaneously. Therefore, the processing time is markedly shortened. Thus, a remarkably high processing speed is attained. Other optical systems capable of transformation into a plurality of feature quantities in parallel and simultaneously are a holographic memory optical system proposed by B. Hill (B. Hill, "Some Aspects of a Large Capacity Holographic Memory", APPLIED OPTICS, Vol. 11, No. 1 (1972), pp. 182–191) and optical systems disclosed in JP(A) 1-227123, 3-148623, and 3-144814. These optical systems are capable of performing a plurality of feature transforms (more specifically, spatial frequency filtering operations or the like) in parallel and simultaneously.

The above-described method proposed by Kamemaru and the method disclosed in JP(A) 4-355732 provide optical systems capable of performing a plurality of correlation processing operations in parallel and simultaneously at high speed. The methods disclosed in JP(A) 1-227123, 3-148623, and 3-144814 provide optical systems capable of performing a plurality of spatial frequency filtering operations in parallel and simultaneously at high speed. These methods are capable of satisfactorily transforming simple images such as characters isolated from a background. However, to transform an ordinary complicated image of large capacity into feature quantities, filtering must be performed not only at high speed but also with high accuracy in practice. The optical systems used in these methods are inadequate for such transformation.

Moreover, the method proposed by Kamemaru and the method disclosed in JP(A) 4-355732 are capable of high-speed recognition to a certain extent because a plurality of feature quantities are taken out simultaneously and in parallel and these feature quantities are inputted to a neural network to perform recognition. However, these methods do not take into consideration the following matters.

Let us consider a case where, when an ordinary complicated image of large capacity (e.g. an image having a large number of pixels (vectors) to be handled) is inputted as a vector, recognition and classification are made not for the whole input image but for each small region consisting of one or a plurality of components of the vector. That is, let us suppose recognition, classification, etc. of affected parts in medical images or defective parts in FA (Factory Automation) images, for example. Affected parts and defective parts, which are objects to be recognized, in these images may appear in an infinite variety of forms as a whole; they may be deformed or vary in shape or size. For such affected parts or defective parts, it is demanded to make a judgment with respect to each of smaller regions defined as units such that "this region belongs to such and such a category (e.g. affected part), and the overall size of regions belonging to such a category is so and so" (so to speak, metrical recognition and classification are also demanded). In this case, it is necessary to effect highly accurate transformation into feature quantities and extraction at unit levels for the recognition and classification, that is, at the levels of small regions each consisting of one or a plurality of components of the input vector.

In this regard, the method proposed by Kamemaru and the method disclosed in JP(A) 4-355732, mentioned above as prior arts, perform feature transformation in the feature transform part on the basis of the correlation between the object to be recognized and an actual character (or partial elements thereof) in the feature transform section. In these methods, therefore, overall features are only roughly captured (at the character level). Moreover, the above-described intrinsic disadvantage of correlators that they respond undesirably sensitively to a slight deformation, rotation, scaling, etc. and are therefore likely to cause an error still remains, and it is therefore difficult to attain the above-described task. If these prior arts are improved to attain the above-described task by feature extraction using correlators, it is necessary to prepare a large number of extremely small reference vectors at the level of small regions each consisting of one or a plurality of components of the input vector. This cannot be said to be practical.

SUMMARY OF THE INVENTION

In view of the above-described circumstances of the prior art, an object of the present invention is to provide a multiplexing optical system necessary for transforming input information into effective feature vectors at high speed and with high accuracy, a feature vector transformation apparatus using the multiplexing optical system, and a feature vector detecting and transmitting apparatus for effectively transmitting feature vectors obtained by the feature vector transformation apparatus to a recognition and classification device in a subsequent stage, and also provide a recognition and classification system for recognizing and classifying complicated and large-capacity input information at high speed and with high accuracy for each arbitrary small region consisting of an arbitrary component or a plurality of components.

Regarding devices for solving the above-described problem, the arrangement of each device and the reason for adopting it, together with the operation thereof, will be described below.

As has been stated above, it is necessary, in order to extract feature vectors from input information at high speed, to perform feature transformation in parallel and simultaneously. For this purpose, an optical system as shown in FIG. 2 and optical systems disclosed in JP(A) 1-227123, 3-148623, and 3-144814 are effectively used. An optical system of this type will be described below with reference to FIG. 1, which is a conceptual view showing the arrangement of the present invention. The optical system includes a multiplexing optical system 21 having an object vector multiplexing device 2 for multiplexing vector information entered into the system as an object to be processed. The multiplexing optical system 21 further has a multiple Fourier transform device 3 for performing a Fourier transform on the multiplexed input vector information in parallel and simultaneously, and a multiple inverse Fourier transform device 4 for performing an inverse Fourier transform on the Fourier transformed information. In addition, an object vector input and display device 1 for inputting vector information as an object to be processed is disposed as a stage preceding the multiplexing optical system 21, and a feature transform device 5 including various kinds of filter for feature transformation is disposed in the Fourier transform plane F of the multiple Fourier transform device 3. Thus, it is possible to construct a feature vector transformation apparatus that performs parallel and simultaneous feature transformation in a feature transform plane T, which is an inverse Fourier transform plane where the inverse Fourier transform is obtained. It should be noted that in the optical system shown in FIG. 2, the object vector multiplexing device 2 is arranged as a basic example such that vector information displayed on a light modulator is multiplexed in parallel in an input plane R through an optical system consisting essentially of an image-forming lens and a lens array.

However, feature transformation of high accuracy cannot be performed with the above-described arrangement, as has been stated above. Therefore, it is necessary to devise schemes for various portions of the multiplexing optical system 21.

Accordingly, the present invention provides:

(1) a multiplexing optical system for performing a Fourier transform in parallel on multiplexed vector information as an object to be processed. The multiplexing optical system includes at least a Fourier transform lens for performing a Fourier transform in parallel, wherein it is necessary to satisfy the following condition in an arbitrary cross-section containing the optical axis of the Fourier transform lens:

$$k_R \lambda f_F / a < p \tag{1}$$

where $k_R$ is the number of components of each multiplex portion (e.g. a portion indicated by reference character 10 in FIG. 2) of multiplexed object vector information; p is the pitch between the zero-order portions of Fourier transformed information concerning adjacent multiplex portions obtained in the Fourier transform plane; a is the effective display size of each multiplex portion; $\lambda$ is the wavelength of light used; and $f_F$ is the focal length of the Fourier transform lens.

To perform feature transformation in parallel and simultaneously with high accuracy, it is necessary for the above-described multiplexing optical system to be capable of at least Fourier transforming the multiplexed input vector in parallel without loss of a spatial frequency component. This is made possible by using a multiplexing optical system that satisfies the condition (1).

The multiplexing optical system will be described more specifically with reference to FIG. 2, which shows a cross-section containing the optical axis of the Fourier transform lens in the multiplexing optical system. Let us assume that p is the pitch between the zero-order portions of Fourier transformed information concerning adjacent multiplex portions (e.g. portions 10 and 11 in the figure) obtained in the Fourier transform plane F in the cross-section (here, the pitch is the minimum value of the distance between the centers of the zero-order portions of Fourier transformed information concerning adjacent multiplex portions; in FIG. 2, square multiplex portions are arranged in close proximity to each other, by way of example); $k_R$ is the number of components of each multiplex portion (i.e. the number of pixels in the case of an image); and a is the effective display size of each multiplex portion. On this assumption, the maximum spatial frequency component $v_{max}$ (line pairs per millimeter) that one multiplex portion has is given by $$v_{max}=k_R/2a \quad (1\text{-}1)$$

The amount of shift $S_{max}$ of the maximum spatial frequency component $v_{max}$ from the zero-order component (zero-order portion) in the Fourier transform plane F is given by $$S_{max}=\lambda f_F v_{max} \quad (1\text{-}2)$$

where $\lambda$ is the wavelength of light used, and $f_F$ is the focal length of the Fourier transform lens 30 (each lens element constituting a lens array 30 in the case of FIG. 2).

In order to enable a Fourier transform to be performed without loss of a spatial frequency component, it is necessary that pieces of Fourier transformed information concerning adjacent multiplex portions (e.g. portions 10 and 11 in the figure) should not overlap each other. To meet the requirement, $S_{max}$ must satisfy the following condition:

$$S_{max} \leq p/2 \quad (1\text{-}3)$$

Thus, expression (1) is obtained from expressions (1-1) to (1-3).

It will be understood that, if the multiplexing optical system 21 is arranged so as to satisfy the condition (1), a Fourier transform of high accuracy can be performed in parallel and simultaneously without loss of a spatial frequency component of the multiplexed object vector information. It should be noted that the number $k_R$ of components of each multiplex portion of the multiplexed object vector information may be of the order of the number k of components of the input vector even if information is to be obtained most finely. That is, $k_R \leq k$.

It should be noted that the condition (1) is applicable not only to the multiplexing optical system arranged as shown in FIG. 2 but also to any multiplexing optical system for performing a Fourier transform in parallel on multiplexed object vector information, for example, a multiplexing optical system disclosed in JP(A) 4-355732, which is a prior art shown in FIG. 28, and multiplexing optical systems disclosed in JP(A) 1-227123, 3-148623, and 3-144814, which are other prior arts. Any multiplexing optical system arranged to satisfy the condition (1) is capable of Fourier transforming multiplexed object vector information simultaneously and in parallel with high accuracy without loss of a spatial frequency component.

FIG. 3 shows an example in which the condition (1) is applied to JP(A) 1-227123. In this case, multiplex portions similarly have the effective display size a and the number of components $k_R$ (i.e. the number of pixels in the case of an image) in an input plane R shown in the figure, and are multiplexed in terms of difference in the exit angle. The same discussion holds for other portions if a definition is given in the same way as the above [in this case, $k_R$ automatically becomes equal to k ($k_R$=k) because the input vector is read by displaying it directly in the input plane R of the multiplexing optical system]. It should be noted that the condition (1) is extremely important as a guideline for designing a multiplexing optical system, and that the use of the condition (1) produces the secondary advantageous effect that a design guideline can be obtained easily and speedily, and thus the time required for design is shortened.

In the multiplexing optical system shown in FIG. 2 by way of example, the lens pitch of the lens array constituting the Fourier transform lens 30 is coincident with the pitch p between the zero-order portions of Fourier transformed information concerning adjacent multiplex portions obtained in the Fourier transform plane F. Therefore, suppose that the lens pitch of the lens array constituting the Fourier transform lens 30 is $p_F$, it is desirable to set the pitch $p_F$ so as to satisfy the same condition. That is, it is desirable to set $p_F$ equal to p ($p_F$=p).

Further, suppose that in the optical system shown in FIG. 2 the maximum spatial frequency of input vector information that is needed for filtering by the filter array serving as the feature transform device 5 installed in the Fourier transform plane F is $\alpha_{max}$, it is necessary that information of the spatial frequency $\alpha_{max}$ should fall within the effective aperture of each lens component of the lens array constituting the Fourier transform lens 30. This will be described with reference to the enlarged view of FIG. 4. At the pupil plane (aperture plane) of each lens element of the lens array serving as the Fourier transform lens 30, the center of diffracted light reading input information corresponding to the maximum spatial frequency $\alpha_{max}$ needed for filtering lies at a position shifted from the optical axis of the lens element by $\alpha_{max}\lambda f_F$. Therefore, in order to enable all the required light, including the diffracted light, to fall within the effective aperture of each lens element of the lens array, it is more desirable for the multiplexing optical system to satisfy not only the condition (1) but also the following condition:

$$p \geq r_F \geq a+2\alpha_{max}\lambda f_F \quad (1\text{-}4)$$

where $r_F$ is the effective aperture of each lens element of the lens array.

In addition, the present invention provides:

(2) a multiplexing optical system for performing a Fourier transform in parallel on multiplexed vector information as an object to be processed and further performing an inverse Fourier transform in parallel on the Fourier transformed vector information. The multiplexing optical system includes at least a lens array for performing an inverse Fourier transform in parallel, wherein it is necessary to satisfy the following condition in an arbitrary cross-section containing the optical axis of the lens array:

$$k_d p_d \leq p_t \quad (2)$$

where $p_t$ is the pitch of the lens array for inverse Fourier transform; $p_d$ is the sampling pitch of transformed information in a feature transform plane T where information transformed by the optical system is obtained; and $k_d$ is the number of components of transformed information in the feature transform plane which corresponds to one multiplex portion.

To perform feature transformation in parallel and simultaneously with high accuracy, it is necessary at least that multiplexed input vector information should be Fourier transformed in parallel and further subjected to inverse Fourier transform so as to be transformed into vector information having the desired number of components. This is made possible by using a multiplexing optical system that satisfies the condition (2).

More specifically, suppose that, in the multiplexing optical system shown in FIG. 2, $p_d$ is the sampling pitch of transformed information corresponding to one multiplex portion obtained in the feature transform plane T after the inverse Fourier transforming operation, and $k_d$ is the number of components of the transformed information, the size of transformed information corresponding to one multiplex portion is $k_d \times p_d$. If $k_d \times p_d$ is larger than the lens pitch $p_t$ of a lens array 40 that performs an inverse Fourier transform in parallel, a part of transformed information is lost. Accordingly, it is necessary to satisfy the condition (2). It should be noted that the transformed information sampling pitch $p_d$ is, generally, limited by the pitch of detectors placed in the feature transform plane T; in the present invention, the sampling pitch $p_d$ is limited by the sampling pitch of transformed information in a vector detecting and transmitting device (described later). The number of components $k_d$ may be determined for each particular purpose. However, it may be set equal to the order k of the input vector even if information is to be obtained most finely. That is, $k_d \leq k$.

Accordingly if the above-described multiplexing optical system is arranged to satisfy the condition (2), the multiplexed object vector information can be transformed simultaneously and in parallel with high accuracy without loss of transformed information.

To recognize and classify complicated and large-capacity input information at high speed and with high accuracy for each arbitrary small region consisting of an arbitrary component or a plurality of components, which is an object of the present invention, the number of vector components that can be handled in the feature transform plane T or the input plane R must be large. When ordinary large-capacity vectors are handled, particularly, when images are handled as vectors, the number of vector components must be at least 50×50 to achieve a satisfactory result. That is, it is desirable to satisfy the condition of $k_d \geq 50$. On the other hand, the detectable sampling pitch of detectors for detecting information transformed into feature vectors in the feature transform plane T is limited to the order of 5 micrometers in the present state of the art. That is, it is desirable to satisfy the condition of $p_d \geq 5$ micrometers. Considering the above-described matters, it is even more desirable for the condition (2) to further satisfy the following condition in the present state of the art:

$$0.25 \text{ millimeter} \leq k_d p_d \leq p_t$$

It should be noted that the above-described conditions are applicable not only to the multiplexing optical system arranged as shown in FIG. 2 but also to any multiplexing optical system for performing a Fourier transform in parallel on multiplexed object vector information and further performing an inverse Fourier transform in parallel on the transformed vector information, for example, a multiplexing optical system disclosed in JP(A) 4-355732, which is a prior art shown in FIG. 28, and multiplexing optical systems disclosed in JP(A) 1-227123, 3-148623, and 3-144814, which are other prior arts. Any multiplexing optical system arranged to satisfy the above-described conditions is capable of transforming transformed information concerning multiplexed object vector information simultaneously and in parallel with high accuracy without loss of transformed information. It should be noted that these conditions are extremely important as a guideline for designing a multiplexing optical system, and that the use of the conditions produces the secondary advantageous effect that a design guideline can be obtained easily and speedily, and thus the time required for design is shortened.

In addition, the present invention provides:

(3) a multiplexing optical system for multiplexing vector information as an object to be processed, and performing a Fourier transform in parallel on the multiplexed vector information, and further performing an inverse Fourier transform in parallel on the Fourier transformed vector information. The multiplexing optical system includes at least an object vector multiplexing device for multiplexing object vector information as an object to be processed by placing the object vector information on parallel beams of light traveling in various directions; a multiple Fourier transform device consisting essentially of a large-aperture lens for performing a Fourier transform on the multiplexed object vector information in parallel and simultaneously; and a multiple inverse Fourier transform device consisting essentially of a lens array for performing an inverse Fourier transform in parallel and simultaneously on the object vector information Fourier transformed by the multiple Fourier transform device. It is necessary for the multiplexing optical system to satisfy the following condition:

$$(r_F - 2\alpha_{max}\lambda f_F)/f_F - w_T/f_T \geq 2h/f_F \quad (3)$$

where $f_F$ is the focal length of the large-aperture lens; $r_F$ is the overall effective aperture of the large-aperture lens; $f_T$ is the focal length of each lens element constituting the lens array for inverse Fourier transform; $w_T$ is the width of a light beam emanating from the lens array for inverse Fourier transform in correspondence to each multiplex region and reaching a feature transform plane; h is the distance from an optical axis extending through the center of the large-aperture lens to the center of that lens element in the lens array for inverse Fourier transform which is the farthest from the optical axis; $\alpha_{max}$ is the maximum spatial frequency that is needed by a filter serving as a feature transform device installed in the Fourier transform plane; and A is the wavelength of light used.

In the multiplexing optical system according to the present invention, it is necessary in order to perform feature transformation in parallel and simultaneously without loss of information that all of a plurality of light beams of different angles that have read input vector information displayed on the object vector input and display device 1 should enter the large-aperture lens for performing a Fourier transform on all the multiplexed object vector information in parallel and simultaneously. This is made possible by using a multiplexing optical system that satisfies the condition (3).

The multiplexing optical system will be described more specifically with reference to FIG. 5, which schematically shows a part of the multiplexing optical system shown in FIG. 3. For explanatory simplicity, as shown in FIG. 5, a display area 51 of the object vector input and display device 1 is assumed to be a circular aperture. Similarly, it is assumed that the large-aperture lens 30 serving as a Fourier transform lens for performing a Fourier transform on the multiplexed object vector information in parallel and simultaneously has a circular aperture, and the inverse Fourier transform lens array 40 for performing an inverse Fourier transform in parallel and simultaneously on the information Fourier transformed by the multiple Fourier transform device also has circular apertures. It is further assumed that the multiplex level of input vector information multiplexed by the object vector multiplexing device is 16 (4×4), and accordingly, 16 (4×4) lens elements are disposed to constitute the lens array 40 for inverse Fourier transform. The following description will be given by using FIG. 6, which is a sectional view of the multiplexing optical system taken along a plane containing both an optical axis 54 extending through the center of the large-aperture lens 30, shown in FIG. 5, and the center of that lens element 55 in the inverse Fourier transform lens array 40 which is the farthest from the optical axis 54.

A plurality of approximately parallel light beams reading the display area 51 of the object vector input and display device 1 enter the large-aperture lens 30 for performing a Fourier transform on multiplexed object vector information in parallel and simultaneously, and thereafter, form respective Fourier transformed images of multiplex portions in the Fourier transform plane F. The Fourier transformed information is subjected to Fourier transform (inverse Fourier transform) again by the lens array 40, which is formed from inverse Fourier transform lens elements disposed such that the front focal plane of each lens element is coincident with the Fourier transform plane F. In order to transform the multiplexed object vector information without loss of information, all the light beams emanating from the display area 51 at the input plane R must enter the large-aperture lens 30. Let us consider the zero-order light component of the read information. If a light beam (hatched in the figure) passing through the lens element 55, which is the farthest from the optical axis 54 in the lens array 40, falls within the aperture of the large-aperture lens 30, the information is transmitted without loss. Accordingly, the condition for allowing all the light beams to enter the large-aperture lens 30 is given by $$a/2 + h \leq r_F/2 \tag{3-1}$$

where a is the size of the display area 51 of the object vector input and display device 1; $r_F$ is the effective aperture of the large-aperture lens 30; and h is the distance from the optical axis 54 to the center of the lens element 55.

Next, the relationship among the focal length $f_F$ and effective aperture $r_F$ of the large-aperture lens 30, the focal length $f_T$ of the inverse Fourier transform lens element 55, the width of a light beam finally obtained, and the distance h from the optical axis 54 to the center of the lens element 55 will be shown by changing the condition (3-1). If the condition (3-1) is divided by the focal length $f_F$ of the large-aperture lens 30, the following relation is obtained:

$$a/f_F + 2h/f_F \leq r_F/f_F \tag{3-2}$$

Suppose that the width of a light beam emanating from the lens array 40 and reaching the feature transform plane T is defined by $w_T$, the relation of $a/f_F = w_T/f_T$ holds between the width $w_T$ of the light beam and the focal length $f_T$ of the inverse Fourier transform lens element 55 of the lens array 40. Therefore, expression (3-2) may be changed as follows:

$$r_F/f_F - w_T/f_T \geq 2h/f_F \tag{3-3}$$

Suppose that the maximum spatial frequency of input vector information that is needed for filtering by a filter as a feature transform device 5 installed in the Fourier transform plane F is $\alpha_{max}$, information of spatial frequency $\alpha_{max}$ appears at a position shifted from zero-order light by $\alpha_{max}\lambda f_F$ in the Fourier transform plane F. Therefore, in order to transform and transmit such information in addition to zero-order light without loss, a light beam in which the center of a higher-order light component of spatial frequency $\alpha_{max}$ at the Fourier transform plane F is further shifted by $\alpha_{max}\lambda f_F$ in addition to the distance h between the optical axis 54 and the center of the lens element 55 is also necessary to pass through the large-aperture lens 30. To meet the requirement, it is necessary for the condition (3-3) to become as follows:

$$(r_F - 2\alpha_{max}\lambda f_F)/f_F - w_T/f_T \geq 2h/f_F \tag{3}$$

It should be noted that if at least the condition (3-3) is satisfied, although information of high-frequency component may be lost and some errors may be present, the multiplexing optical system may be sufficiently usable for recognition, classification, etc. in which the weight of low-frequency components is high. In general, however, it is desirable to satisfy the condition (3).

In the inverse Fourier transform lens array 40 also, the light beam of spatial frequency component $\alpha_{max}$ must fall within the effective aperture $r_T$ of the lens array 40. That is, a light beam of higher-order light component shifted from the light beam of zero-order light by $\alpha_{max}\lambda f_F$ is also necessary to pass through each lens component of the lens array 40. The condition for this is given by $$\alpha_{max}\lambda f_F + w_T/2 \leq r_T/2 \tag{3-4}$$

If not only the condition (3) but also the condition (3-4) is satisfied, it becomes possible to effect favorable filtering over the entire spatial frequency range required. It should be noted that these conditions are extremely important as a guideline for designing a multiplexing optical system, and that the use of these conditions produces the secondary advantageous effect that a design guideline can be obtained easily and speedily, and thus the time required for design is shortened.

It should be noted that to recognize and classify complicated and large-capacity input information at high speed and with high accuracy for each arbitrary small region consisting of an arbitrary component or a plurality of components, it is desirable to satisfy the condition of $k_d p_d \geq 0.25$ millimeter in the present state of the art, as has been stated above. Because $k_d p_d$ is coincident with $w_T$, it is preferable in this arrangement also to satisfy the condition of $w_T \geq 0.25$ millimeter.

Although in the foregoing description the display area, the aperture of the large-aperture lens, and the aperture of the lens array are all assumed to be circular apertures for explanatory simplicity, it should be noted that the above discussion is applicable not only to circular apertures but also to any other apertures.

In addition, the present invention provides:

(4) a feature vector transformation apparatus including an object vector input and display device for entering vector information into the system as an object to be processed; an object vector multiplexing device for multiplexing the entered vector information; a multiple Fourier transform device for performing a Fourier transform in parallel on the multiplexed vector information to an extent corresponding to the multiplex level of the multiplexed vector information; and a multiple inverse Fourier transform device having a lens array consisting essentially of the number of lens elements which corresponds to the multiplex level for performing an inverse Fourier transform in parallel on Fourier transformed images obtained by the multiple Fourier transform device to an extent corresponding to the multiplex level. Further, a feature transform device for performing feature transformation in parallel on the Fourier transformed images obtained by the multiple Fourier transform device is disposed in the Fourier transform plane, thereby outputting images containing finally transformed features to a feature transform plane. It will be apparent from the foregoing description that if the feature vector transformation apparatus includes any one of the multiplexing optical systems stated in the above (1) to (3) as a constituent element, high-speed and high-accuracy feature transformation can be performed.

If the feature transform device of the feature vector transformation apparatus is a spatial frequency filter array consisting essentially of the number of filters which corresponds to the multiplex level, and it is arranged to simultaneously transform the object vector information into a plurality of features, the spatial structure of an ordinary complicated and large-capacity image can be effectively transformed into feature quantities.

In particular, if the above-described filter array is formed by using Gabor filter, wavelet filter, band-pass filter having specified directivity, etc. so as to transform object vector information into feature quantities for capturing an orientation spatial frequency structure, even an ordinary image having a complicated spatial structure can be favorably transformed at high speed into object vector feature quantities useful for processing in a subsequent stage, e.g. recognition and classification, by a minimal number of simple filters.

If a color filter array for transforming object vector information into features in the color space is added to the spatial frequency filter array, even an image in which color-by-color spatial structures are complicatedly combined can be favorably transformed at high speed into object vector feature quantities useful for processing in a subsequent stage, e.g. recognition and classification, by a minimal number of simple filters.

Moreover, to construct a recognition and classification system that serves the purpose of the present invention, it is necessary to use the following feature vector detecting and transmitting apparatus, which has a feature vector detecting and transmitting function for effectively transmitting feature vectors obtained by the above-described feature vector transformation apparatus to a recognition and classification device in the subsequent stage:

(5) A feature vector detecting and transmitting apparatus having a feature vector selecting device for taking out, with respect to each individual feature vector obtained by the above-described feature vector transformation apparatus, a feature vector of a region arbitrarily selected from each multiplex portion; a feature vector detecting device for acquiring the feature vector obtained by the feature vector transformation apparatus or the feature vector obtained by the feature vector selecting device; and a feature vector transmitting device for transmitting data obtained by the feature vector detecting device to a subsequent stage; wherein information obtained by the feature vector transformation apparatus is transformed into information useful for recognition and classification and transmitted to the subsequent stage for processing.

The use of the above-described feature vector detecting and transmitting apparatus makes it possible to select and detect a feature quantity with respect to an arbitrary region of object vector information from each multiplex portion and to transmit the detected feature quantity as an appropriate vector to the recognition and classification device in the subsequent stage. Thus, it becomes possible to perform recognition and classification for each small region consisting of one or a plurality of components of object vector information, which is an object of the present invention as has been stated above.

By way of example, let us assume that an input image as an object input vector as shown in the part (a) of FIG. 7 is to be recognized and classified at a total of 5×5=25 regions for the sake of simplicity, and that the input image is subjected to filtering by 16 different kinds of filter as shown in FIG. 11 (described later), thereby obtaining 16 images as shown in the part (b) of FIG. 7 for the respective filters. Suppose that the divided regions of the input image shown in the part (a) of FIG. 7 are denoted by aij (i=0 to 4, and j=0 to 4; the values are all integers), and images obtained by feature transformation through the 16 different kinds of filter are denoted by bijkl (i=0 to 4, j=0 to 4, k=0 to 3, and l=0 to 3; the values are all integers; k and l correspond to filter Nos.), results of filtering of the region a00 in the part (a) of FIG. 7, for example, by the respective filters are 16 regions b00kl (k=0 to 3, and l=0 to 3; the values are all integers) as shown in the part (b) of FIG. 7. The 16 regions are selected, and the sum of the values of pixels contained each region is detected as data. 16 data items thus obtained are combined as shown for example in the part (c) of FIG. 7 to obtain a feature vector of the region concerned. The feature vector is transmitted to the recognition and classification device in the subsequent stage where it is processed, thereby making it possible to perform recognition and classification with respect to the region a00 [although in the part (c) of FIG. 7 the feature vector is expressed in the form of a two-dimensional array, the present invention is not necessarily limited thereto]. By executing similar processing for the other regions a10, a20, . . . , a44, recognition can be effected for each region. Although in this example the input image is divided into 5×5 regions, it will be apparent that the number of divided regions may be set as desired; the number of divided regions may be increased, that is, recognition may be performed for each smaller region (the smallest is a region corresponding to one pixel). This proves that recognition and classification can be effectively performed even for each small region consisting of one or a plurality of components of an object vector.

It should be noted that the feature vector detecting and transmitting apparatus according to the present invention is also characterized by having a feature vector selecting device for taking out, with respect to each individual feature vector obtained by the feature vector transformation apparatus, a feature vector of a region (e.g. the above-described region b00kl) arbitrarily selected from each multiplex portion, as stated above, regardless of whether or not the conditions (1) to (3) for the above-described multiplexing optical systems (1) to (3) are satisfied.

In addition, the present invention provides:

(6) a recognition and classification system including a feature vector transformation apparatus, a feature vector detecting and transmitting apparatus, and a recognition and classification device, wherein the above-described apparatus (4) is used as the feature vector transformation apparatus, and the above-described apparatus (5) is used as the feature vector detecting and transmitting apparatus. Thus, it is possible to perform high-speed and high-accuracy feature extraction from a vector as an object to be processed, and the extracted features can be selected and transmitted to the recognition and classification device for each arbitrary small region. Accordingly, even if an object to be processed is deformed or varies in shape or size as a whole, it is possible to effect metrical recognition and classification at high speed and with high accuracy such that, with respect to each of relatively small regions defined as units, "this region belongs to such and such a category, and the overall size of regions belonging to a particular category is so and so". Examples of fields to which the present invention is applicable include the recognition and classification of affected parts and internal organs in medical images and the recognition and classification of defective parts in FA (Factory Automation) images, as stated above.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 7 is a view for describing processing executed in a feature vector detecting and transmitting apparatus according to the present invention.

FIG. 20 is a view for describing an inner product operation used in the fourth embodiment.

FIG. 25 is a view for describing the process of performing an inner product operation in the seventh embodiment.

DESCRIPTION OF THE PREFERRED EMBODIMENTS

Figure 1:
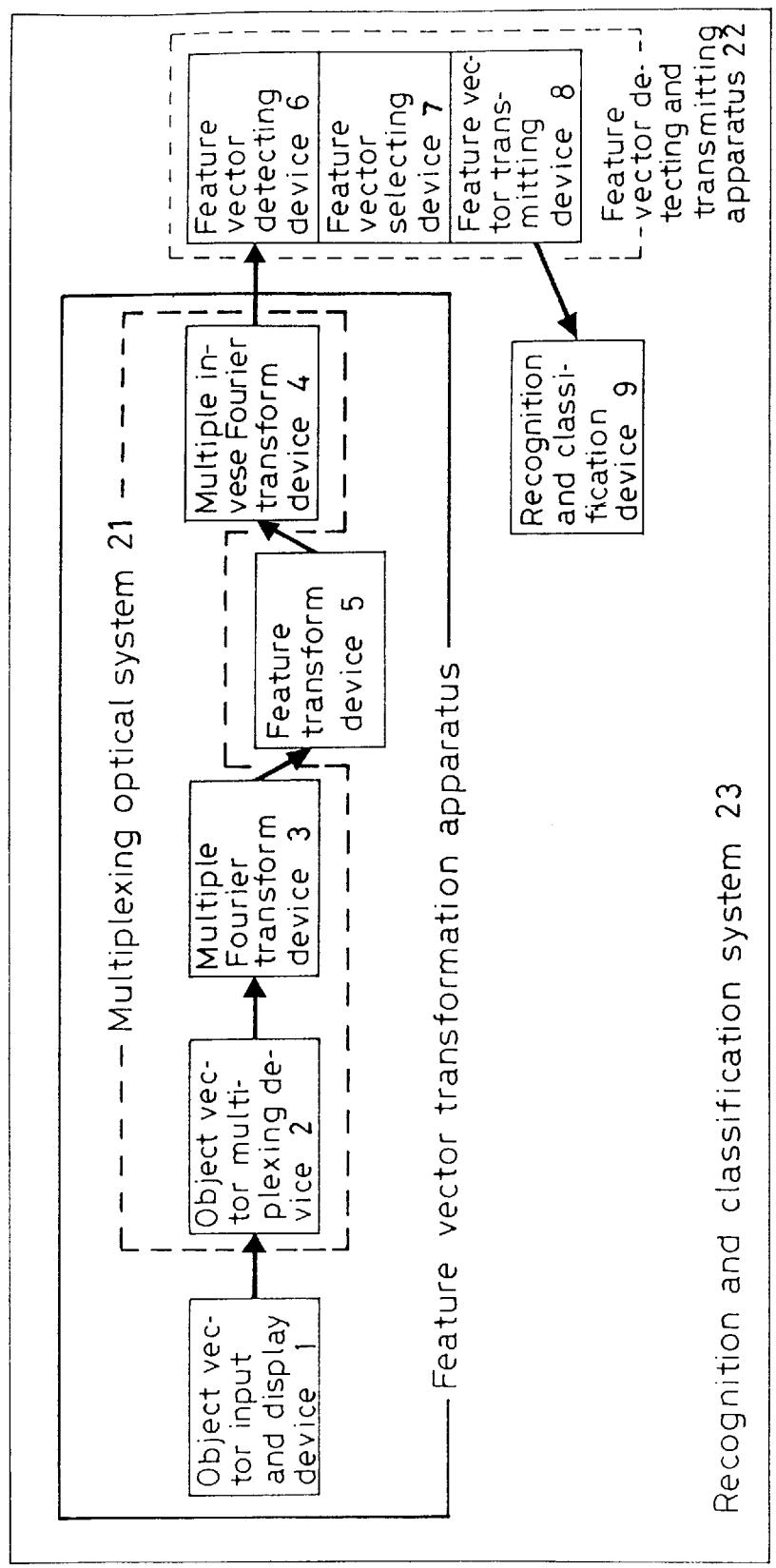
FIG. 1 is a conceptual view showing the arrangement of the present invention.
Figure 2:
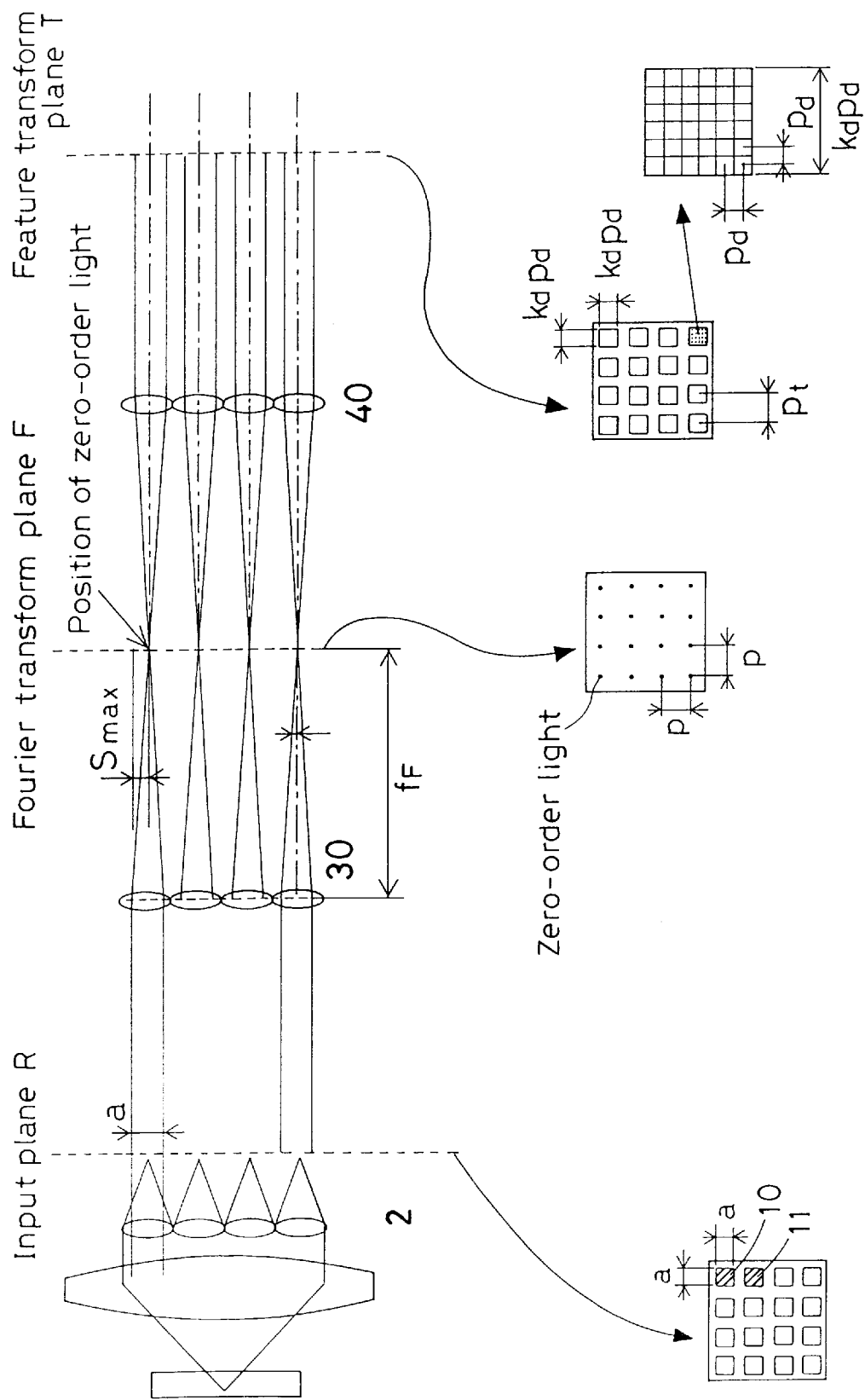
FIG. 2 is a sectional view showing one form of a multiplexing optical system for performing successively a Fourier transform and an inverse Fourier transform on multiplexed object vector information simultaneously and in parallel, which is used in the present invention.
Figure 3:
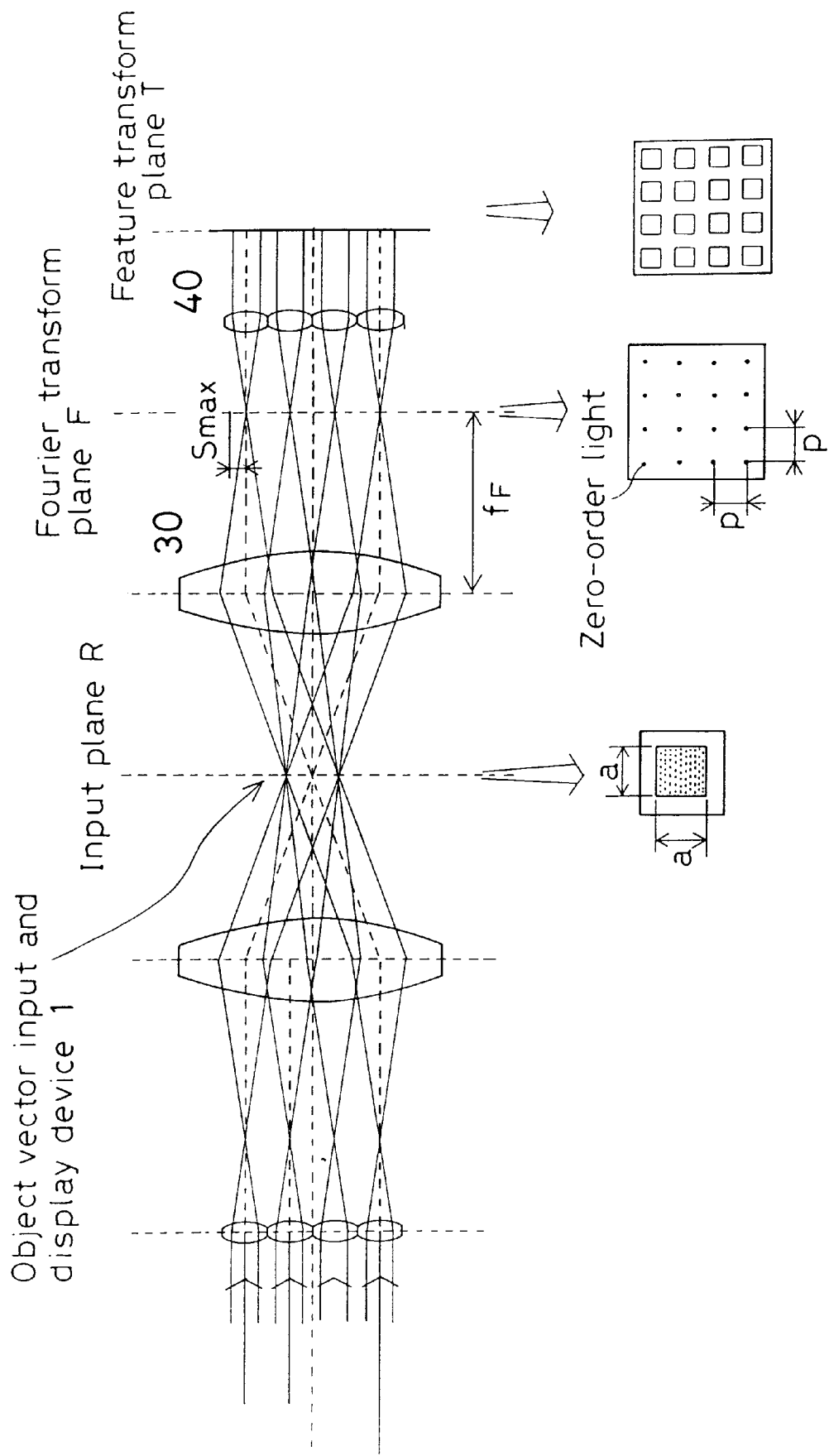
FIG. 3 is a sectional view showing another form of a multiplexing optical system for performing successively a Fourier transform and an inverse Fourier transform on multiplexed object vector information simultaneously and in parallel, which is used in the present invention.

Embodiments and specific examples of a multiplexing optical system and a feature vector transformation apparatus using the same, together with a feature vector detecting and transmitting apparatus and a recognition and classification system using these apparatuses, will be described below with reference to the accompanying drawings.

A first to third embodiments each relate to a multiplexing optical system according to the present invention and a feature vector transformation apparatus according to the present invention which uses the multiplexing optical system. Any of the feature vector transformation apparatuses according to the first to third embodiments includes a multiplexing optical system having an object vector multiplexing device 2 for multiplexing vector information entered into the system as an object to be processed, a multiple Fourier transform device 3 for performing a Fourier transform on the multiplexed input vector information in parallel and simultaneously, and a multiple inverse Fourier transform device 4 for further performing an inverse Fourier transform on the Fourier transformed information. In addition, an object vector input and display device 1 for inputting object vector information is disposed in a stage preceding the multiplexing optical system, and a feature transform device 5 consisting essentially of various kinds of filter for feature transformation is disposed in a Fourier transform plane F. With this arrangement, the feature vector transformation apparatus performs feature transformation in parallel and simultaneously with high accuracy.

[First Embodiment]

Figure 8:
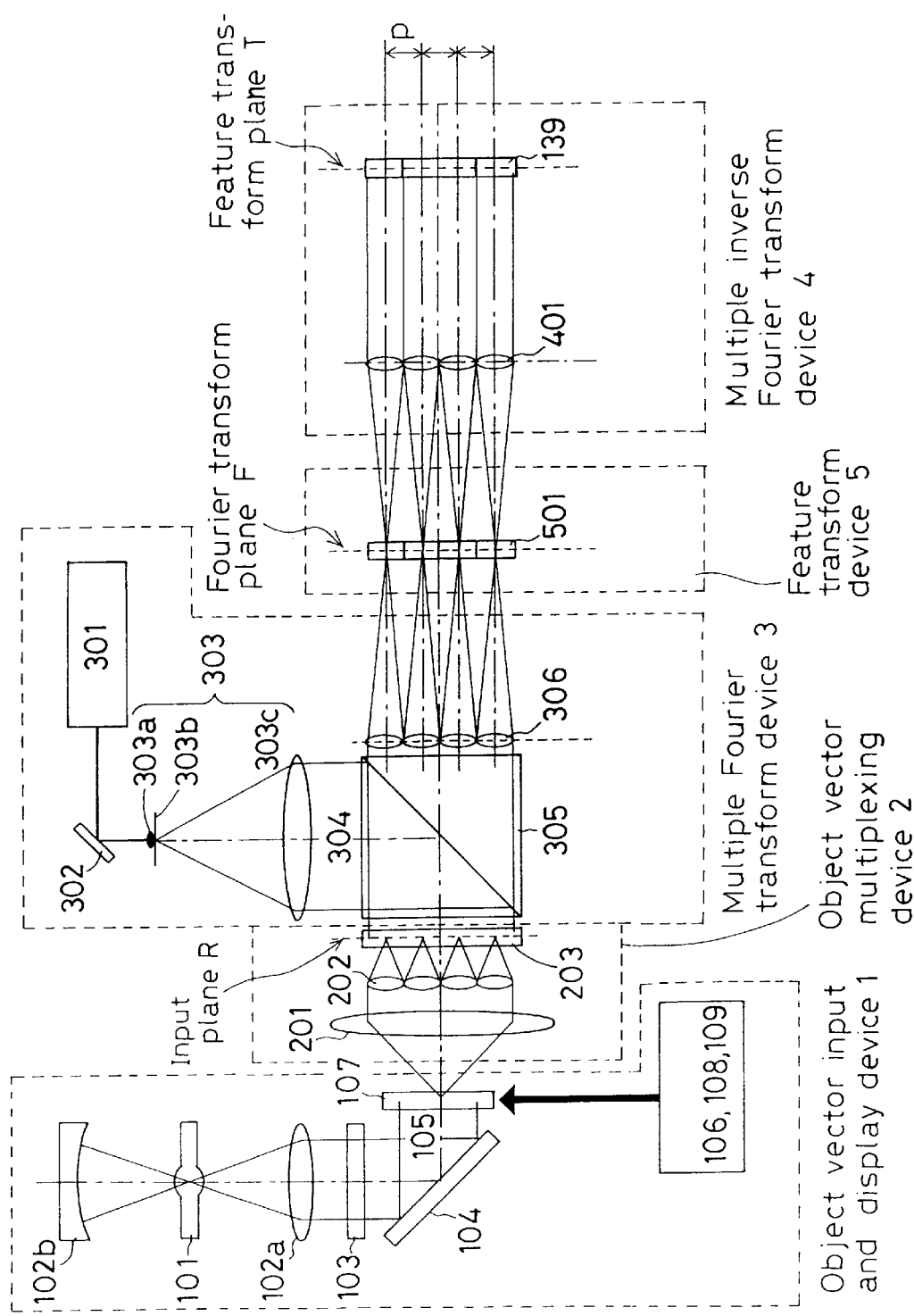
FIG. 8 is a sectional view of a feature vector transformation apparatus according to a first embodiment of the present invention.

As shown in FIG. 8, a feature vector transformation apparatus according to this embodiment has the same arrangement as that of the above-described feature vector transformation apparatus. In this embodiment, particularly one form of the apparatus as designed to process an image as an object vector is shown.

More specifically, an object vector input and display device 1 includes a Xe-Hg lamp as an incoherent light source 101, and a combination of a lens 102a and a mirror 102b which have the same focal length and are disposed in confocal relation to each other to efficiently convert light from the lamp into a parallel light beam. The Xe-Hg lamp is disposed at the confocal point. The object vector input and display device 1 further includes a wavelength filter 103 for narrowing the spectrum width of the parallel light beam, and a mirror 104 for changing the direction of the light beam, thereby producing an approximately parallel incoherent light beam 105. Further, the object vector input and display device 1 includes an image pickup device 106, e.g. a CCD camera, a spatial light modulator 107, a controller 108, and a driver 109. The controller 108 is supplied with an input signal from the image pickup device 106 and generates a signal to display an image (in the case of this embodiment), which is an object vector, on the spatial light modulator 107 through the driver 109. The displayed information is read by making the light beam 105 incident on the spatial light modulator 107, thereby entering the read information into a system in the subsequent stage. In this embodiment, an electrically addressed transmission read type liquid-crystal spatial light modulator, in which the transmission changes with the applied voltage, is used as the spatial light modulator 107. Although the system of the object vector input and display device 1 is bent by the mirror 104, this is not essential. If there is a sufficient space, the system may be constructed in a straight-line form without using the mirror 104.

An object vector multiplexing device 2 includes an image-forming lens 201 and a lens array 202. The lens array 202 has the number of lens elements which is equal to the number of filters used in a feature transform device 5. In object vector multiplexing device 2, the image inputted thereto from the object vector input and display device 1 is reproduced to form the number of identical images which is equal to the number of lens elements constituting the lens array 202 by the image-forming lens 201 and the lens array 202, and the multiplex images are written onto a spatial light modulator 203. The image-forming lens 201 and the lens array 202 are disposed such that the read surface of the spatial light modulator 107 is coincident with the front focal point of the lens 201, and that the write surface of the spatial light modulator 203 is coincident with the back focal point of the lens array 202, and further that the optical axis of the image-forming lens 201 is parallel to the optical axes of lens elements constituting the lens array 202. As the spatial light modulator 203, an optically addressed reflection read type liquid-crystal spatial light modulator, in which the reflectivity changes with the quantity of incident light, is used.

A multiple Fourier transform device 3 includes a laser as a coherent light source 301, and a mirror 302 for bending light from the laser in the direction of the system. The multiple Fourier transform device 3 further includes a beam expander 303. The beam expander 303 has a condenser lens 303a, a spatial filter 303b, and a collimator lens 303c to convert the laser light into an approximately parallel coherent light beam 304 after eliminating noise therefrom. The approximately parallel coherent light beam 304 produced by the beam expander 303 enters a beam splitter 305 in a direction approximately perpendicular to the read surface of the spatial light modulator 203 to read, as reflected light, the multiplex images of the object vector, which have been formed by the object vector multiplexing device 2 and written onto the spatial light modulator 203. A lens array 306, which serves as a Fourier transform lens, has the number of lens elements which is equal to the number of lens elements constituting the lens array 202. The lens elements of the lens array 306 are arranged in the same array pattern as in the lens array 202. The lens array 306 is disposed such that the front focal point of each lens element is coincident with the read surface of the spatial light modulator 203, and that the optical axis of each lens element is parallel to the optical axis of the system, and further that the optical axes of the lens elements are coincident with those of the corresponding lens elements of the lens array 202. Thus, Fourier transformed information concerning the object vector, multiplexed in parallel and simultaneously, is obtained in a Fourier transform plane F set at the back focal point of the lens array 306.

A feature transform device 5 consists essentially of a filter array 501 having the number of filters which is equal to the number of lens elements of the lens array 306. The filters of the filter array 501 are arranged in one-to-one correspondence to the lens elements of the lens array 306. In the feature transform device 5, the image, which is the multiplexed object vector, is subjected to a plurality of different kinds of filtering.

A multiple inverse Fourier transform device 4 consists essentially of a lens array 401, which is an inverse Fourier transform lens array, disposed such that the front focal point of the lens array 401 is coincident with the Fourier transform plane F. The lens array 401 has the number of lens elements which is equal to the number of lens elements of the Fourier transform lens array 306. The lens elements of the lens array 401 are arranged in the same array pattern as in the lens array 306 such that the optical axes of the corresponding lens elements are coincident with each other. The multiple inverse Fourier transform device 4 performs an inverse Fourier transform on the Fourier transformed and filtered information in parallel and simultaneously to obtain the results of feature transformation of the multiplexed object vector in a feature transform plane T in parallel and simultaneously. The feature transform plane T is the back focal plane of the lens array 401.

With the above-described arrangement, the multiplexed object vector, which is read by the approximately parallel coherent light beam 304, is subjected to a Fourier transform by each individual Fourier transform lens element constituting the lens array 306, and then subjected to filtering (feature transformation) by each individual filter constituting the filter array 501. Further, the filtered object vector is subjected to an inverse Fourier transform by each individual inverse Fourier transform lens element constituting the lens array 401, and the result of the inverse Fourier transform is formed in the feature transform plane T, which is the back focal plane of the lens array 401.

(Specific Example 1)

In this specific example, a Gabor filter, which is one type of spatial frequency filter, is used as each filter constituting the filter array 501. The Gabor filter extracts an orientation spatial frequency structure from an image, which is the identical with a band-pass spatial frequency filter having specified directivity in a wide sense. In the real space, the Gabor filter may be expressed as follows:

$$g(x,y) = exp[-2\pi(x^2+y^2)(u_O^2+v_O^2)/\sigma^2] \times exp[j2\pi(u_0 x + v_0 y)] \qquad (4)$$

In the frequency space, the Gabor filter may be expressed as follows:

$$G(u,v)=\{\sigma^2/(2u_0v_0)\}exp[-\pi\sigma^2/2\times\{(u-u_0)^2/u_0^2+(v-v_0)^2/v_0^2\}] \quad (5)$$

Figure 9A:
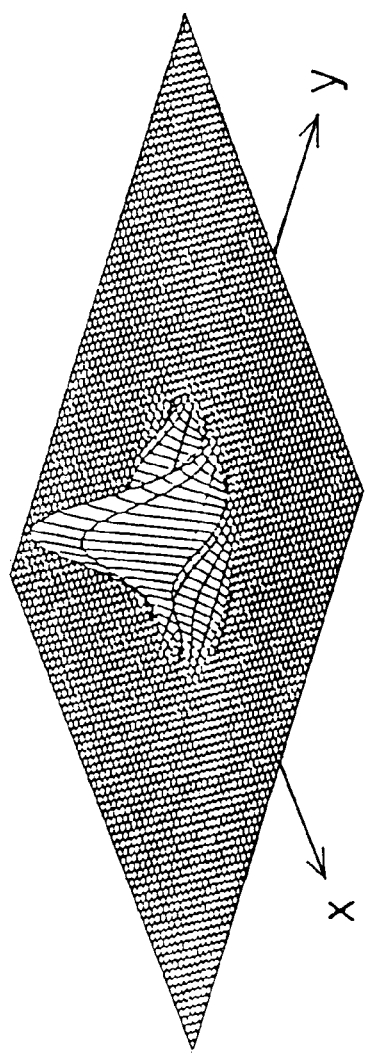
FIGS. 9(a) and 9(b) each show an outline of Gabor filter.
Figure 9B:
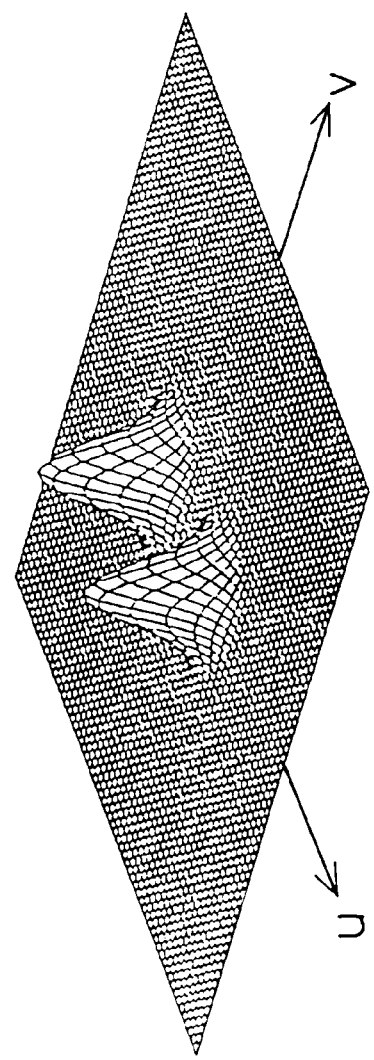

In expressions (4) and (5), x and y are coordinates in the real space; u and v are coordinates in the Fourier transform plane (frequency plane); $u_0$ and $v_0$ are the frequencies of vibrational components; and $\sigma$ is a variable or a constant defining a Gaussian envelope. FIGS. 9(a) and 9(b) schematically show examples of Gabor filter represented by expressions (4) and (5), respectively. FIG. 9(a) shows the Gabor filter in the real space based on expression (4). FIG. 9(b) shows the Gabor filter in the frequency space based on expression (5). The filter includes negative values in the real space; in the frequency space, it includes only positive values. Therefore, it will be understood that the Gabor filter should preferably be handled in the frequency space to execute processing with the intensity of light for which only positive values can be handled in a direct manner.

Figure 4:
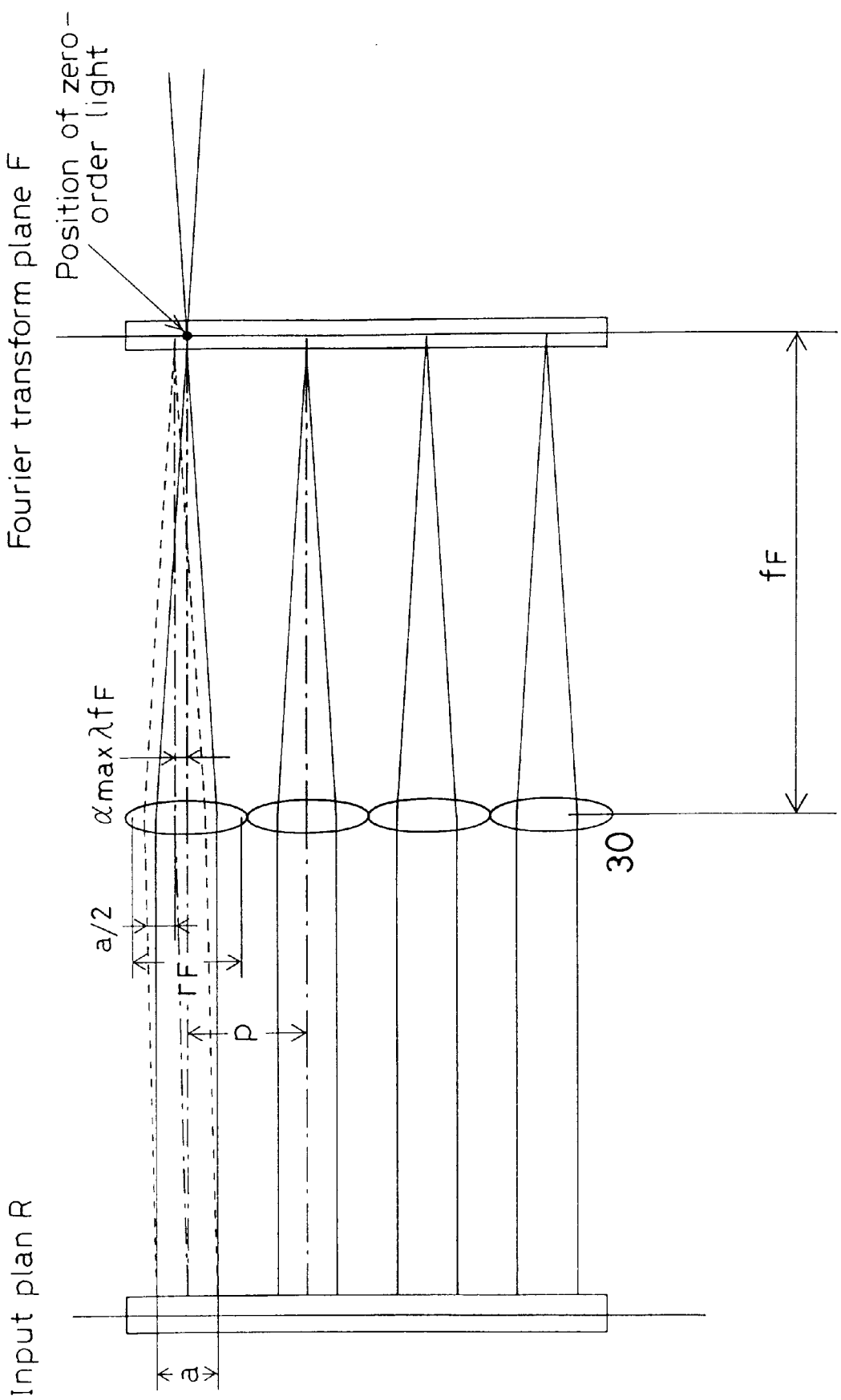
FIG. 4 is an enlarged view showing a part of the optical system shown in FIG. 2.
Figure 5:
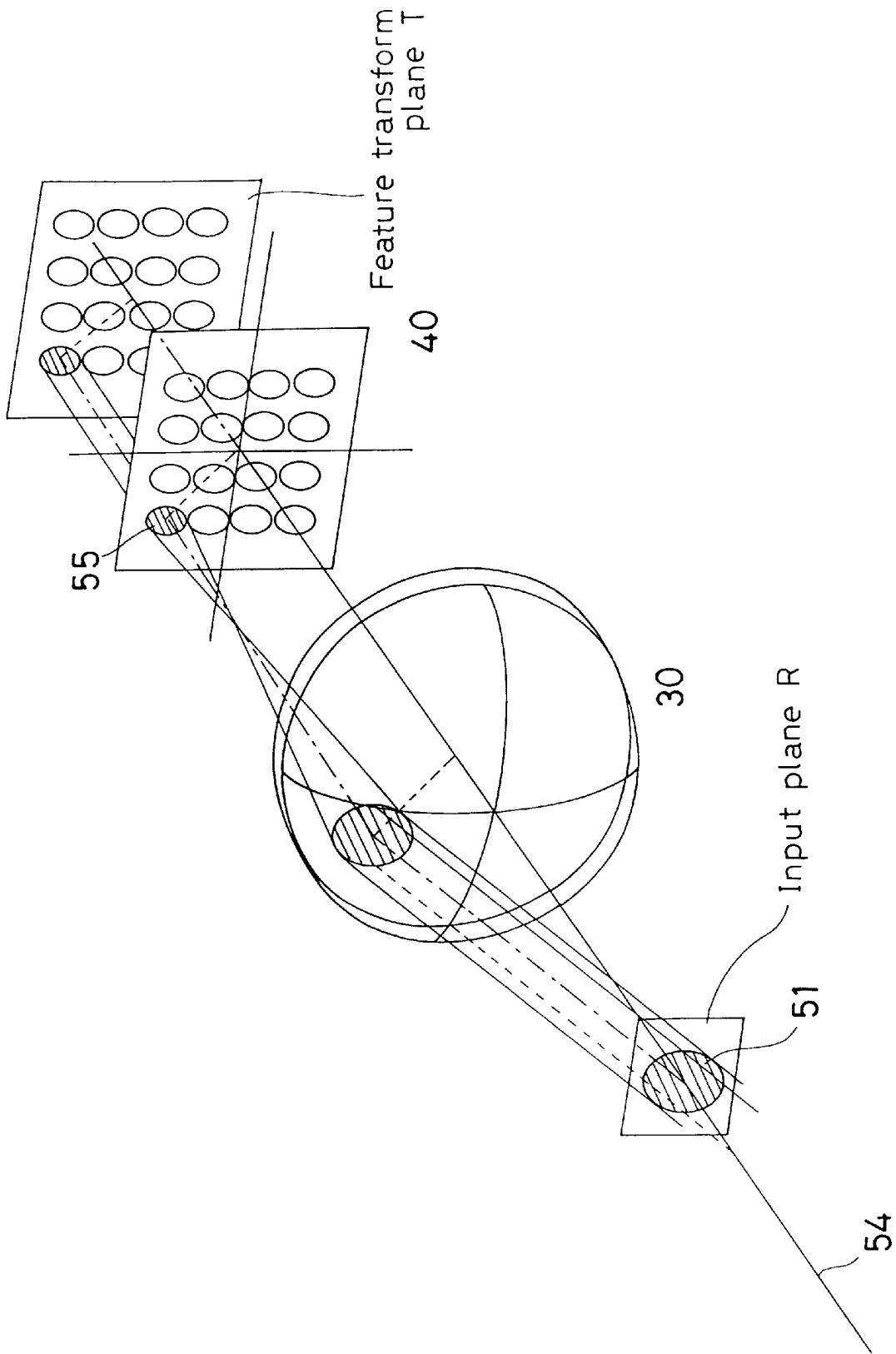
FIG. 5 is a view schematically showing a part of the optical system shown in FIG. 3.
Figure 6:
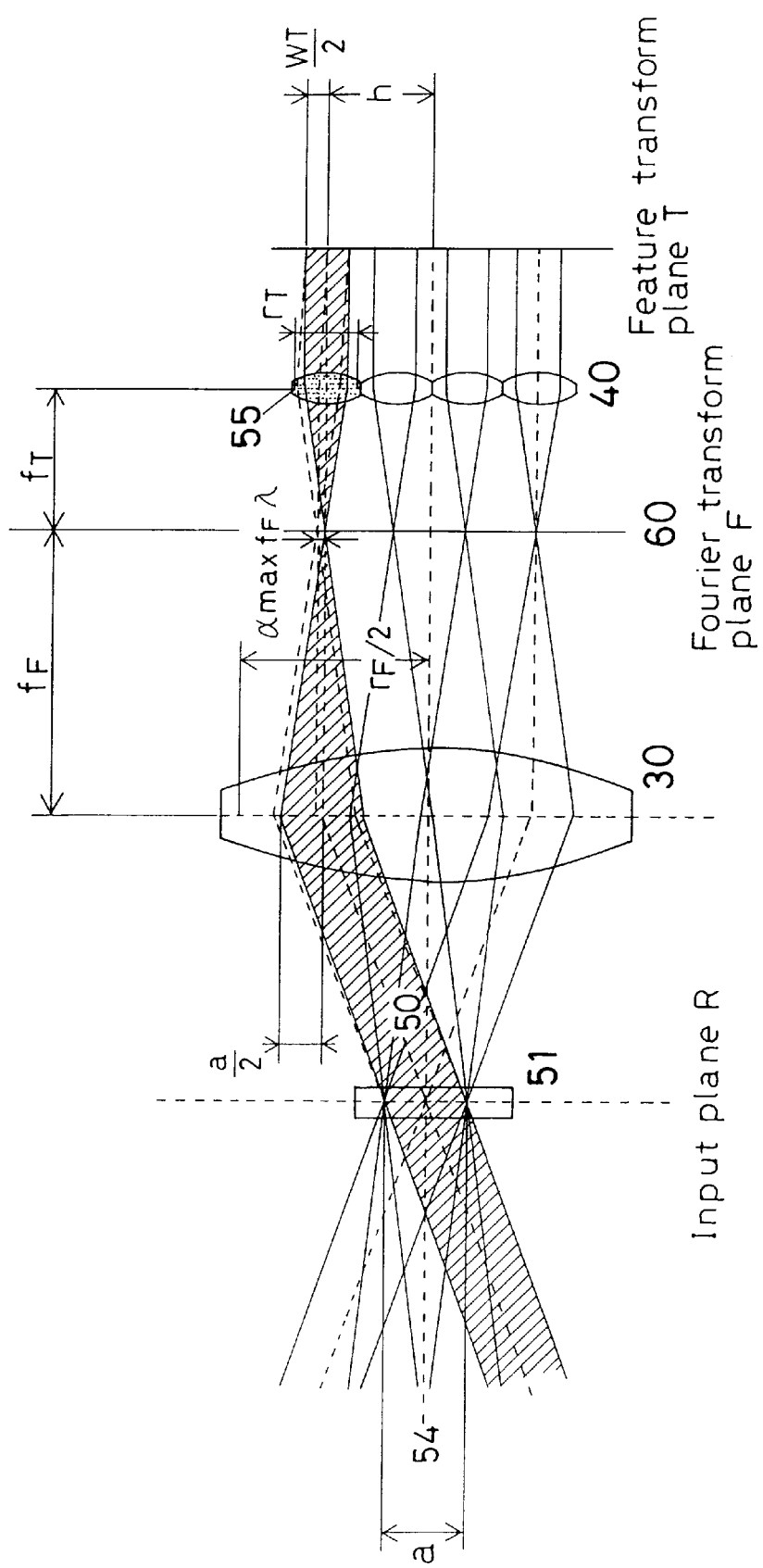
FIG. 6 is a sectional view of a part of the optical system shown in FIG. 3, which is taken along a plane containing an optical axis of the optical system.
Figure 10C:
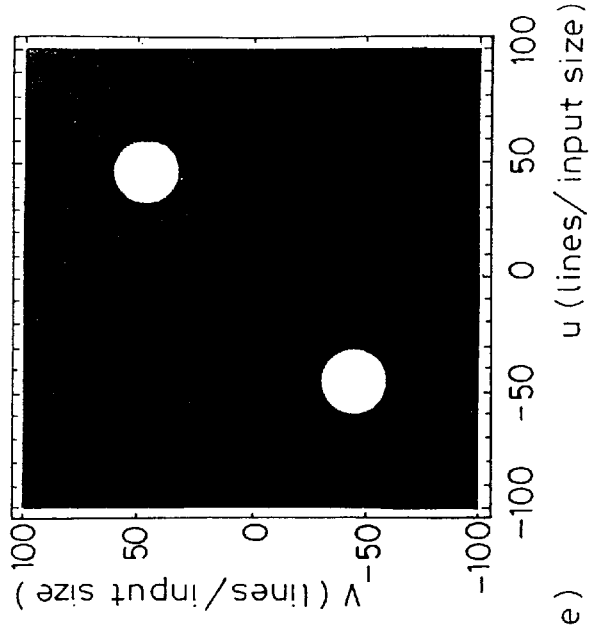
FIGS. 10(a), 10(b) and 10(c) show specific examples of filters used in the first embodiment.
Figure 10B:
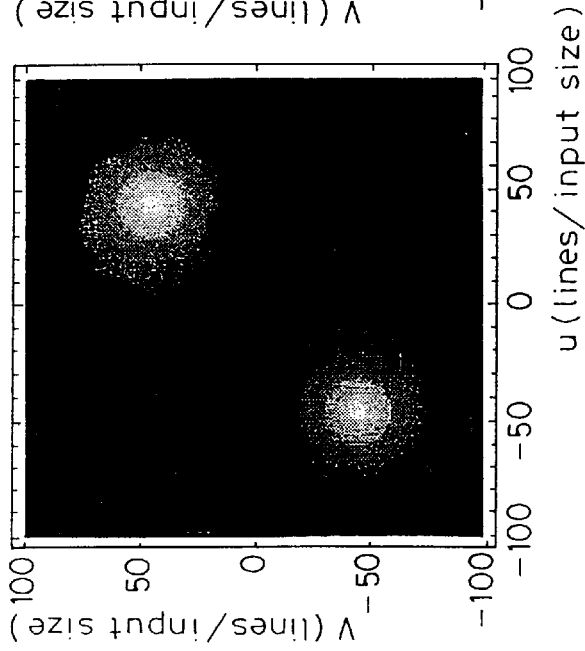
Figure 10A:
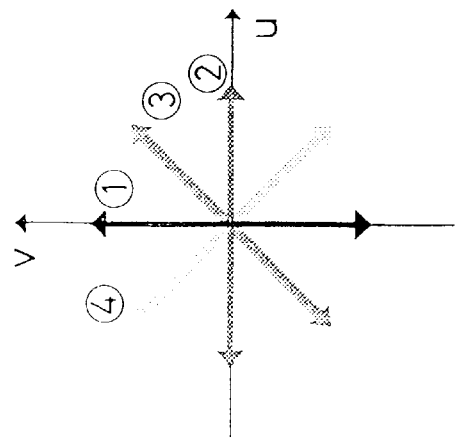

It was experimentally found that when the number of components of the input image was $k_R \times k_R$, it was suitable to extract spatial frequency components in the range of from 0.03 $k_R$ to 0.5 $k_R$ (line pairs per input size). Therefore, in this example, 16 different kinds of filter were used. That is, $k_R$ was set to 128 ($k_R=128$), and as shown in FIG. 10(a), with respect to each of 4 directions, i.e. u=0 (①), v=0 (②), u=v (③), and u=-v (④) four different spatial frequencies of $u_0$ were set, i.e. $4\sqrt{2}$ (=5.7) line pairs per input sizer $8\sqrt{2}$ (=11.3) line pairs per input size, $16\sqrt{2}$ (=22.6) line pairs per input size, and $32\sqrt{2}$ (=45.3) line pairs per input size. Accordingly, the lens and other arrays were each arranged to have a multiplex level of 16, i.e. 4 in the direction of the cross-section shown in FIG. 8, and 4 in a direction perpendicular to the direction of the cross-section. The actual filters were each produced such that the result of computation performed with a computer on the basis of expression (5) was outputted to a printer in the form of a gray-level values and photographically reduced. In the computation, $\sigma$ was set to 2 ($\sigma=2$).

Figure 11:
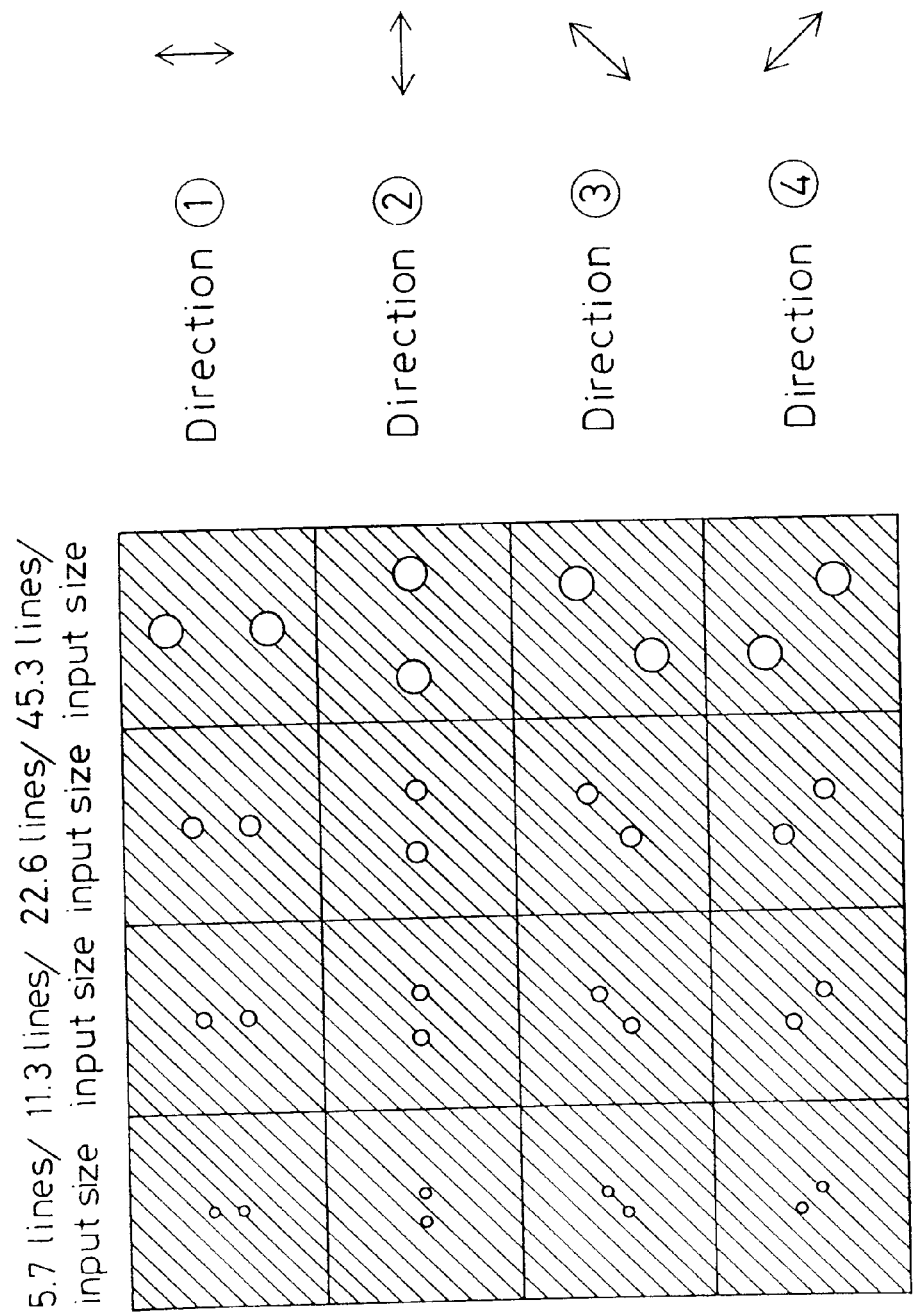
FIG. 11 shows schematically a filter array used in the first embodiment.

In each of these filters, as the spatial frequency of $u_0$ rises, the width of the envelope increases, and the range of frequencies contained enlarges. FIG. 11 schematically shows the filter array 501 used in this specific example. FIG. 10(b) shows an example of Gabor filter outputted to the printer in a case where u=v (③), and the spatial frequency of $u_0$ was $32\sqrt{2}$ (=45.3) line pairs per input size.

A specific numerical example is as follows: The input vector displayed on the spatial light modulator 107 in the object vector input and display device 1 was a square aperture each side of which was 10 millimeter long, and the number of contained vector components (i.e. the number of pixels in this case) was set to be k=128 (128×128 pixels). Moreover, $k_R$ was set to 128 ($k_R=k=128$), as has been stated above.

In the multiplexing optical system in the object vector multiplexing device 2, the focal length of the image-forming lens 201 was set to 100 millimeters and the focal length of the lens array 202 was set to 10 millimeters. Consequently, the size of an image of each multiplex portion of the multiplexed vector, written onto the spatial light modulator 203, was 1 millimeter×1 millimeter (a=1 millimeter). The focal length of the Fourier transform lens array 306 and the focal length of the inverse Fourier transform lens array 401 were the same, i.e. 20 millimeters ($f_F=f_T=20$ millimeters), and the wavelength of the coherent light was 632.8 nanometers ($\lambda$=632.8 nanometers). Accordingly, to prevent pieces of Fourier transformed information concerning the multiplexed image from overlapping each other, the pitch p between the zero-order portions of Fourier transformed information concerning adjacent multiplex portions, together with the lens pitch $p_F$ of the Fourier transform lens array 306, is determined from the condition (1) as follows:

$p_F=p\geq 1.62$ millimeters

Suppose that detectors placed in the feature transform plane T to detect the results of feature transformation of the multiplexed object vector have a pitch of 20 micrometers, the value of the pitch limits the sampling pitch of transformed information in the feature transform plane T; $p_d=20$ micrometers. Further, suppose that $k_d=k=128$, the lens pitch $p_t$ of the inverse Fourier transform lens array 401 is determined from the condition (2) as follows:

$p_t \geq 2.56$ millimeters

In this embodiment, $p=p_F=p_t$, and the pitch of the lens array 202 is also set equal to p. Accordingly, the pitches of the lens arrays 202, 306 and 401 are all set to 3.0 millimeters, which satisfies the conditions (1) and (2). Under these conditions, highly accurate feature transformation can be performed as stated above. Moreover, the maximum spatial frequency $\alpha_{max}$ filtered by the Gabor filter used in this example is 58 line pairs per millimeter. Accordingly, from the condition (1-4), the condition for p is given by $p \geq 2.469$ millimeters The value of p set in this example, i.e. p=3 millimeters, also satisfies this condition.

Figure 12:
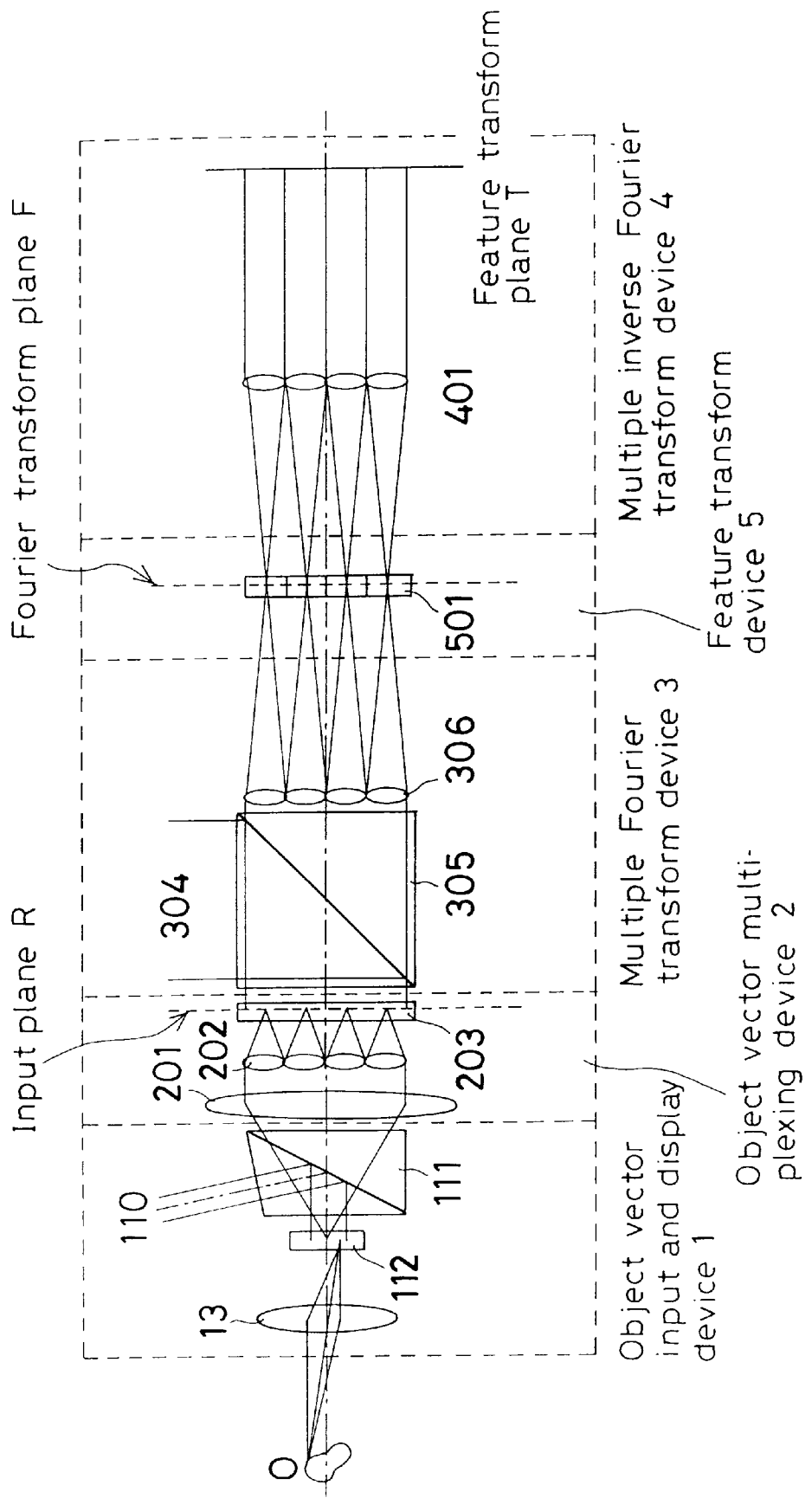
FIG. 12 is a sectional view of a feature vector transformation apparatus according to a modification of the first embodiment.

FIG. 12 shows a modification of this embodiment, in which a reflection read type optically addressed spatial light modulator 112 similar to the spatial light modulator 203 is used in place of the spatial light modulator 107 in the object vector input and display device 1, thereby directly writing an object O through an image-forming lens 13. In this modification, an approximately parallel incoherent light beam 110, which is produced as in the case of the above-described incoherent light beam 105, is made incident approximately perpendicular to the read surface of the spatial light modulator 112 by a beam splitter 111, whereby information concerning the object vector, which has been recorded on the spatial light modulator 112 through the image-forming lens 13, is read in the form of reflected light. Thereafter, a series of processing operations similar to those in the first embodiment are executed. In this case, because information is directly written by light without using an electrical addressing process, the processing speed can be correspondingly increased.

(Specific Example 2)

A specific example for realizing the above-described modification of the first embodiment will be shown below. In this specific example also, a Gabor filter was used as each filter constituting the filter array 501. In this specific example, an input vector displayed by the spatial light modulator 112 in the object vector input and display device 1 was a square aperture, each side of which had a size of 4 millimeters, which was smaller than in specific example 1, and the number k of contained vector components (i.e. the number of pixels in this case) was set to 64 (k=64; 64×64 pixels). Further, $k_R$ was set equal to k, i.e. $k_R=k=64$.

In the multiplexing optical system in the object vector multiplexing device 2, the focal length of the image-forming lens 201 was set to 50 millimeters, and the focal length of the lens array 202 was set to 5 millimeters. Therefore, the size of an image of each multiplex portion of the multiplexed vector, written onto the spatial light modulator 203, was 0.4 millimeter×0.4 millimeter (a=0.4 millimeter). Further, the focal length of the Fourier transform lens array 306 and the focal length of the inverse Fourier transform lens array 401 were set equal to each other, i.e. 14 millimeters ($f_F=f_I=14$ millimeters), and the wavelength of coherent light was 515 nanometers ($\lambda=515$ nanometers). Accordingly, to prevent pieces of Fourier transformed information concerning the multiplexed image from overlapping each other, the pitch p between the zero-order portions of Fourier transformed information concerning adjacent multiplex portions, together with the lens pitch $p_F$ of the Fourier transform lens array 306, is determined from the condition (1) as follows:

$$p_F=p \geq 1.16 \text{ millimeters}$$

Suppose that detectors placed in the feature transform plane T to detect the results of feature transformation of the multiplexed object vector have a pitch of 10 micrometers, the value of the pitch limits the sampling pitch of transformed information in the feature transform plane T; $p_d=10$ micrometers. Further, suppose that $k_d=k=64$, the lens pitch $p_t$ of the inverse Fourier transform lens array 401 is determined from the condition (2) as follows:

$$p_t \geq 0.64 \text{ millimeter}$$

In this embodiment, $p=p_F=p_t$, and the pitch of the lens array 202 is also set equal to p. Accordingly, the pitches of the lens arrays 202, 306 and 401 are all set to 2.0 millimeters, which satisfies the conditions (1) and (2). Moreover, the maximum spatial frequency $\alpha_{max}$ filtered by the Gabor filter used in this example is 72.5 line pairs per millimeter. Accordingly, from the condition (1-4), the condition for p is given by $$p \geq 1.45 \text{ millimeters}$$

The value of p set in this example, i.e. p=2 millimeters, also satisfies this condition.

Figure 13:
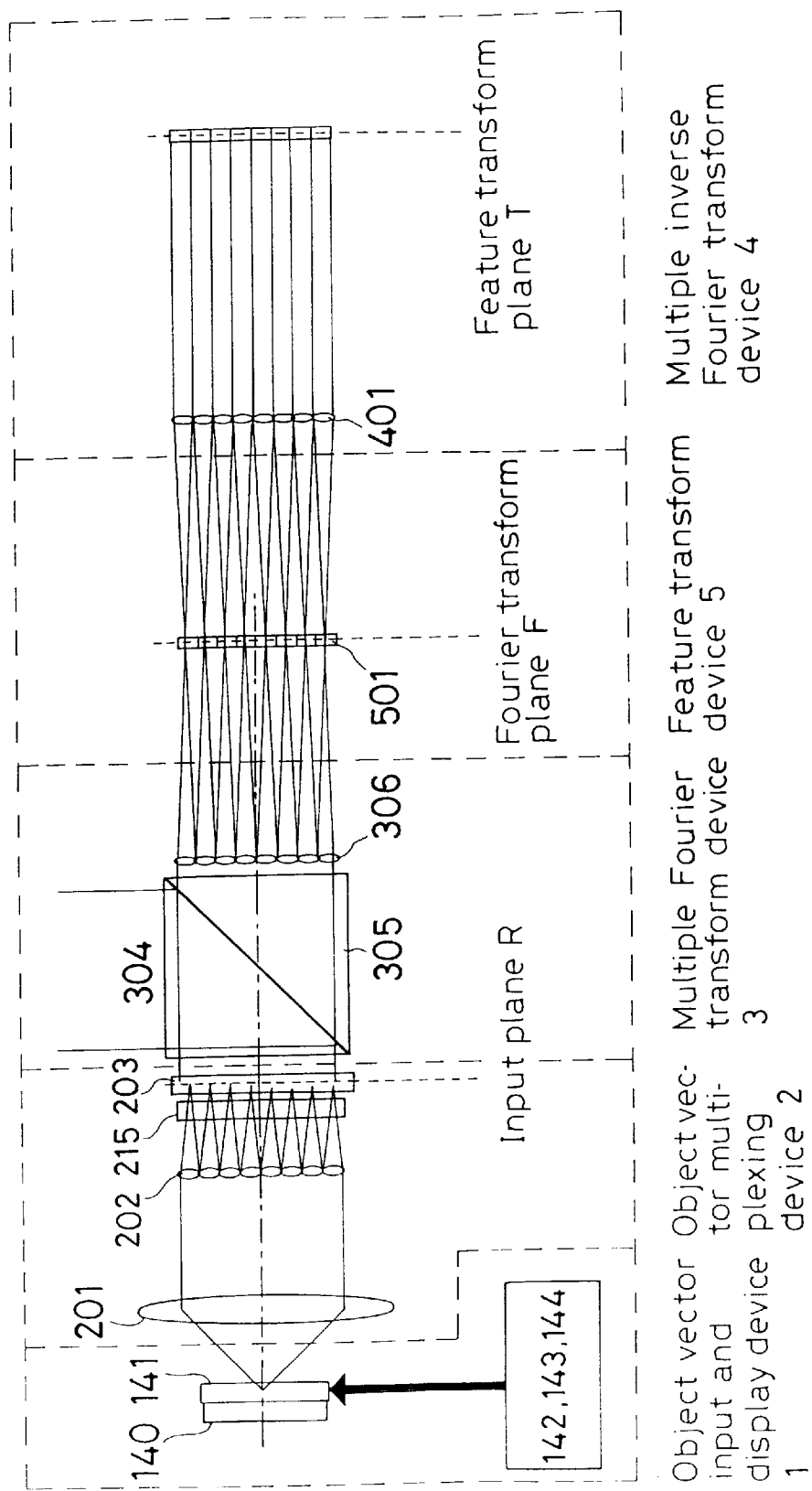
FIG. 13 is a sectional view of a feature vector transformation apparatus according to another modification of the first embodiment.

FIG. 13 shows a modification of this embodiment where information concerning colors can also be subjected to feature transformation in parallel and simultaneously by adding a color filter array to the object vector multiplexing device 2. More specifically the object vector input and display device 1 includes an incoherent light source 140 for producing an incoherent light beam. The incoherent light source 140 consists essentially of a combination of a cold lamp commonly used in liquid-crystal panel displays and a color filter for increasing monochromaticity. The object vector input and display device 1 further includes a spatial light modulator 141 which is an electrically addressed transmission read type liquid-crystal spatial light modulator, and a combination of an image pickup device 142, e.g. a CCD camera, a controller 143, and a driver 144 for displaying an image as an object vector on the spatial light modulator 141 as in the case of the first embodiment. The object vector multiplexing device 2 is arranged in the same way as in the first embodiment. Further, a filter array 215 for transformation into information in the color space is additionally disposed immediately in front of the spatial light modulator 203. The other portions are all arranged in the same way as in the first embodiment.

(Specific Example 3)

A specific example for realizing the above modification of the first embodiment will be shown below. In this specific example, 4 (2×2) different kinds of color filter (more specifically, color filters having transmission peaks at 480 nanometers, 520 nanometers, 580 nanometers, and 630 nanometers, respectively) are prepared to constitute the filter array 215 for color detection, and 16 (4×4) different kinds of Gabor filter, which are similar to those in the first embodiment, are arranged to act on the region of each color. Accordingly, the multiplex level of each lens array is 64 (8×8). An image entered by the object vector input and display device 1 is reproduced by the object vector multiplexing device 2 to form 64 identical images, which correspond to the multiplex level. The 64 multiplex images are subjected to filtering by the color detection filter array 21, which is additionally provided in the system, thereby reproducing images different in color for each region consisting of 16 (4×4) multiplex regions. Further, the images are processed through the multiple Fourier transform device 3, the feature transform device 5, and the multiple inverse Fourier transform device 4, whereby a plurality of spatial frequency structures in a plurality of directions can be extracted from each region by 16 (4×4) different kinds of Gabor filter similar to those in specific example 1. That is, it is possible to instantaneously extract a plurality of spatial frequency structures in a plurality of directions of a plurality of color portions.

A specific numerical example is as follows: The input vector displayed by the spatial light modulator 141 in the object vector input and display device 1 was a square aperture, each side of which had a size of 10 millimeters, and the number k of contained vector components (i.e. the number of pixels in this case) was set to 50 (k=50; 50×50 pixels). Further, $k_R$ was set equal to k, i.e. $k_R=k=50$.

In the multiplexing optical system in the object vector multiplexing device 2, the focal length of the image-forming lens 201 was set to 50 millimeters, and the focal length of the lens array 202 was set to 3.2 millimeters. Therefore, the size of an image of each multiplex portion of the multiplexed vector, written onto the spatial light modulator 203, was 0.64 millimeter×0.64 millimeter (a=0.64 millimeter). Further, the focal length of the Fourier transform lens array 306 and the focal length of the inverse Fourier transform lens array 401 were set equal to each other, i.e. 50 millimeters ($f_F=f_I=50$ millimeters), and the wavelength of coherent light was 488 nanometers ($\lambda=488$ nanometers). Accordingly, to prevent pieces of Fourier transformed information concerning the multiplexed image from overlapping each other, the pitch p between the zero-order portions of Fourier transformed information concerning adjacent multiplex portions, together with the lens pitch $p_F$ of the Fourier transform lens array 306, is determined from the condition (1) as follows:

$$p_F=p \geq 1.91 \text{ millimeters}$$

Suppose that detectors placed in the feature transform plane T to detect the results of feature transformation of the multiplexed object vector have a pitch of 40 micrometers, the value of the pitch limits the sampling pitch of transformed information in the feature transform plane T; $p_d=40$ micrometers. Further, suppose that $k_d=k=50$, the lens pitch $p_t$ of the inverse Fourier transform lens array 401 is determined from the condition (2) as follows:

$$p_t \geq 2.00 \text{ millimeters}$$

In this embodiment, $p=p_F=p_t$, and the pitch of the lens array 202 is also set equal to p. Accordingly, the pitches of the lens arrays 202, 306 and 401 are all set to 2.5 millimeters, which satisfies the conditions (1) and (2). Under these conditions, highly accurate feature transformation can be performed as stated above. Moreover, the maximum spatial frequency $\alpha_{max}$ filtered by the Gabor filter used in this example is 35.4 line pairs per millimeter. Accordingly, from the condition (1-4), the condition for p is given by $p \geq 2.37$ millimeters The value of p set in this example, i.e. p=2.5 millimeters, also satisfies this condition.

(Specific Example 4)

Another numerical specific example using the same filters as those in specific example 3 will be shown below. The input vector displayed by the spatial light modulator 141 in the object vector input and display device 1 was a square aperture, each side of which had a size of 10 millimeters, and the number k of contained vector components (i.e. the number of pixels in this case) was set to 128 (k=128; 128×128 pixels). Further, $k_R$ was set equal to k, i.e. $k_R$=k=128.

In the multiplexing optical system in the object vector multiplexing device 2, the focal length of the image-forming lens 201 was set to 50 millimeters, and the focal length of the lens array 202 was set to 7.5 millimeters. Therefore, the size of an image of each multiplex portion of the multiplexed vector, written onto the spatial light modulator 203, was 1.5 millimeters×1.5 millimeters (a=1.5 millimeters). Further, the focal length of the Fourier transform lens array 306 and the focal length of the inverse Fourier transform lens array 401 were set equal to each other, i.e. 8 millimeters ($f_F$=$f_I$=8 millimeters), and the wavelength of coherent light was 632.8 nanometers ($\lambda$=632.8 nanometers). Accordingly, to prevent pieces of Fourier transformed information concerning the multiplexed image from overlapping each other, the pitch p between the zero-order portions of Fourier transformed information concerning adjacent multiplex portions, together with the lens pitch $p_F$ of the Fourier transform lens array 306, is determined from the condition (1) as follows:

$p_F = p \geq 0.44$ millimeter

Suppose that detectors placed in the feature transform plane T to detect the results of feature transformation of the multiplexed object vector have a pitch of 10 micrometers, the value of the pitch limits the sampling pitch of transformed information in the feature transform plane T; $p_d$=10 micrometers. Further, suppose that $k_d$=k=128, the lens pitch $p_I$ of the inverse Fourier transform lens array 401 is determined from the condition (2) as follows:

$p_I \geq 1.28$ millimeters

In this embodiment, $p = p_F = p_I$, and the pitch of the lens array 202 is also set equal to p. Accordingly, the pitches of the lens arrays 202, 306 and 401 are all set to 2.0 millimeters, which satisfies the conditions (1) and (2). Under these conditions, highly accurate feature transformation can be performed as stated above. Moreover, the maximum spatial frequency $\alpha_{max}$ filtered by the Gabor filter used in this example is 35.4 line pairs per millimeter. Accordingly, from the condition (1-4), the condition for p is given by $p \geq 1.90$ millimeters The value of p set in this example, i.e. p=2.0 millimeters, also satisfies this condition.

Although specific examples 3 and 4 show a combination of Gabor filters as filters for extracting spatial frequency structures, as shown in specific examples 1 and 2, and color filters for extracting feature quantities in the color spacer it should be noted that the combination of filters may be modified in various ways, e.g. a combination with other similar filters.

It will be apparent from the foregoing description that if the above-described embodiment is arranged according to each of the specific examples, a plurality of spatial frequency structures in a plurality of directions can be instantaneously extracted from an image entered as an object vector by Gabor filters, i.e. one type of band-pass filter having specified directivity, and feature transformation can be performed with high accuracy. It will also be apparent that a combination of Gabor filters and color filters makes it possible to instantaneously extract a plurality of spatial frequency structures in a plurality of directions of a plurality of color portions from an image entered as an object vector and to perform feature transformation with high accuracy.

It should be noted that each filter of the filter array 501 according to this embodiment may be a band-pass spatial frequency filter binalized by using as a criterion the half-width of the value of the Gabor filter at the Fourier transform planer which is represented by expression (5) in specific example 1, such that a region within the half-width is transparent, whereas a region outside the half-width is opaque. FIG. 10(c) shows an example in which the Gabor filter shown in FIG. 10(b) is binalized. It is also possible to use a wavelet filter W such as that given by $$W(a,b,x_n,y_n) = 1/(ab)^{1/2} \times \int \int f(x,y) h^* \{(x-x_n)/a, (y-y_n)/b\} dx dy \quad (6)$$

It will be apparent from the nature of ordinary wavelet filters that if the filter array 501 is produced by using filters h (x,y) in which variables a, b, $x_n$, and $y_n$ in expression (6) are properly changed, the same advantageous effect is obtained, and a time-series signal, etc. can also be handled.

Although in this embodiment, a Xe-Hg lamp or a cold lamp is used to obtain an approximately parallel incoherent light beam 105, it should be noted that any other incoherent light source can also be used. It is possible to use an approximately parallel incoherent light beam 105 formed by obtaining an approximately parallel light beam from a coherent light source, e.g. a laser, and then making it incoherent by using a diffuser or the like. In such a case, the approximately parallel coherent light beam 304 may be branched for common use. The approximately parallel coherent light beam 304 may also be produced by using a coherent light source, e.g. an LD (Laser Diode).

Although in the above-described specific examples, homogeneous lenses are used as the lens array 202, the Fourier transform lens array 306, and the inverse Fourier transform lens array 401, it should be noted that it is also possible in this embodiment to use lens arrays consisting essentially of gradient index lenses with plane surfaces at both ends or utilizing binary optics. In this case, alignment is facilitated, advantageously. It is also possible to use aspherical surfaces for curved surfaces or to give a curvature to gradient index lenses. In this case, it becomes easy to correct aberrations, and errors in information are reduced.

[Second Embodiment]

Figure 14:
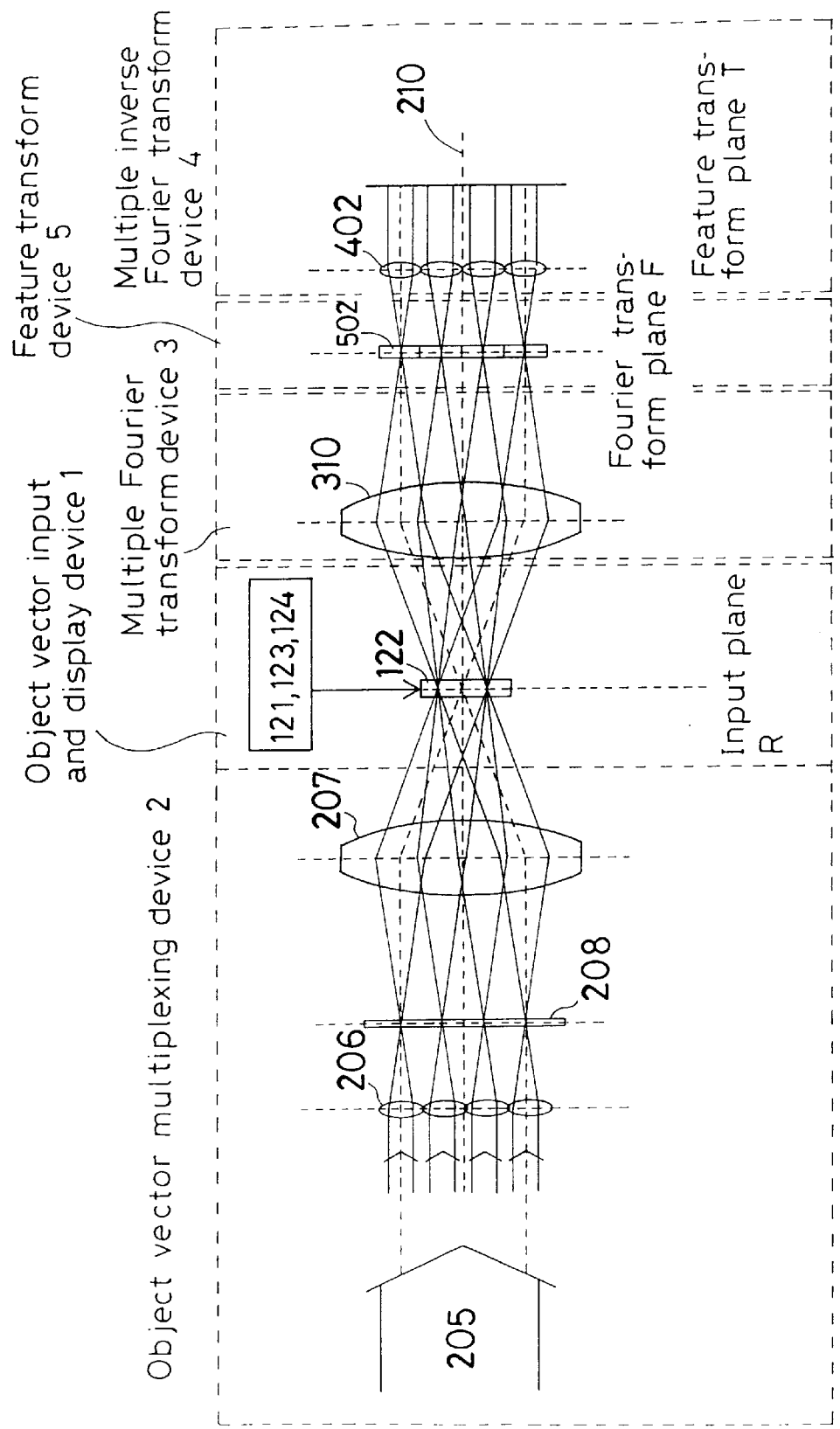
FIG. 14 is a sectional view of a feature vector transformation apparatus according to a second embodiment of the present invention.

As shown in the sectional view of FIG. 14, a feature vector transformation apparatus according to this embodiment has the same arrangement as that of the above-described feature vector transformation apparatus. In this embodiment, particularly one form of the feature vector transformation apparatus where an image is processed as an object vector is shown. When compared to the first embodiment, this embodiment has the advantage that a feature vector transformation apparatus can be constructed using a spatial light modulator having a relatively small effective aperture size. More specifically, an object vector input and display device 1 includes an image pickup device 121, e.g. a CCD camera, and an electrically addressed transmission type spatial light modulator 122, which is a liquid-crystal spatial light modulator in this embodiment.

The object vector input and display device 1 further includes a controller 123 which is supplied with an input signal from the image pickup device 121 to generate a signal to display information on the spatial light modulator 122 through a driver 124. Vector information (i.e. an image in this case) obtained by the image pickup device 121 is displayed on the spatial light modulator 122.

An object vector multiplexing device 2 includes constituent elements (not shown) for producing an approximately parallel coherent light beam 205, which are the same as those of the part for producing the coherent light beam 304 in the multiple Fourier transform device 3 according to the first embodiment. The object vector multiplexing device 2 further includes a lens array 206 having lens elements disposed such that optical axes of the lens elements are parallel to each other, and a first lens 207 having a pupil diameter sufficiently large for all light beams emanating from the lens array 206 to enter and leave the first lens 207. The lens array 206, the first lens 207, and the spatial light modulator 122 are disposed such that the back focal plane of the lens array 206 and the front focal plane of the first lens 207 are coincident with each other at a plane 208, and that the back focal plane of the first lens 207 is coincident with the read surface of the spatial light modulator 122.

First, the approximately parallel coherent light beam 205 enters the lens array 206, and light beams emanating from the lens elements constituting the lens array 206 condense to those points in the back focal plane 208 of the lens array 206 which correspond to the individual lens elements of the lens array 206. Thereafter, the light beams become divergent beams to enter the first lens 207. Because the light beams entering the first lens 207 are divergent beams from different points in the front focal plane of the first lens 207, light beams emanating from the first lens 207 are approximately parallel light beams making various angles with an optical axis 210 of the first lens 207. The approximately parallel light beams making various angles with the optical axis 210 enter approximately the same region in the vicinity of the back focal plane of the first lens 207. Accordingly, if an object vector is displayed on the spatial light modulator 122, which is disposed in the vicinity of the back focal plane of the first lens 207, and read by the approximately parallel light beams making various angles with the optical axis 210, the light beams passing through the spatial light modulator 122 propagate in respective directions, bearing object vector information.

A multiple Fourier transform device 3 consists essentially of a second lens (large-aperture lens) 310 as a Fourier transform lens having a pupil diameter sufficiently large to accept all the light beams bearing object vector information read out in a plurality of directions. A plurality of light beams bearing object vector information read out in a multiplex manner by the object vector multiplexing device 2 enter the second lens 310 and form a plurality of Fourier transformed images of the object vector at the corresponding positions in a Fourier transform plane F, that is, the back focal plane of the second lens 310.

A feature transform device 5 consists essentially of a filter array 502 having the number of filters which is the same as the number of a plurality of Fourier transformed images obtained by the multiple Fourier transform device 3. The filters constituting the filter array 502 are disposed in one-to-one correspondence to the Fourier transformed images. The feature transform device 5 performs a plurality of different filtering operations on the image of the multiplexed object vector.

A multiple inverse Fourier transform device 4 consists essentially of a lens array 402 serving as an inverse Fourier transform lens array, which is formed from a plurality of inverse Fourier transform lens elements, as in the case of the first embodiment. The multiple inverse Fourier transform device 4 performs an inverse Fourier transform in parallel and simultaneously on information subjected to the Fourier transform and the filtering to obtain results of feature transformation of the multiplexed object vector in parallel and simultaneously in a feature transform plane T, that is, the back focal plane of the lens array 402.

With the above-described arrangement, the multiplexed object vector read by the approximately parallel coherent light beam 205 is subjected to a Fourier transform by the second lens 310, which is a Fourier transform lens. Thereafter, the Fourier transformed object vector information is subjected to different filtering operations (feature transformation) by the respective filters constituting the filter array 502, and further subjected to an inverse Fourier transform by each individual inverse Fourier transform lens element of the lens array 402. The results of the inverse Fourier transform are formed in the feature transform plane T, which is the back focal plane of the lens array 402.

(Specific Example 1)

In this specific example, the vector displayed on the spatial light modulator 122 in the object vector input and display device 1 was a square aperture, each side of which had a size a of 5.4 millimeters. The number of vector components (pixels in this case) contained in the square aperture was k×k=128×128, and $k=k_d=k_R=128$. Further, a Gabor filter, which has already been described, was used as each filter constituting the filter array 502.

Figure 15:
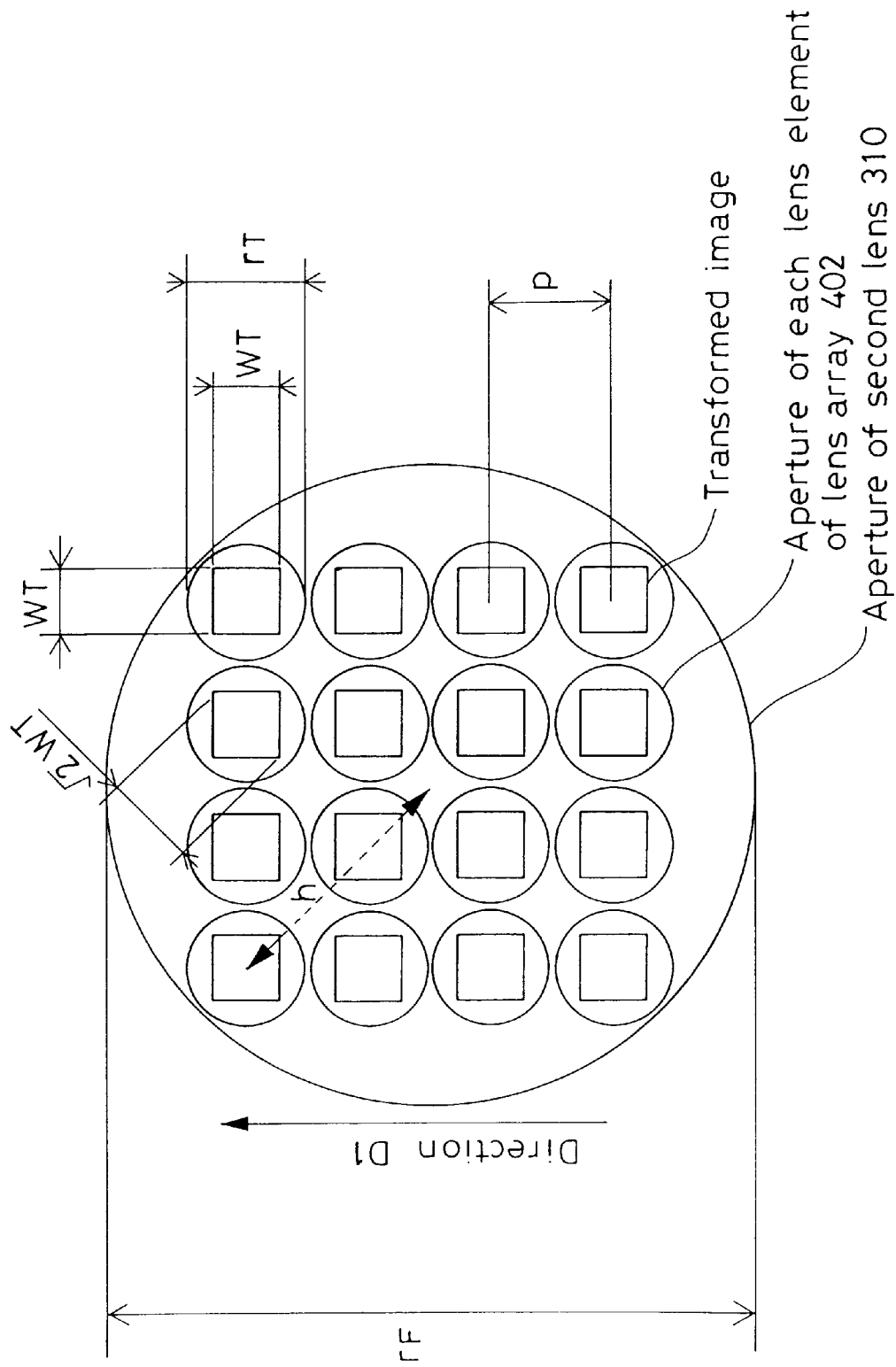
FIG. 15 shows a positional relationship among a lens array, a second lens, and transformed images in a specific example of the second embodiment.

FIG. 15 shows a positional relationship among the lens array 402, the second lens 310, and the transformed images in the feature transform plane T. As shown in the figure, the lens array 402 is formed by disposing lens elements of circular aperture in a square array. First, let us discuss dimensions with regard to a direction in which the centers of each pair of adjacent transformed images are the closest to each other, i.e, direction D1 in the figure.

In the multiplexing optical system used in this specific example, the focal length of the second lens 310 for performing a Fourier transform was 100 millimeters ($f_F=100$ millimeters), and the wavelength of coherent light was 632.8 nanometers ($\lambda=632.8$ nanometers). Accordingly, to prevent pieces of Fourier transformed information concerning the multiplexed image from overlapping each other, the pitch p between the zero-order portions of Fourier transformed information concerning adjacent multiplex portions is determined from the condition (1) as follows:

$p \geq 1.5$ millimeters

Suppose that detectors placed in the feature transform plane T to detect the results of feature transformation of the multiplexed object vector have a pitch of 10 micrometers, the value of the pitch limits the sampling pitch of transformed information in the feature transform plane T; $p_d=10$ micrometers. Further, the lens pitch $p_t$ of the inverse Fourier transform lens array 402 is determined from the condition (2) as follows:

$p_t \geq 1.28$ millimeters

The focal lengths of the lens arrays 206 and 402 were both 27.8 millimeters ($f_I=27.8$ millimeters), and the size of each image detected in the feature transform plane T was 1.5 millimeters×1.5 millimeters ($w_T=1.5$ millimeters). As each filter, a Gabor filter was used, and the maximum spatial frequency $\alpha_{max}$ was 10.7 line pairs per millimeter. Consequently, $\alpha_{max}f_F\lambda=0.6799$ millimeter. The effective aperture $r_T$ of each lens element constituting the lens array 402 must satisfy the condition (3-4). Substituting the above-described values into the condition (3-4) gives $$r_T \geq 2.87 \text{ millimeters}$$

The above discussion has been held with regard to the direction D1 in the figure. Therefore, in order to enable all the square region of each transformed image to enter the corresponding lens element, it is necessary to convert the above-described value into a value in the diagonal direction. This can be done by multiplying the value by $\sqrt{2}$; the condition is given by $r_T > \sqrt{2} \times 2.87 = 4.059$ millimeters. Since $p > r_T$ and $p_t = p$, $p \geq 4.059$ millimeters is given from the above-described three conditions. In this example, p was set to 4.5 millimeters (p=4.5 millimeters).

Next, a value for $r_F$ is determined on the basis of the condition (3). The distance h from the optical axis 210 to the center of that lens element in each of the lens arrays 206 and 402 which is the farthest from the optical axis 210 is given by $h=3\sqrt{2}p/2$ because these lens arrays 206 and 402 are each arranged in an array of 4×4. Moreover, because $w_T$ needs to be determined in the diagonal direction of the square, the above-described value is multiplied by $\sqrt{2}$ to give $\sqrt{2}w_T=2.12$ millimeters. Under this condition, the condition (3) is given by $$r_F > 28.1 \text{ millimeters}$$

Thus, $r_F$ was set to 30 millimeters ($r_F=30$ millimeters), thereby enabling filtering to be performed without loss of information.

Accordingly, it will be apparent that highly accurate feature transformation can be performed under this condition even if the size of the spatial light modulator 122 is small in comparison to the first embodiment, as stated above.

(Specific Example 2)

In this specific example, the number of vector components to be handled (i.e. the number of pixels in this case) is small in comparison to specific example 1. The lens array 402 was arranged in a square array as shown in FIG. 15 as in the case of specific example 1, and the vector displayed on the spatial light modulator 122 in the object vector input and display device 1 was also a square aperture. The vector display area had a size a of 3 millimeters. The number of vector components (pixels in this case) contained in the display area was set to k×k=64×64, and $k=k_d=k_R=64$. In this specific example also, a Gabor filter, which has already been described, was used as each filter constituting the filter array 502.

In the multiplexing optical system used in this specific example, the focal length of the second lens 310 for performing a Fourier transform was 80 millimeters ($f_F=80$ millimeters), and the wavelength of coherent light was 632.8 nanometers ($\lambda=632.8$ nanometers). Accordingly, to prevent pieces of Fourier transformed information concerning the multiplexed image from overlapping each other, the pitch p between the zero-order portions of Fourier transformed information concerning adjacent multiplex portions is determined from the condition (1) as follows:

$$p \geq 1.08 \text{ millimeters}$$

Suppose that detectors placed in the feature transform plane T to detect the results of feature transformation of the multiplexed object vector have a pitch of 20 micrometers, the value of the pitch limits the sampling pitch of transformed information in the feature transform plane T; $p_d=20$ micrometers. Further, the lens pitch $p_t$ of the inverse Fourier transform lens array 402 is determined from the condition (2) as follows:

$$p_t \geq 1.28 \text{ millimeters}$$

The focal lengths of the lens arrays 206 and 402 were both 26.7 millimeters ($f_T=26.7$ millimeters), and the size of each image detected in the feature transform plane T was 1.0 millimeter×1.0 millimeter. As each filter, a Gabor filter was used as in the case of the foregoing embodiment, and the maximum spatial frequency $\alpha_{max}$ was 9.7 line pairs per millimeter. Consequently, $\alpha_{max}f_F\lambda=0.489$ millimeter. The effective aperture $r_T$ of each lens element constituting the lens array 402 must satisfy the condition (3-4). Substituting the above-described values into the condition (3-4) gives $$r_T \geq 1.99 \text{ millimeters}$$

However, the effective aperture must be considered with regard to the diagonal direction of the square region of each transformed image as in the case of specific example 1. Accordingly, the condition is given by $r_T \geq 1.99 \times \sqrt{2} = 2.82$ millimeters. Since $p \geq r_T$ and $p_t=p$, $p \geq 2.82$ millimeters is given from the above-described three conditions. In this example, p was set to 3.0 millimeters (p=3.0 millimeters).

Regarding the condition (3) also, a value for $r_F$ was determined in the same way as in specific example 1. That is, $w_T$ was converted into a value in the diagonal direction ($\sqrt{2}w_T=1.0\times\sqrt{2}=1.414$) to obtain the following condition:

$$r_F > 17.95 \text{ millimeters}$$

Thus, $r_F$ was set to 20 millimeters ($r_F=20$ millimeters), thereby enabling filtering to be performed without loss of information.

Accordingly, it will be apparent that highly accurate feature transformation can be performed under this condition even if the size of the spatial light modulator 122 is small in comparison to the first embodiment, as stated above.

[Third Embodiment]

Figure 16:
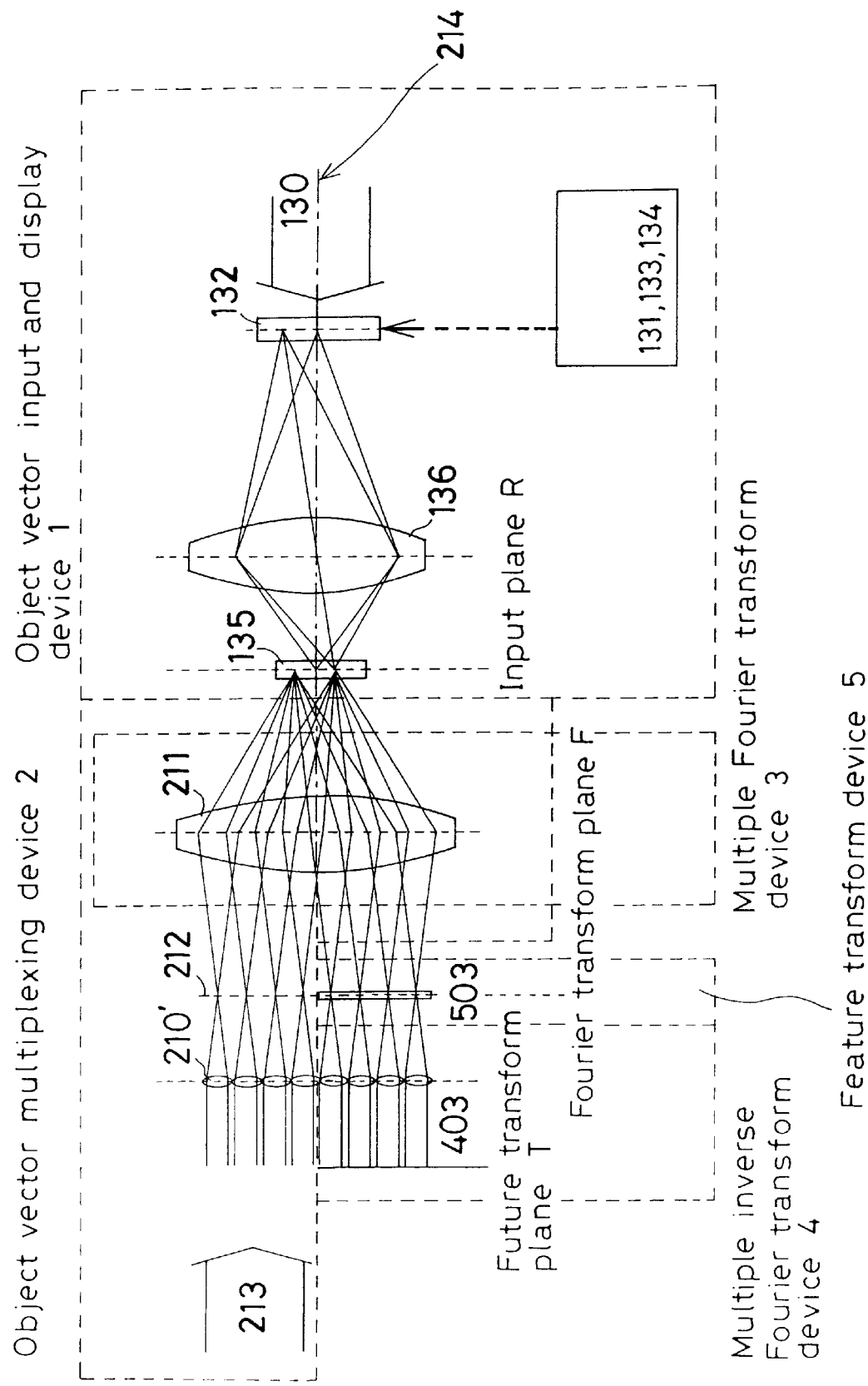
FIG. 16 is a sectional view of a feature vector transformation apparatus according to a third embodiment of the present invention.

As shown in the sectional view of FIG. 16, a feature vector transformation apparatus according to this embodiment has the same arrangement as that of the above-described feature vector transformation apparatus. In this embodiment, particularly, one form of the feature vector transformation apparatus where an image is processed as an object vector is shown. When compared to the second embodiment, this embodiment has the advantage that the overall size of the optical system can be reduced.

More specifically, an object vector input and display device 1 includes constituent elements (not shown) for producing an incoherent light beam 130, which are the same as those of the part for producing the incoherent light beam 105 in the object vector input and display device 1 according to the first embodiment. The object vector input and display device 1 further includes an image pickup device 131, e.g. a CCD camera, and an electrically addressed transmission type spatial light modulator 132, which is a liquid-crystal spatial light modulator in this embodiment. The object vector input and display device 1 further includes a controller 133 which is supplied with an input signal from the image pickup device 131 to generate a signal to display information on the spatial light modulator 132 through a driver 134. In addition, the object vector input and display device 1 includes an optically addressed reflection type spatial light modulator 135, which is similarly made of a liquid crystal, and an image-forming lens 136. The image-forming lens 136 is disposed such that the read surface of the spatial light modulator 132 and the write surface of the spatial light modulator 135 are placed in image-formation relation to each other.

Vector information (i.e. an image in this case) obtained by the image pickup device 131 is displayed on the transmission type spatial light modulator 132 through the controller 133 and the driver 134. The image displayed on the transmission type spatial light modulator 132 is read by the incoherent light beam 130, and the vector information is written through the image-forming lens 136 onto the write surface of the reflection type spatial light modulator 135, which is coincident with the image-formation plane of the lens 136.

An object vector multiplexing device 2 has the same arrangement as in the second embodiment. More specifically, a lens array 210' (206 in the second embodiment) and a first lens 211 (207 in the second embodiment) are disposed such that the back focal plane of the lens array 210' and the front focal plane of the first lens 211 are coincident with each other at a plane 212 (208 in the second embodiment), and that the back focal plane of the first lens 211 is coincident with the read surface of the spatial light modulator 135 (122 in the second embodiment). Beams of approximately parallel coherent light 213 (205 in the second embodiment) pass through the lens array 210' and converge to different points in the plane 212, which is the back focal plane of the lens array 210'. Thereafter, the beams enter the first lens 211 in the form of divergent beams of light. The divergent light beams entering the first lens 211 become approximately parallel light beams making various angles with an optical axis 214 and are superposed on one another in approximately the same region on the read surface of the spatial light modulator 135, which is coincident with the back focal plane of the first lens 211. Then, the light beams are reflected in various directions, bearing object vector information written onto the spatial light modulator 135.

In this embodiment, a multiple Fourier transform device 3 uses the first lens 211 in common with the object vector multiplexing device 2. The parallel light beams reflected in various directions are subjected to a Fourier transform in parallel and simultaneously by the first lens 211 to form Fourier transformed images in a Fourier transform plane F (coincident with the plane 212), which is the back focal plane of the first lens 211.

A feature transform device 5 and a multiple inverse Fourier transform device 4 are arranged in the same way as in the second embodiment. More specifically, the feature transform device 5 consists essentially of a filter array 503 having the number of filters which is equal to the number of pieces of Fourier transformed information. The filters of the filter array 503 are disposed in one-to-one correspondence to the pieces of Fourier transformed information. The feature transform device 5 performs a plurality of different filtering operations simultaneously on the image of the multiplexed object vector. Then, a plurality of pieces of filtered information are subjected to an inverse Fourier transform individually by a lens array 403 consisting essentially of inverse Fourier transform lens elements for performing a multiple inverse Fourier transform thereby forming the results of feature transformation of the multiplexed object vector in parallel and simultaneously in a feature transform plane T, which is the back focal plane of the lens array 403.

(Specific Example 1)

In this specific example, the input vector displayed by the spatial light modulators 132 and 135 in the object vector input and display device 1 was a square aperture, each side of which had a size a of 10.7 millimeters. The number of vector components (pixels in this case) contained in the square aperture was set to k×k=256×256, and k=$k_d$=$k_R$=256. Further, a Gabor filter, which has already been described, was used as each filter constituting the filter array 503.

Figure 17:
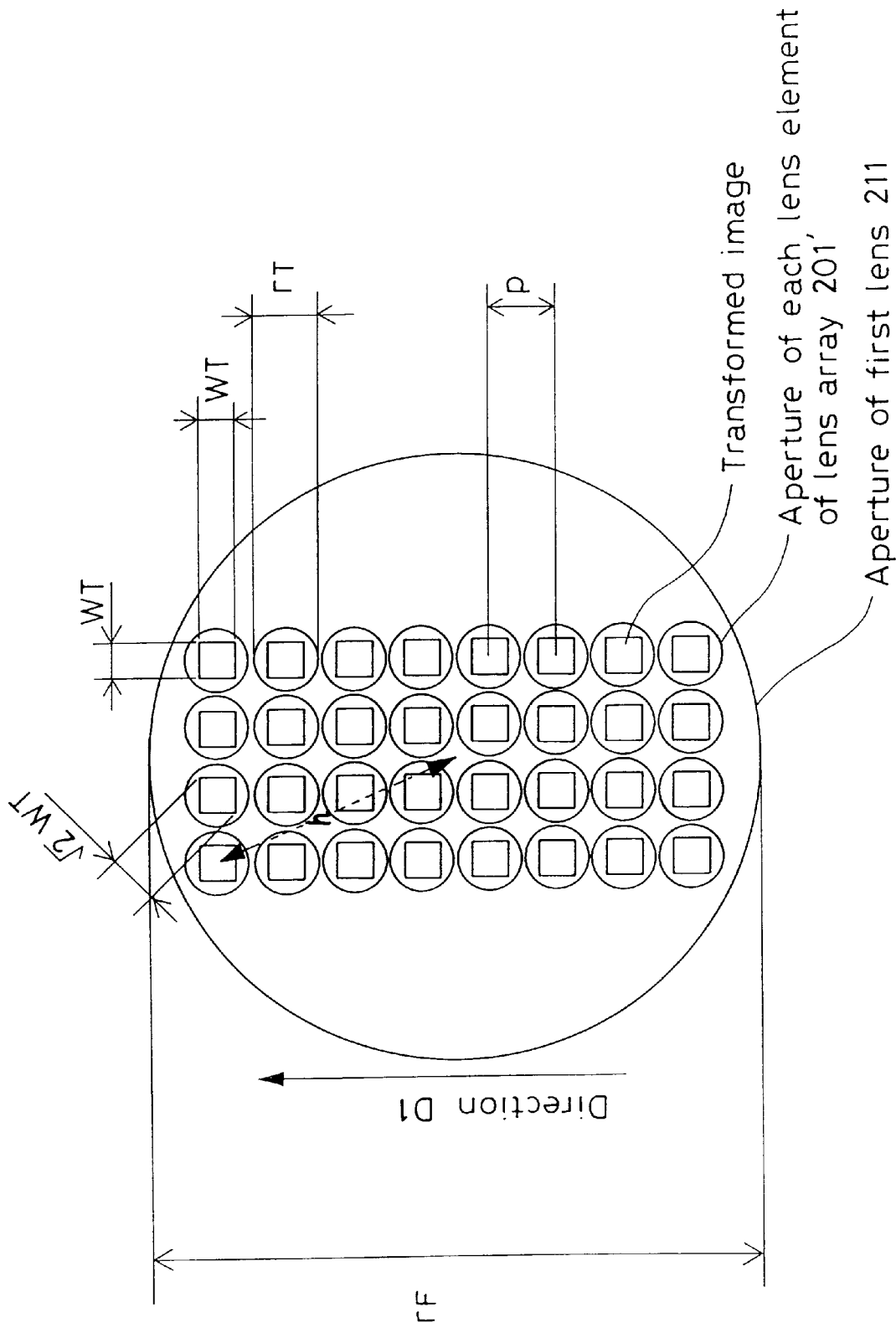
FIG. 17 shows a positional relationship among a lens array, a first lens, and transformed images in a specific example of the third embodiment.

In the multiplexing optical system used in this specific example, the focal length of the first lens 211 for performing a Fourier transform was set to 100 millimeters ($f_F$=100 millimeters); the wavelength of coherent light was 632.8 nanometers ($\lambda$=632.8 nanometers); the focal length of each of the lens elements constituting the lens arrays 210' and 403 was 18.7 millimeters ($f_T$=18.7 millimeters); and the size of each image detected in the feature transform plane T was 2.0 millimeters×2.0 millimeters ($w_T$=2.0 millimeters). As shown in FIG. 17, the lens arrays 210' and 403 were each arranged in a square array of 4×4. Let us discuss dimensions with regard to a direction in which the centers of each pair of adjacent lens elements in the lens array shown in FIG. 17 are the closest to each other, i.e. direction D1 in the figure, as in the case of the specific examples of the second embodiment. To prevent pieces of Fourier transformed information concerning the multiplexed image from overlapping each other, the pitch p between the zero-order portions of Fourier transformed information concerning adjacent multiplex portions is determined from the condition (1) as follows:

$$p \geq 1.52 \text{ millimeters}$$

Suppose that detectors placed in the feature transform plane T to detect the results of feature transformation of the multiplexed object vector have a pitch of 10 micrometers, the value of the pitch limits the sampling pitch of transformed information in the feature transform plane T; $p_d$=10 micrometers. Further, the lens pitch $p_t$ of the inverse Fourier transform lens array 403 is determined from the condition (2) as follows:

$$p_t \geq 2.56 \text{ millimeters}$$

A Gabor filter is used as each filter as in the case of the foregoing embodiments, and the maximum spatial frequency $\alpha_{max}$ is 10.8 line pairs per millimeter; therefore, $\alpha_{max}f_F\lambda$=0.6863 millimeter.

The effective aperture $r_T$ of each lens element of the lens arrays 210' and 403 must satisfy the condition (3-4). Substituting the above-described values into the condition (3-4) gives $$r_T \geq 3.374 \text{ millimeters}$$

As has been stated in the specific examples of the second embodiment, it is necessary to consider dimensions in the diagonal direction of the square region of each transformed image when arranging circular lens elements. Therefore, the condition for $r_T$ must be converted to $r_T \geq 3.374 \times \sqrt{2}$=4.772 millimeters. Since $p \geq r_T$ and $p_t$=p, $p \geq 4.772$ millimeters is given from the above-described three conditions. In this example, p was set to 5 millimeters (p=5 millimeters).

Next, a value for $r_F$ is determined on the basis of the condition (3). The distance h from the optical axis 214 to the center of that lens element in each of the lens arrays 210' and 403 which is the farthest from the optical axis 214 is given by h=$\sqrt{58}$×p/2 because two square arrays each having 4×4 lens elements are disposed on both sides, respectively, of the optical axis 214. Moreover, because $w_T$ in the condition (3)

also needs to be considered in the diagonal direction, the above-described value is multiplied by $\sqrt{2}$ to give $\sqrt{2}w_T=2.0\times\sqrt{2}=2.828$ millimeters. Under this condition, the condition (3) is given by $r_F>54.59$ millimeters Thus, $r_F$ was set equal to 55 millimeters ($r_F=55$ millimeters), thereby enabling filtering to be performed without loss of information.

Accordingly, it will be apparent that the size of the optical system can be reduced in comparison to the second embodiment, and moreover, highly accurate feature transformation can be performed, as stated above.

(Specific Example 2)

In this specific example, the number of vector components to be handled (i.e. the number of pixels in this case) is small in comparison to specific example 1. The lens arrays 210' and 403 were integrally arranged in an array of 4×8. The vector displayed on the spatial light modulators 132 and 135 in the object vector input and display device 1 was also a square aperture. The vector display area was 0.5 millimeter×0.5 millimeter (a=0.5 millimeter). The number of vector components (pixels in this case) contained in the display area was set to k×k=50×50, and k=$k_d$=$k_R$=50. In this specific example also, a Gabor filter, which has already been described, was used as each filter constituting the filter array 503.

In the multiplexing optical system used in this specific example, the focal length of the first lens 211 for performing a Fourier transform was 15 millimeters ($f_F$=15 millimeters). The focal lengths of the lens arrays 210' and 403 were both 20 millimeters ($f_T$=20 millimeters), and the wavelength of coherent light was 632.8 nanometers ($\lambda$=632.8 nanometers). Here, let us consider dimensions with regard to direction D1 in FIG. 17, in which the distance between the centers of each pair of adjacent lens elements of the lens array is the smallest, as in the case of specific example 1. To prevent pieces of Fourier transformed information concerning the multiplexed image from overlapping each other, the pitch p between the zero-order portions of Fourier transformed information concerning adjacent multiplex portions is determined from the condition (1) as follows:

$p \geq 0.95$ millimeter

Suppose that detectors placed in the feature transform plane T to detect the results of feature transformation of the multiplexed object vector have a pitch of 5 micrometers, the value of the pitch limits the sampling pitch of transformed information in the feature transform plane T; $p_d$=5 micrometers. Further, the lens pitch $p_t$ of the inverse Fourier transform lens array 402 is determined from the condition (2) as follows:

$p_t \geq 0.25$ millimeter

The focal lengths of the lens arrays 210' and 403 were both 20.0 millimeters, and the size of each image detected in the feature transform plane T was 0.67 millimeter×0.67 millimeter ($w_T$=0.67 millimeter). As each filter, a Gabor filter was used as in the case of the above-described specific examples, and the maximum spatial frequency $\alpha_{max}$ was 45.32 line pairs per millimeter. Consequently, $\alpha_{max}f_F\lambda$= 0.430 millimeter. The effective aperture $r_T$ of each lens element constituting the lens arrays 210' and 403 must satisfy the condition (3-4). Substituting the above-described values into the condition (3-4) gives $r_T \geq 1.528$ millimeters However, the effective aperture must be considered with regard to the diagonal direction of the square region of each transformed image as in the case of the above-described specific examples. Accordingly, the condition is given by $r_T \geq 1.528\times\sqrt{2}=2.17$ millimeters. Since $p \geq r_T$ and $p_t$=p, $p \geq 2.17$ millimeters is given from the above-described three conditions. In this example, p was set to 2.5 millimeters (p=2.5 millimeters).

Regarding the condition (3) also, a value for $r_F$ was determined in the same way as in specific example 1. That is, the condition (3) was calculated on the basis of $\sqrt{2}w_T=0.67\times\sqrt{2}=0.9475$ millimeter to obtain the following condition:

$r_F>24.42$ millimeters

Thus, $r_F$ was set to 30 millimeters ($r_F$=30 millimeters), thereby enabling filtering to be performed without loss of information.

Accordingly, it will be apparent that the size of the optical system can be reduced in comparison to the second embodiment, and moreover, highly accurate feature transformation can be performed, as stated above.

The following fourth to seventh embodiments each relate to a recognition and classification system according to the present invention, which uses a feature vector detecting and transmitting apparatus for performing data transformation on feature vector information transformed by a feature vector transformation apparatus as stated above and for transmitting transformed data to a recognition and classification device in the subsequent stage, and a recognition and classification device for performing recognition and classification on the basis of the data transmitted from the feature vector detecting and transmitting apparatus.

A feature vector transformation apparatus used in recognition and classification systems shown in the following embodiments is one of the feature vector transformation apparatuses according to the above-described first to third embodiments. The feature vector detecting and transmitting apparatus 22 includes, as shown in FIG. 1, a feature vector selecting device 7 for selecting vector information to be acquired from among data obtained from the feature vector transformation apparatus, and a feature vector detecting device 6 for detecting the data obtained from the feature vector transformation apparatus or the data selected by the feature vector selecting device 7. The feature vector detecting and transmitting apparatus 22 further includes a feature vector transmitting device 8 for transmitting the data selected by the feature vector selecting device 7 to a recognition and classification device 9. The recognition and classification system 23 performs recognition and classification by the recognition and classification device 9 on the basis of the data transmitted from the feature vector detecting and transmitting apparatus 22.

[Fourth Embodiment]

Figure 18:
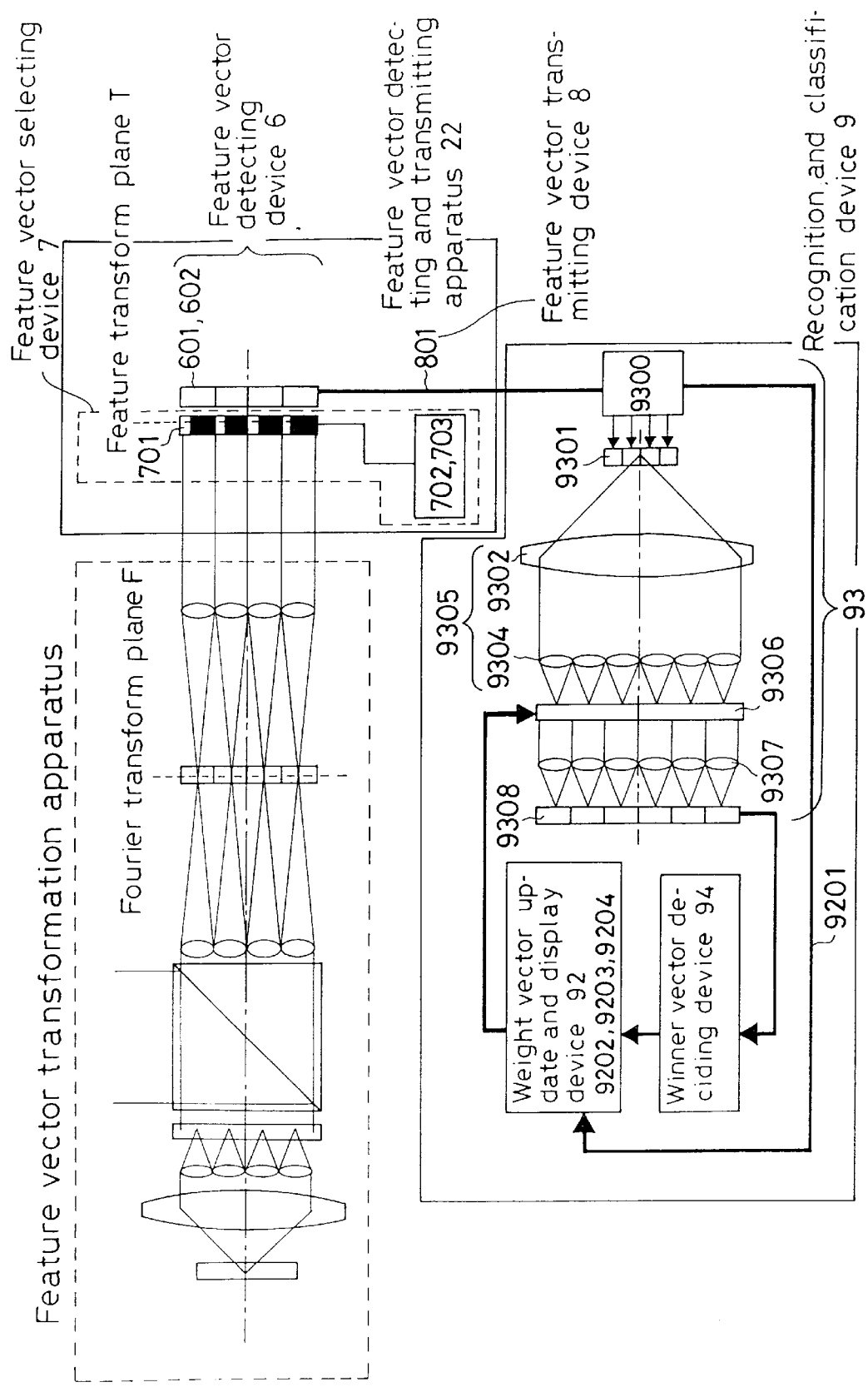
FIG. 18 is a sectional view of a recognition and classification system according to a fourth embodiment of the present invention.

As shown in the sectional view of FIG. 18, a recognition and classification system according to this embodiment uses, as a feature vector transformation apparatus, the apparatus (FIG. 8) according to specific example 1 of the first embodiment. Feature vectors transformed by the feature vector transformation apparatus are transmitted by the feature vector detecting and transmitting apparatus 22 to the recognition and classification device 9, which includes a weight vector update and display device 92, a similarity matching device 93, and a winner vector deciding device 94. In the recognition and classification device 91 recognition and classification are performed by executing a competitive learning type neural network algorithm.

In the feature vector detecting and transmitting apparatus 22, the feature vector selecting device 7 includes a shutter array 701 (transmission type electrically addressed spatial light modulator made of a ferroelectric liquid crystal in this embodiment) in which each individual shutter can be opened and closed two-dimensionally by an electric signal, and a combination of a controller 702 and a driver 703, which are used to control the shutter array 701. The feature vector detecting device 6 includes a photodetector array 601 and a current-voltage converter amplifier circuit 602. The feature vector transmitting device 8 consists essentially of an interface 801 for data transmission.

As has been stated in the section for describing devices for solving the above-described problems, the function of the feature vector detecting and transmitting apparatus is to select and detect only a feature quantity with respect to an arbitrary region of object vector information from the corresponding portion of each multiplex portion, where a feature vector transformed by filtering has been formed, and to transmit the detected feature quantity to the recognition and classification device 9 in the subsequent stage, thereby attaining the object of the present invention. In the feature vector transformation apparatus, information (image in this case) filtered by the 4×4 filter array, which has been described in connection with FIG. 11, is formed as 4×4 different pieces of information in the feature transform plane T, as has been described in connection with FIG. 8. To serve this function, a transmission type electrically addressed spatial light modulator is disposed as the shutter array 701 in the feature transform plane T, and the 4×4 photodetector array 601 is disposed immediately behind the shutter array 701. The transmission type shutter array 701 is operated by using the controller 702 and the driver 703 such that information concerning a region corresponding to an arbitrary region of the object vector information is selected from the corresponding portion of each multiplex portion, where a feature vector transformed by filtering has been formed, and only the selected information is transmitted. Thus, only pieces of information passing through the regions selected by the transmission type spatial light modulator 701 enter the photodetector array 601, which constitutes the feature vector detecting device 6, and are detected as intensity values (see FIG. 7).

In this embodiment, the photodetector array 601 is formed by arranging silicon photodetectors in an array. Therefore, each feature quantity detected is photoelectrically converted by each photodetector to become a current value proportional to the intensity. In this embodiment, the current-voltage converter amplifier circuit 602, which is formed by using an operational amplifier, etc., is connected to each photodetector so that a voltage proportional to the feature quantity is finally obtained. With the above-described arrangement, information concerning only a region corresponding to an arbitrary region of the object vector information can be selected from the corresponding portion of each multiplex portion, where a feature vector transformed by filter has been formed, and obtained as a voltage value. The selected information is electrically transmitted to the recognition and classification device 9 in the subsequent stage by the interface 801 of the feature vector transmitting device 8.

The recognition and classification device 9 performs recognition and classification by executing a competitive learning type neural network algorithm on the basis of the transmitted information. As an example of the competitive learning type neural network algorithm, an algorithm using a self-organizing feature map is shown in this embodiment.

Figure 19:
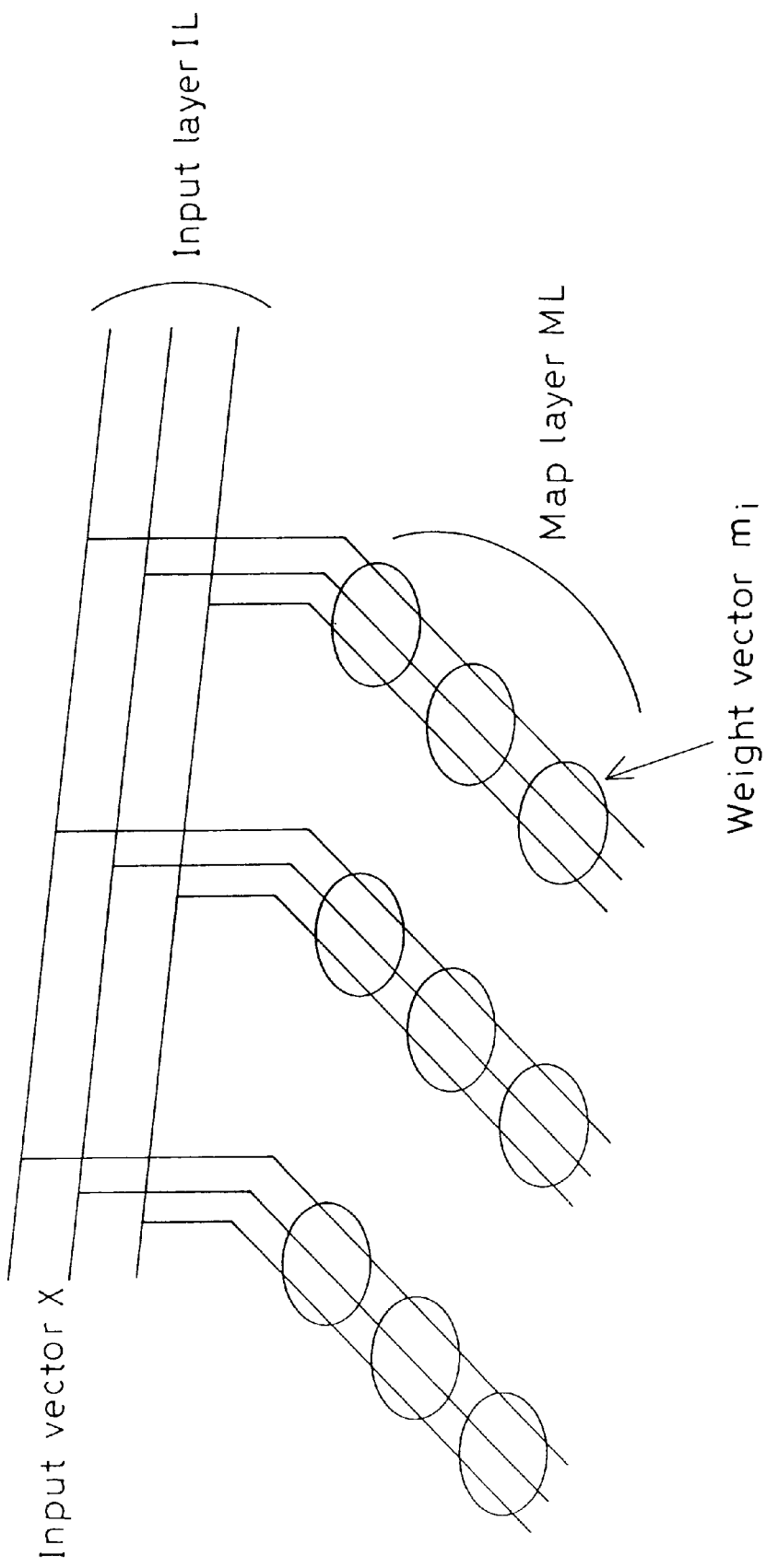
FIG. 19 is a schematic view for describing a self-organizing feature map.

First of all, the self-organizing feature map will briefly be described below. As shown in FIG. 19, the self-organizing feature map (hereinafter referred to as "SOM") consists essentially of a layer ML (hereinafter referred to as "map layer ML") of elements arranged two-dimensionally, and an input layer IL for inputting data. Although in FIG. 19 the map layer ML has two-dimensionally arranged elements it is also possible to use one-dimensionally arranged elements. The input layer IL is connected to all the elements of the map layer ML, so that input data can be given to all the elements of the map layer ML. Input data may either scalar or vector data. Here, a vector X (n-dimensional) is used as general input data. It is assumed that the map layer ML has elements i (i denotes the order on the map; the total number of elements is k), and that every element has a weight vector $m_i$ (n-dimensional). The SOM algorithm is divided into <similarity matching> in which a weight vector to be updated is decided from similarity between the input vector X and the weight vector $m_i$ of each element, and <update> in which the weight vector $m_i$ is made to approach the input vector X. By repeating the two operations, a weight vector $m_i$ ($1 \leq i \leq k$) which reflects the distribution of the input vector X is produced. Specific equations expressing <similarity matching> and <update> are as follows:

<Similarity matching>

$$|X - m_c| = \min_i |x - m_i| \qquad (7)$$

<Update>

$$m_i(t+l) = m_i(t) + \alpha(t) \ \{X(t) - m_i(t)\} \qquad (8)$$

$$\text{for } i \in N_c$$

$$m_i(t+l) = m_i(t) \qquad \text{for } i \notin N_c$$

where $|X-m_i|$ is the Euclidean distance between X and $m_i$; c is the element having the smallest Euclidean distance (winner element); $N_c$ is a neighborhood of the winner element on the map layer ML; $\alpha(t)$ is a positive constant; and t is time.

While update is repeated, the size of $\alpha(t)$ and $N_c$ are gradually made smaller. A value for $\alpha(t)$ may be selected so as to decrease with distance from the winner element c. It is also possible for the similarity matching operation to use the inner product as follows:

$$X \cdot m_c = \max_i X \cdot m_i \qquad (9)$$

It will be understood from the foregoing description that the recognition and classification system should decide a winner element in the competitive learning process by executing an inner product similarity matching operation according to equation (9) on the basis of information transmitted from the feature vector detecting and transmitting apparatus and then execute a weight vector updating operation based on equation (8).

More specifically first, information transmitted from the feature vector detecting and transmitting apparatus 22 is inputted to an LED driver 9300 in the similarity matching device 93, and an LED array 9301 is caused to emit light such that the input information is proportional to the brightness by controlling the LED driver 9300. In this way, the information transmitted from the feature vector detecting and transmitting apparatus 22 is entered into the recognition and classification device 9. In this embodiment, the LED array 9301 has the number of elements which is equal to the number of photodetectors of the photodetector array 601, i.e. 4×4 elements. The elements constituting the LED array 9301 are arranged in the same way as in the photodetector array 601. A light beam emitted from the LED array 9301, bearing the information transmitted from the feature vector detecting and transmitting apparatus 22, passes through a multiple image-forming optical system 9305 including an image-forming lens 9302 and a lens array 9304. The lens array 9304 has the number of lens elements which is equal to the number of elements of the neural network. Consequently, the number of multiplex images which corresponds to the multiplex level of the lens array 9304 are formed on the display surface of a spatial light modulator 9306. The image-forming lens 9302 and the lens array 9304 are disposed such that the light-emitting surface of the LED array 9301 is coincident with the front focal point of the image-forming lens 9302, and that the display surface of the spatial light modulator 9306 is coincident with the back focal point of the lens array 9304, and further that the optical axis of each lens element constituting the lens array 9304 is parallel to the optical axis of the image-forming lens 9302. In this embodiment, the spatial light modulator 9306 is an electrically addressed transmission read type liquid-crystal spatial light modulator whose transmittance changes with the applied voltage. Thus, the feature vector information is multiplexed to form the number of pieces of information which is equal to the number of elements constituting the neural network, and then weight vector information, which is displayed on the spatial light modulator 9306 by a signal from the weight vector update and display device 92, is superimposed on each piece of feature vector information. Further, light beams bearing the feature vector information from the spatial light modulator 9306 are converged through a lens array 9307 having the same number of lens elements as that of the lens array 9304, which are arranged in the same way as in the lens array 9304. Thus, the inner product is calculated for each element. The result of the inner product operation is detected by a detector array 9308 having the same number of photodetectors as that of the lens array 9304, which are arranged in the same way as in the lens array 9304. Each detected value is converted into a voltage value by an operational amplifier or the like and transmitted to the winner vector deciding device 94.

Next, the process of calculating the inner product by the above arrangement will be described with reference to FIG. 20. If the input vector X is developed into a two-dimensional vector having N×N elements and the weight vector is developed into M×M (corresponding to the number of elements of the neural network) submatrices each having N×N elements, the inner product part of equation (9) may be rewritten for each component as follows:

$$y_{kl} = m_{kl} \cdot X = \sum_{i,j} m_{klij} X_{ij} \quad (10)$$

$$(i, j = 1, ..., N, \text{ and } k, l = 1, ..., M)$$

Suppose, for explanatory simplicity, N=3 and M=2, the part of the similarity matching device 93 may be written schematically as shown in FIG. 20. That is, the feature vector having 3×3 elements, which is inputted to the LED array 9301, is passed through the multiple image-forming optical system 9305, which includes the image-forming lens 9302 and the lens array 9304, whereby 2×2 (corresponding to the multiplex level of the lens array 9304) reproductions of the feature vector are obtained on the display surface of the spatial light modulator 9306 [see the part (a) of FIG. 20]. Further, pieces of weight vector information [see the part (b) of FIG. 20] are superimposed on the reproductions of the feature vector, respectively. Further, light beams emanating from the spatial light modulator 9306 are individually converged on the lens array 9307. Thus, the inner product is calculated for each element of the neural network. More specifically, the result of processing of each matrix element will be shown below with respect to the component $Y_{21}$; in the processing, the superposition is multiplication, and the convergence of light is addition:

$$\begin{aligned} y_{21} &= x_{11}m_{2111} + X_{12}m_{2112} + X_{13}m_{2113} + \\ &\quad X_{21}m_{2121} + X_{22}m_{2122} + X_{23}m_{2123} + \\ &\quad X_{31}m_{2131} + X_{32}m_{2132} + X_{33}m_{2133} \\ &= \sum_{j=1}^{3} x_{1j}m_{211j} + \sum_{j=1}^{3} X_{2j}m_{212j} + \sum_{j=1}^{3} X_{3j}m_{213j} \\ &= \sum_{i,j=1}^{3} X_{ij}m_{21ij} \end{aligned} \quad (11)$$

Thus, the inner product of the neuron element corresponding to the component (2,1) is calculated. Similar calculation can be performed with respect to the other components; therefore, the total is given by $$y_{kl} = m_{kl} \cdot X = \sum_{i,j=1}^{3} m_{klij} x_{ij} \quad (k, l = 1, 2) \quad (12)$$

Accordingly, it will be understood that the inner product in expression (10) where N=3 and M=2 is certainly calculated. Although in the above optical system the processing has been described with regard to a case where N=3 and M=2, for the sake of simplicity, it should be noted that it is possible in the above-described optical system to select any desired array arrangement for the lens arrays, the input vector, and the weight vector. It will be apparent that, in such a case also, the condition (10) is satisfied.

The winner vector deciding device 94 is supplied with the result of the inner product operation for each individual neuron element, which is outputted from the detector array 9308 in the similarity matching device 93. The winner vector deciding device 94 decides a neuron element having the largest output as a winner element, and transmits information concerning the winner element to the weight vector update and display device 92. The weight vector update and display device 92 updates the weight vector according to the update rule expressed by equation (8). In this system, the weight vector update and display device 92 and the winner vector deciding device 94, which perform competitive learning, are realized on an identical computer. Of the two devices, the winner vector deciding device 94 includes a transfer part for taking in each individual output voltage delivered from the detector array 9308 in the similarity matching device 93 after converting the output voltage into digital data, and a computer loaded with software for comparing the results of the AD conversion of the output voltages from the detector array 9308 to select a neuron element showing the highest voltage as a winner element. The weight vector update and display device 92 includes a transfer part 9201 for taking in information from the two-dimensional photodetector array 601 after converting it into digital data, and a computer loaded with software for updating the weight vector according to the update rule expressed by equation (8) by using the information concerning the winner element decided by the winner vector deciding device 94 and the information concerning the feature vector from the two-dimensional photodetector array 601. The computer is identical with the above-described computer, which is loaded with software for selecting a winner element. The weight vector update and display device 92 further includes a combination of a memory 9202, a controller 9203, and a driver 9204 for inputting and displaying information concerning the updated weight vector on the spatial light modulator 9306. In this case, it is even more desirable to input and display the weight vector on the spatial light modulator 9306 after normalizing it. The weight vector becomes stabilized at an appropriate point during the competitive learning process, in which an operation of successively inputting data concerning an arbitrary region from the feature vector detecting and transmitting apparatus and updating the weight vector is repeated, and a similar operation is also carried out for another object vector. Therefore, the learning should be stopped when the weight vector becomes stabilized.

In the recognition and classification process after the learning process, a vector as an object to be identified is inputted with the weight vector fixed, and only information concerning a desired portion is selected from the information transformed by the feature vector transformation apparatus, and transmitted by the feature vector detecting and transmitting apparatus 22 to the recognition and classification device 9, in which a class to which the desired portion belongs is decided according to which photodetector in the detector array 9308 becomes a winner element. If the number of elements is 36 (6×6) as shown in FIG. 20, classification may be made such that the object is placed in one of 36 different classes represented by the individual elements. Alternatively, the 36 elements may be divided into two regions, one consisting of 30 elements, and the other consisting of 6 elements, so that the object falls within either of two classes. Thus, classes may be set as desired in conformity to each particular object by software at the time of learning. If it is desired to classify the whole image, classification may be similarly made with respect to the whole image by successively transmitting data from the feature vector detecting and transmitting apparatus 22. It should be noted that, for the initial setting of the weight vector, a string of data generated at random is displayed. It is even more desirable to provide the recognition and classification device 9 with parts for normalizing data transmitted from the feature vector detecting and transmitting apparatus 22 and for newly adding norm information lost during normalization.

In this embodiment, as has been described above, data serving the purpose of the present invention is selected and detected from the feature vector, which has been transformed by the feature vector transformation apparatus as stated above, by using the feature vector detecting and transmitting apparatus and the detected data is transmitted to the recognition and classification device in the subsequent stage. Therefore, it is possible to provide a competitive learning type recognition and classification system capable of recognition and classification at high speed and with extremely high accuracy.

Figure 21A:
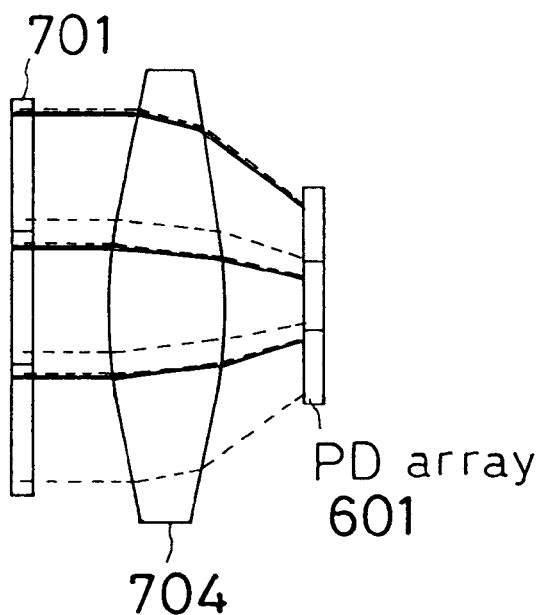
FIGS. 21(a) and 21(b) are sectional views each showing an essential part of a modification of the fourth embodiment.
Figure 21B:
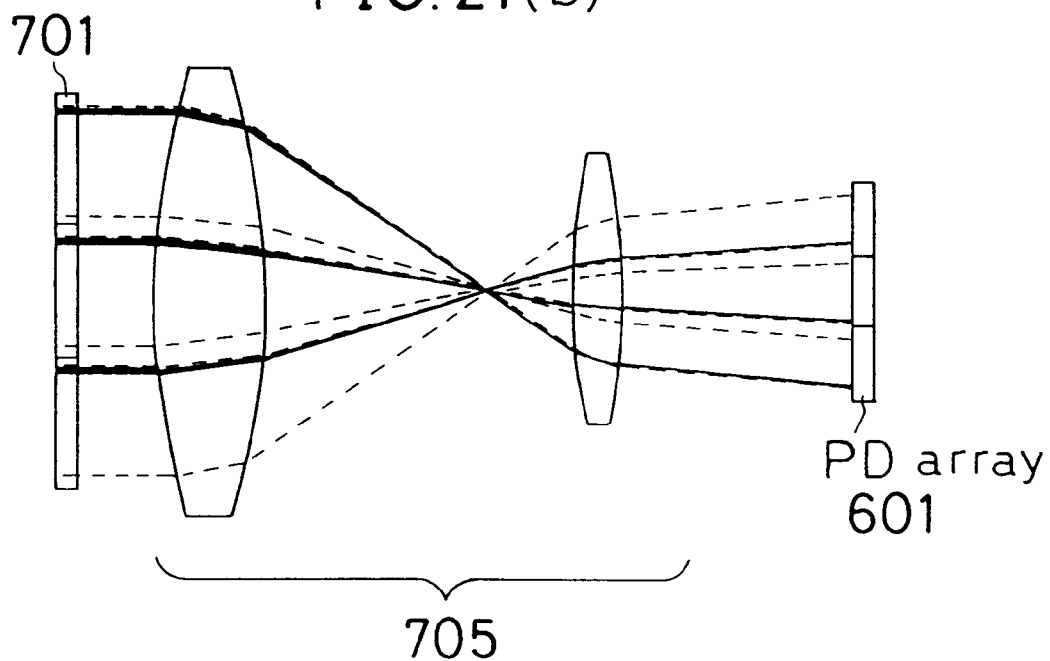

A modification of this embodiment will be described below. As shown in FIGS. 21(*a*) and 21(*b*), a lens 704 or a demagnification optical system 705 is disposed behind the shutter array 701 of the feature vector selecting device 7 in the feature vector detecting and transmitting apparatus 22, thereby making it unnecessary to match the size and pitch of the photodetector array 601 with the size of the transmission type spatial light modulator 701 and the pitch between adjacent images obtained as a result of filtering. Accordingly, a size of the photodetector array 601 can be selected from a wider range of choices, and the production of the system is facilitated.

[Fifth Embodiment]

Figure 22:
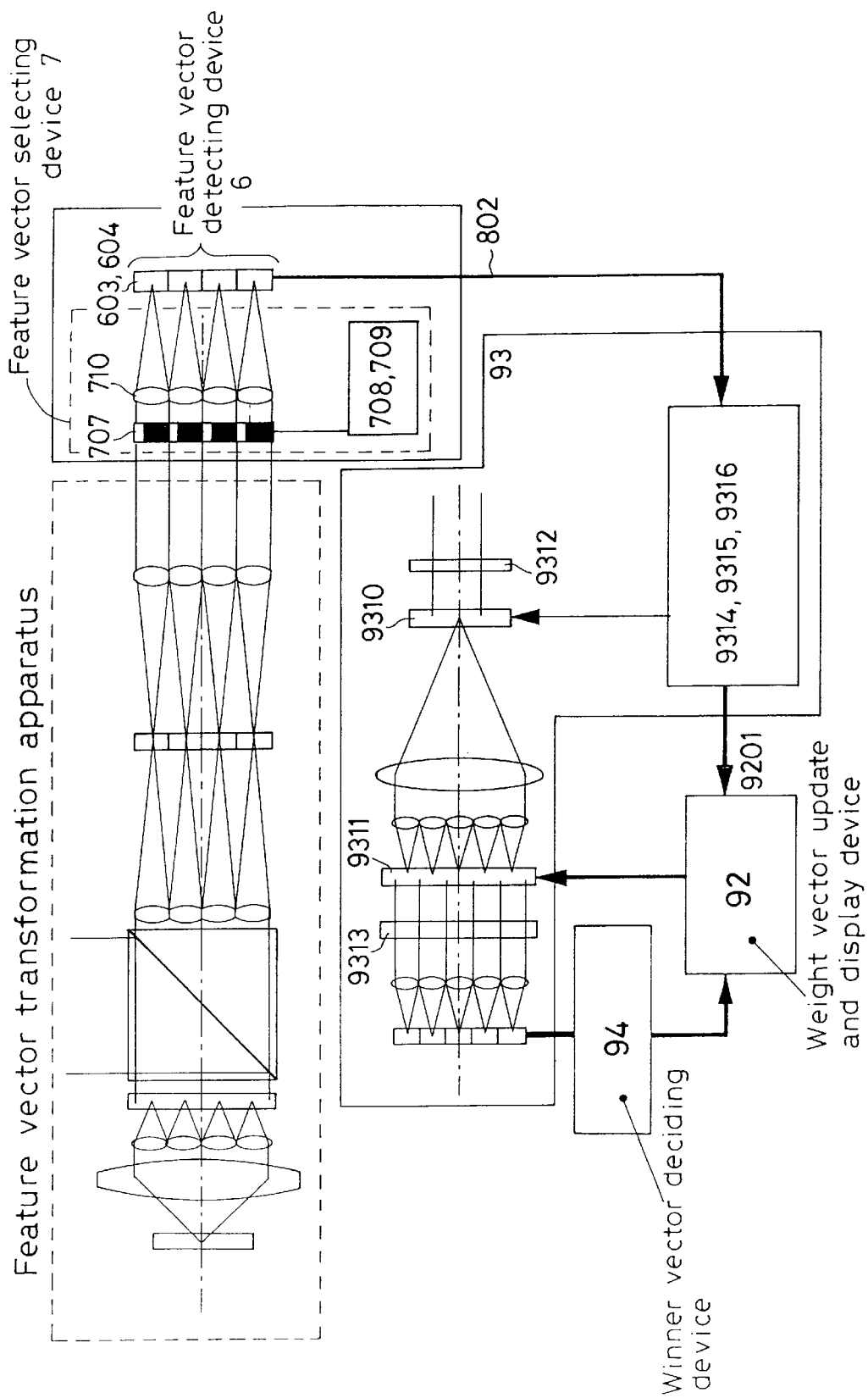
FIG. 22 is a sectional view of a recognition and classification system according to a fifth embodiment of the present invention.

A fifth embodiment will be described with reference to FIG. 22. This embodiment differs from the fourth embodiment in that the feature vector detecting and transmitting apparatus uses a lens array in the feature vector selecting device 7, thereby making it possible to reduce a sensitivity error due to variation in the light-receiving position of each photodetector used in the feature vector detecting device 6, and that the recognition and classification device 9 performs calculation to obtain a degree of similarity by replacing the inner product processing in the similarity matching device 93 with exclusive NOR operation or exclusive OR operation. The other portions of this embodiment are all arranged in the same way as in the fourth embodiment.

More specifically, the feature vector selecting device 7 in the feature vector detecting and transmitting apparatus 22 includes a transmission type electrically addressed spatial light modulator serving as a shutter array 707. The feature vector selecting device 7 further includes a combination of a controller 708 and a driver 709 for controlling the shutter array 707, and a lens array 710. The feature vector detecting device 6 includes a photodetector array 603 and a current-voltage converter amplifier circuit 604. This embodiment differs from the fourth embodiment in that the lens array 710 is disposed behind the transmission type spatial light modulator 707 in such a manner that each lens element corresponds to one multiplex portion, and that the photodetector array 603 is disposed in the vicinity of the back focal point of the lens array 710. With this arrangement, light beams entering the lens array 710 substantially converge in the vicinity of the focal point of the lens array 710. Thus, light bearing a selected part of a transformed image can be received in the vicinity of the center of each photodetector. Therefore, it is possible to reduce a sensitivity error due to variation in the light-receiving position. Accordingly, the accuracy of data transmitted to the recognition and classification device 9 increases, and the correct recognition rate increases.

In the recognition and classification device 9, the LED array 9301 and the LED driver 9300 are removed from the similarity matching device 93 in the fourth embodiment, and a spatial light modulator 9310 is disposed in place of the LED array 9301. The spatial light modulator 9310 and a spatial light modulator 9311 for displaying the weight vector are each formed by using a transmission read type electrically addressed spatial light modulator without a polarizer, which is made of a TN liquid crystal. Further, as shown in FIG. 22, a pair of polarizer 9312 and analyzer 9313 are disposed outside the spatial light modulators 9310 and 9311. Exclusive NOR or exclusive OR is calculated by disposing the polarizer 9312 and the analyzer 9313 in cross Nicol or parallel Nicol relation to the orientation of the liquid crystal constituting the spatial light modulators 9310 and 9311. Thus, a degree of similarity can be calculated even more accurately. The similarity matching device 93 is additionally provided with a combination of a threshold value circuit 9314, a driver 9315, and a controller 9316 for writing information transmitted from the feature vector detecting and transmitting apparatus 22 to the spatial light modulator 9310 after binalizing it. The weight vector update and display device 92 is also additionally provided with parts for updating the weight vector and displaying it after binalization. The arrangement of the rest of this embodiment is the same as in the fourth embodiment except that exclusive NOR or exclusive OR is used to calculate a degree of similarity. Therefore, a description of the operation of this embodiment is omitted.

With the above arrangement, this embodiment can decide a winner element by using a feature vector of high accuracy, which is obtained by the above-described feature vector detecting and transmitting apparatus and calculating a degree of similarity using exclusive NOR or exclusive OR. Accordingly, it is possible to provide a competitive learning type recognition and classification system which serves the purpose of the present invention and is capable of performing recognition and classification at high speed and with increased accuracy.

[Sixth Embodiment]

Figure 23:
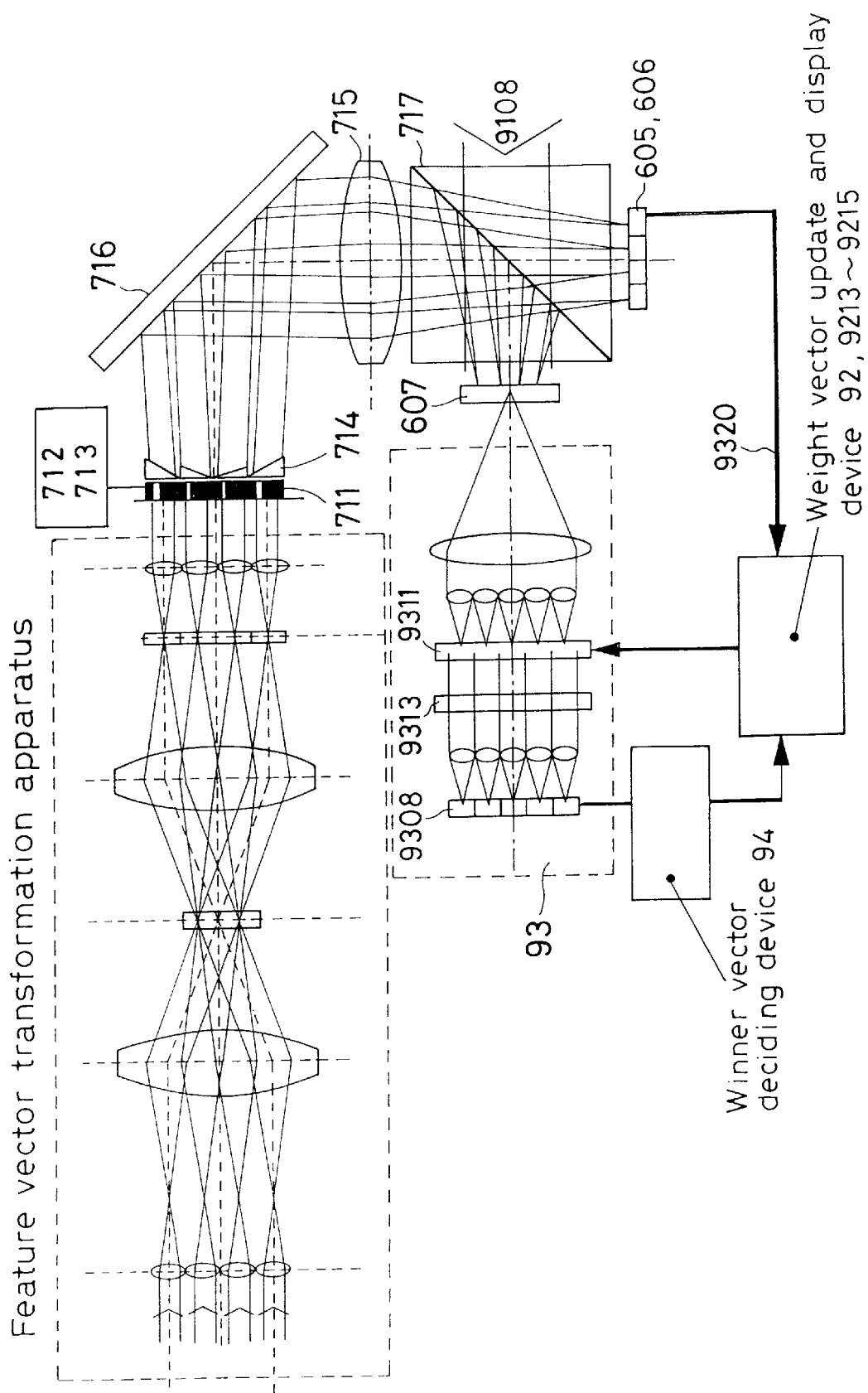
FIG. 23 is a sectional view of a recognition and classification system according to a sixth embodiment of the present invention.

A sixth embodiment will be described with reference to FIG. 23. As will be clear from the figure, the feature vector transformation apparatus according to the second embodiment (FIG. 14) is used in this embodiment. In the feature vector detecting and transmitting apparatus 22, a prism array and a lens are used in the feature vector selecting device 7, thereby extending the range of choice of detectors used in the feature vector detecting device 6, etc. as in the case of the foregoing embodiment. Regarding the recognition and classification device 9, this embodiment differs from the foregoing embodiment in that an optically addressed spatial light modulator is used to thereby enable information from the feature vector detecting and transmitting apparatus 22 to be transmitted and processed directly by an optical method.

More specifically, the feature vector selecting device 7 in the feature vector detecting and transmitting apparatus 22 includes an electrically addressed transmission type spatial light modulator serving as a shutter array 711, and a combination of a controller 712 and a driver 713 for controlling the shutter array 711. The feature vector transmitting device 8 includes a prism array 714, and a lens 715 having a pupil diameter sufficiently large to accept all light beams emanating from the prism array 714, and further includes a mirror 716 and a beam splitter 717. The feature vector detecting device 6 consists essentially of an optically addressed transmission read type liquid-crystal spatial light modulator 607. The prism array 714 is disposed behind the shutter array 711. The prism array 714 has the number of prisms which corresponds to the number of multiplex portions. The lens 715 is disposed behind the prism array 714 with the mirror 716 interposed therebetween. Only information selected and transmitted through the spatial light modulator 711 passes through each prism of the prism array 714. Each light beam bearing the selected information is bent as it passes through the corresponding prism, and the bent light beam is reflected by the mirror 716 to reach the lens 715. Each light beam emanating from the lens 715 enters the beam splitter 717 where a part of each light beam is reflected to enter the optically addressed spatial light modulator 607, which is disposed in the vicinity of the focal point of the lens 715. Light beams passing through the beam splitter 717 enter a two-dimensional detector 605 and are detected by it. In other words, the information selected and transmitted through the shutter array 711 is written onto the spatial light modulator 607. In this case, the tilt angle of each individual prism constituting the prism array 714 and the focal length of the lens 715 can be set so as to match the size and resolution of the optically addressed spatial light modulator 607. Thereforer the range of choice of a spatial light modulator, etc. extends.

In the recognition and classification device 9, information written onto the spatial light modulator 607, which serves as the feature vector detecting device 6 in the feature vector detecting and transmitting apparatus 22, is read by a coherent light beam 9108 produced by the same arrangement as in the foregoing embodiment, thereby enabling the information to be entered and processed in the similarity matching device 93. Further, information selected and transmitted by the feature vector detecting and transmitting apparatus 22 is detected by the two-dimensional detector 605, which is installed at a position corresponding to the spatial light modulator 607 in the transmission direction of the beam splitter 717. The detected information is converted into a voltage value by a current-voltage converter amplifier circuit 606 and transmitted to the weight vector update and display device 92 by a transfer part 9320. The weight vector update and display device 92 includes a combination of a memory 9213, a controller 9214, and a driver 9215 for displaying weight vector information on the spatial light modulator 9311. With the described arrangement, the same function as that in the fourth embodiment is attained. The other portions are all arranged in the same way as in the fourth embodiment, and the operations of these portions are the same as in the fourth embodiment. Therefore, a description thereof is omitted.

By virtue of the above-described arrangement, it is possible according to this embodiment to transmit at high speed feature vectors of high accuracy obtained by the feature vector detecting and transmitting apparatus as stated above and to process the feature vectors in the recognition and classification device. Accordingly, it is possible to provide a competitive learning type recognition and classification system which serves the purpose of the present invention and is capable of performing recognition and classification at higher speed and with higher accuracy.

[Seventh Embodiment]

Figure 24:
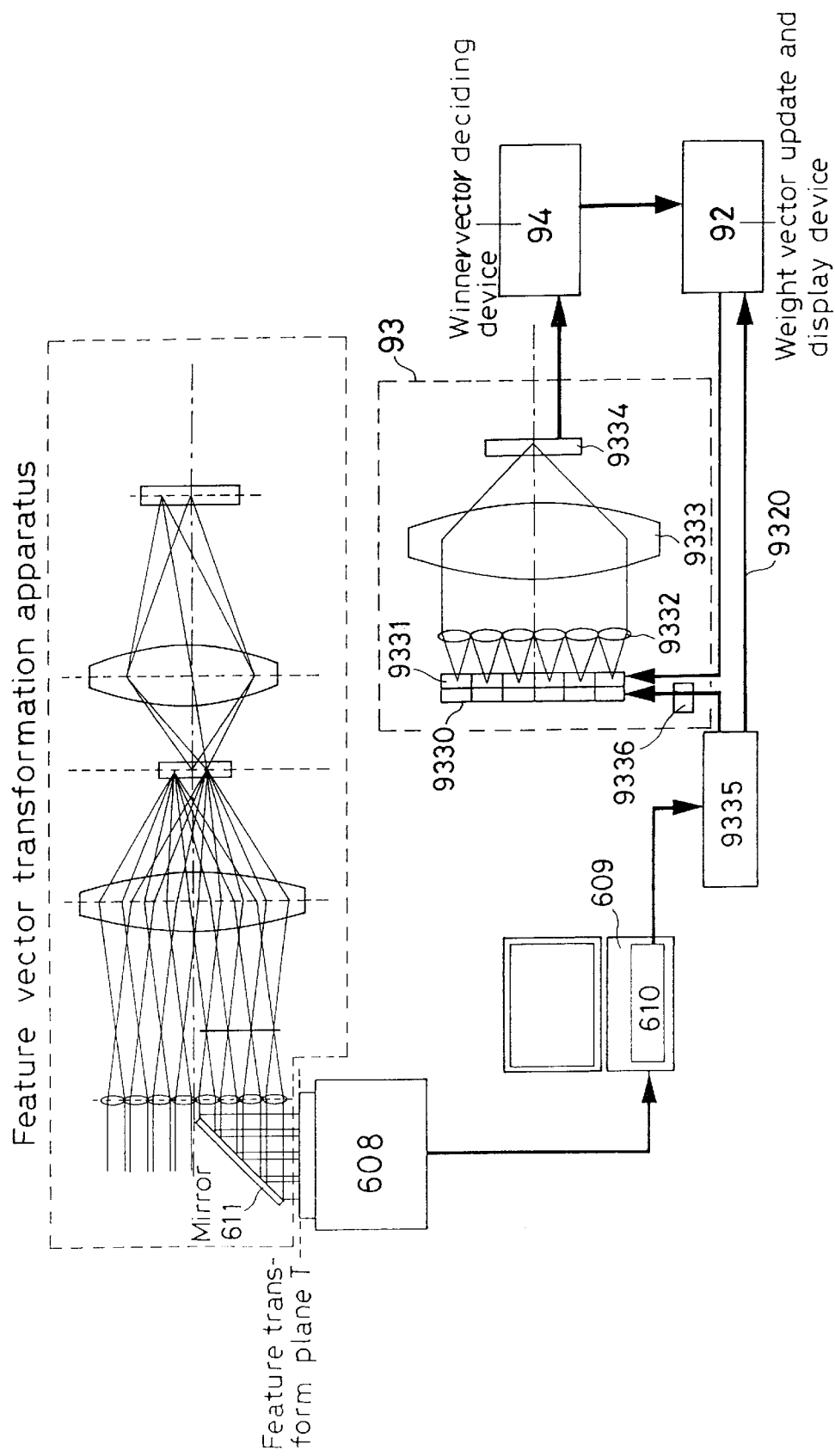
FIG. 24 is a sectional view of a recognition and classification system according to a seventh embodiment of the present invention.

A seventh embodiment will be described with reference to FIG. 24. In this embodiment, the feature vector transformation apparatus according to the third embodiment (FIG. 16) is used. In the feature vector detecting and transmitting apparatus, the feature vector detecting device 6 is formed from a CCD camera serving as an image pickup device 608, and a frame memory 610, which is a memory with an AD converter, for taking data detected by the image pickup device 608 into a computer 609, thereby constructing an arrangement which can be realized most easily in the present state of the art, although it takes a somewhat longer time than in the case of the foregoing embodiments. The recognition and classification device 9 also has a simpler arrangement than those used in the foregoing embodiments.

More specifically, information transformed by the feature vector transformation apparatus is simultaneously detected by a CCD camera 608 disposed in the feature transform plane T. It should be noted that the CCD camera 608 used in this embodiment has a body larger than the detector surface; therefore, if the CCD camera 608 is disposed behind the lens array 403 (FIG. 16), the lens arrays 210' and 403 must be spaced apart from each other, resulting in an increase of the load on the optical system of the feature vector transformation apparatus. Therefore, a mirror 611 is disposed behind the lens array 403 to bend the light beams, and the CCD camera 608 is disposed so as not to interfere with the optical system of the feature vector transformation apparatus, as shown in FIG. 24. Detected information concerning a plurality of feature vectors is transmitted from the CCD camera 608 to the frame memory 610 and stored in the memory 610. The feature vector selecting device 7 selects, for each vector corresponding to one multiplex portion, components in a region to be judged for recognition from the information concerning a plurality of feature vectors stored in the frame memory 610, obtains an average value of the components contained in the region, and stores data concerning the average value in a memory of the computer 609. In this embodiment, the feature vector selecting device 7 is realized by using software on the computer 609. A feature vector concerning components in a region to be judged for recognition, which has been stored in the memory of the computer 609, is taken out similarly by software and transmitted to a driver 9336 for an LED array 9330 of the similarity matching device 93 by an interface 9335 serving as the feature vector transmitting device 8.

In the recognition and classification device 9, the LED array 9330 is caused to emit light by controlling the driver 9336 of the similarity matching device 93 such that the quantity of light emitted is proportional to the feature vector information concerning the region to be judged for recognition, which has been transmitted from the feature vector transmitting device 8, thereby entering the information into the system. The similarity matching device 93 includes an LED array 9330 having the number of two-dimensionally arranged LEDs which is the same as the order (i.e. the number of components) of the feature vector concerning the region to be judged for recognition, which has been transmitted from the feature vector transmitting device 8. The similarity matching device 93 further includes an electrically addressed transmission type liquid-crystal spatial light modulator serving as a mask array 9331 having masks for giving the values of weight vectors $m_{k1}$ as transmittance values, and a lens array 9332 having lens elements disposed in one-to-one correspondence to the masks of the mask array 9331 such that the masks are imaged superimposed on one another in a common image-formation plane. The similarity matching device 93 further includes an image-forming lens 9333 and a photodetector array 9334 disposed in the image-formation plane of the lens 9333. The lens array 9332 and the image-forming lens 9333 are disposed such that the optical axis of each lens element of the lens array 9332 is parallel to the optical axis of the image-forming lens 9333, and that the front focal plane of each lens element of the lens array 9332 is coincident with the mask array 9331, and further that the back focal plane of the image-forming lens 9333 is coincident with the above-described image-formation plane, where the photodetector array 9334 is disposed.

The similarity matching device 93 calculates the inner product between the input vector and the weight vector, as shown in equation (10), as in the case of the foregoing embodiments. The process of calculating the inner product by the above arrangement will be described below with reference to FIG. 25. For explanatory simplicity, let us suppose N=3 and M=2 in equation (10). The optical system may be schematically shown as illustrated in the part (a) of FIG. 25. As shown in the part (b) of FIG. 25, the LED array 9330 has the number of LEDs which is equal to the number of components (3×3) of feature vector $X_{ij}$ ($X_{ij}$; i=1 to 3, and j=1 to 3: the values are all integers) transmitted from the feature vector detecting and transmitting apparatus 22. Each individual LED emits a quantity of light proportional to the value of the corresponding feature vector $X_{ij}$. A light beam emitted from each individual LED illuminates the corresponding mask in the mask array 9331 representing weight vectors $m_{klij}$. As shown in the part (c) of FIG. 25, the mask array 9331 is arranged such that each mask is formed from a vector having components of equal i,j in $m_{klij}$. In other words, the number of components of each mask is 2×2, and the number of masks in the mask array 9331 is 3×3, which is equal to the number of LEDS. Moreover, a region illuminated by each individual LED representing $X_{ij}$ is the region of that mask in the mask array 9331 which represents the same i,j. More specifically, the hatched LED in the part (b) of FIG. 25, which emits light for $X_{11}$, illuminates only the hatched region in the part (c) of FIG. 25 and reads the corresponding mask. The masks read by the respective LEDs corresponding to $X_{ij}$ are imaged superimposed on one another in 2×2 regions on the light-receiving surface of the photodetector array 9334 through the corresponding lens elements of the lens array 9332 and the image-forming lens 9333. For example, on the region of k=1 and l=1, shown in the part (d) of FIG. 25, light beams from the regions of k=1 and l=1 [i.e. the regions enclosed by the thick dashed lines in the part (c) of FIG. 25] are incident. The components $m_{11ij}$ (i=1 to 3, and j=1 to 3: the values are all integers) are read by respective LEDs of equal i,j which emit light bearing information concerning $X_{ij}$. Consequently, the light beams converging on the region of k=1 and l=1 perform the following calculation:

$$y_{ll} = \sum_{i,j} m_{llij} x_{ij} \qquad (i, j = 1, 2, 3)$$

The same is true of all k,l. Thus, it will be understood that the similarity matching device 93 calculates the inner product of the vector matrix expressed by equation (10).

The result of the feature vector inner product operation executed by the similarity matching device 93 is used to perform self-organizing competitive learning through the winner vector deciding device 94 and the weight vector update and display device 92 as in the case of the foregoing embodiments, and recognition and classification are performed in the same way as the above.

With the above arrangement, it is possible according to this embodiment to transmit at high speed feature vectors of high accuracy, which are obtained by the feature vector detecting and transmitting apparatus as described above, to process them in the recognition and classification device, and hence possible to provide a competitive learning type recognition and classification system which serves the purpose of the present invention and is capable of performing recognition and classification at higher speed and with higher accuracy.

Figure 26:
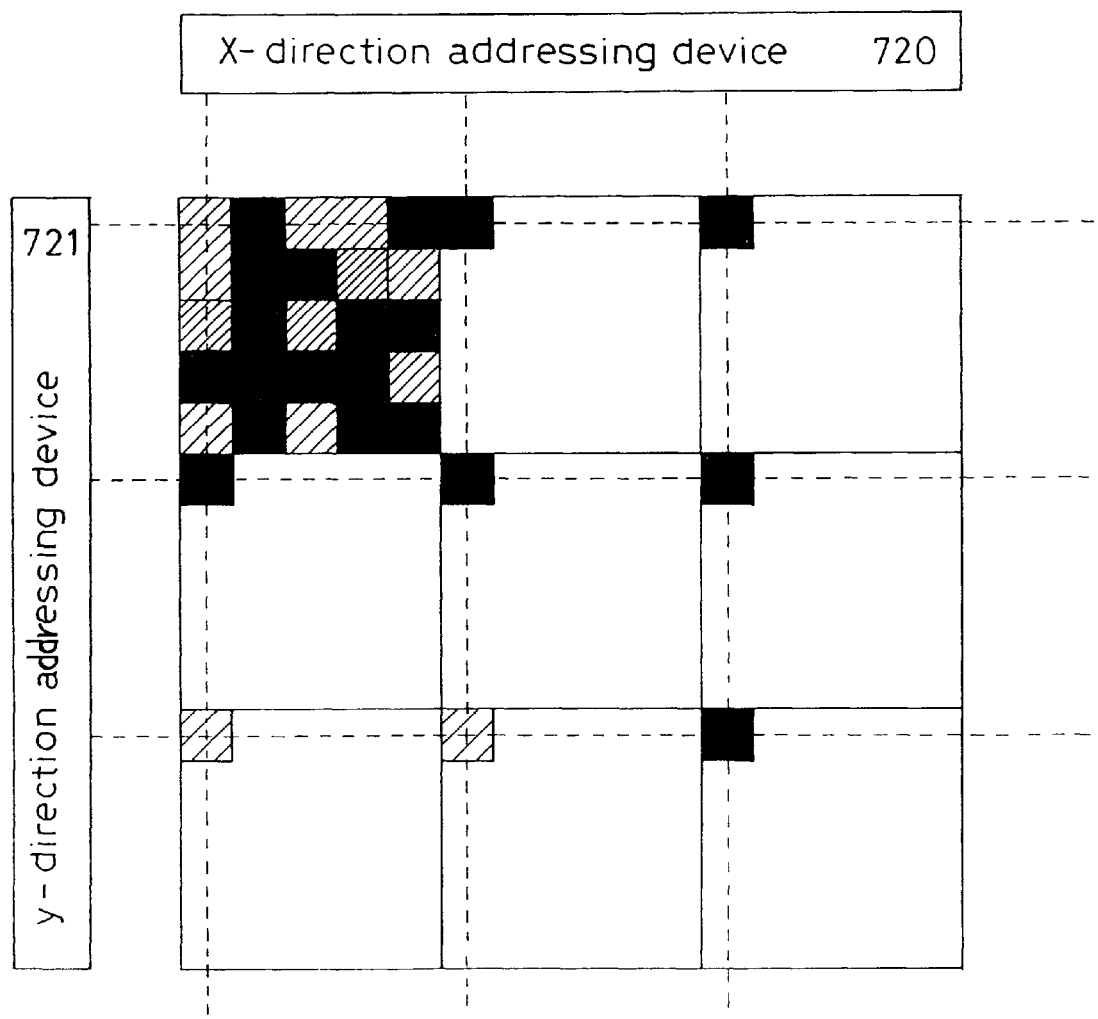
FIG. 26 is a view for describing the arrangement of an image pickup device capable of reading data by addressing.
Figure 27:
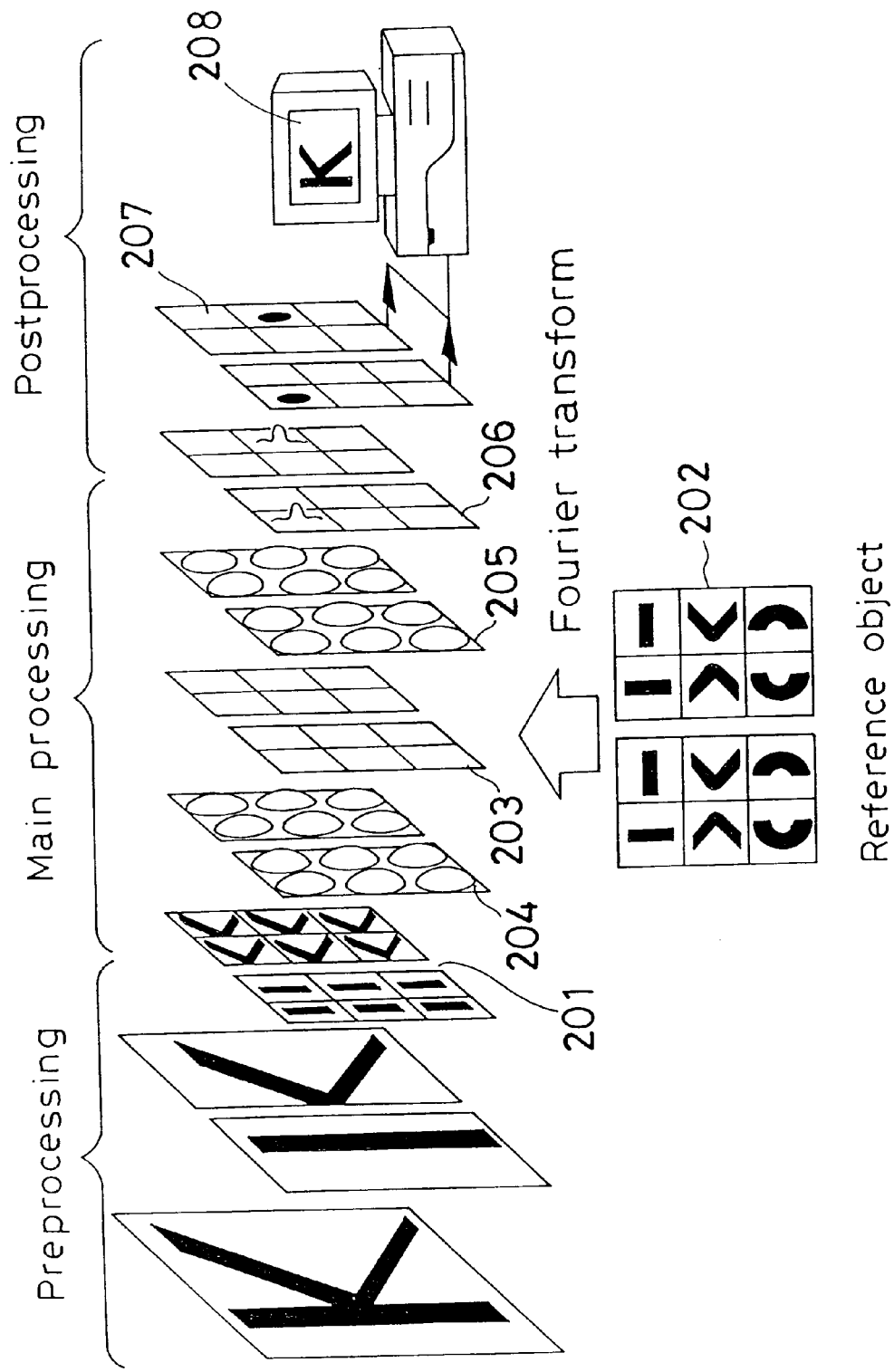
FIG. 27 is a view for describing a first prior art.
Figure 28:
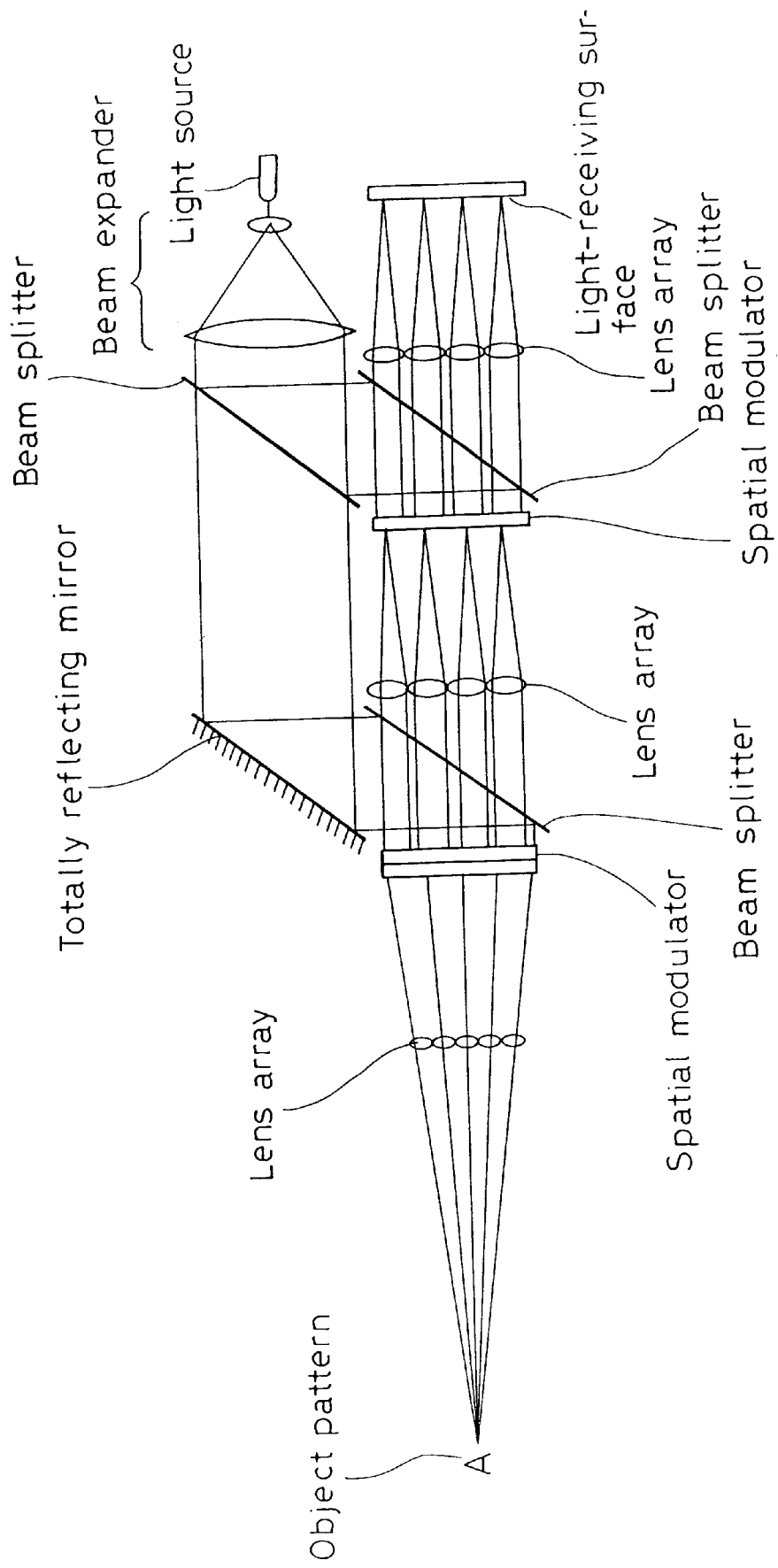
FIG. 28 is a view for describing a second prior art.

It is possible to realize a system capable of operating at higher speed with a simplified arrangement by using a special image pickup device capable of reading image data by addressing desired data in the image captured by the feature vector detecting device 6, as shown in FIG. 26. In this case, it is possible to read a desired data item in the captured image data for each arbitrary image or small region by specifying the necessary address using an x-direction addressing device 720 and a y-direction addressing device 721 and to input the result of the reading to the recognition and classification system 23 in the subsequent stage. The use of this scheme makes it possible to obtain a compact and simple recognition and classification system 23. In the present state of the art, CMD and CMOS type detector arrays are available for use as an image pickup device capable of the above-described reading.

Although the foregoing embodiments use liquid-crystal spatial light modulators, which are readily available, it is also possible to use other types of spatial light modulator, e.g. spatial light modulators made of crystal, which utilize electro-optical effect or magneto-optical effect, or spatial light modulators made of an organic compound.

Although in the feature vector transformation apparatuses used in the foregoing embodiments the input vector is an image, it should be noted that the input vector is not necessarily limited to images, and that the input vector may be data obtained by using a microphone, a density sensor, a flow sensor, or other sensors, or data calculated by a computer. Further, the arrangements of arrays such as filter arrays and lens arrays are not necessarily limited to those in the foregoing embodiments, and that filters and lens elements may be arranged in any desired type of array.

Although in the foregoing embodiments the present invention has mainly been described with regard to recognition and classification systems, it should be noted that the field of application of the multiplexing optical system and feature vector transformation apparatus according to the present invention is not necessarily limited to the field of recognition and classification systems, and that the multiplexing optical system and feature vector transformation apparatus according to the present invention are also applicable to other fields. That is, since the feature vector transformation apparatus according to the present invention has the function of transforming input information into wavelet information (described above) or a kind of multiple resolution information, it can be applied to systems for compressing or encrypting any type of information, e.g. images, signals, and texts, by appropriately transmitting particular information through the feature vector detecting and transmitting apparatus and performing an inner product operation, an EXOR (exclusive OR) operation, etc. in the subsequent similarity matching device using the transmitted information. The multiplexing optical system according to the present invention is also used as an interconnection device in a switching system or a computer by disposing an optical path changing device (e.g. diffraction grating) in the Fourier transform plane, for example, or disposing a switching device (e.g. a shutter array) in the optical path to selectively pass and intercept information.

As will be clear from the foregoing description, it is possible according to the present invention to provide a multiplexing optical system necessary for transforming input information into effective feature vectors at high speed and with high accuracy, without loss of a spatial frequency component of multiplexed object vector information, for example, and a feature vector transformation apparatus using the multiplexing optical system, and further a feature vector detecting and transmitting apparatus for effectively transmitting feature vectors obtained by the feature vector transformation apparatus to a recognition and classification device in the subsequent stage, and also provide a recognition and classification system for recognizing and classifying complicated and large-capacity input information at high speed and with high accuracy for each arbitrary small region consisting of an arbitrary component or a plurality of components.

What we claim is:

1. A multiplexing optical system for performing a Fourier transform in parallel on multiplexed vector information as an object to be processed, said multiplexing optical system including at least:
   a Fourier transform lens for performing a Fourier transform in parallel,
   wherein the following condition is satisfied in an arbitrary cross-section containing an optical axis of said Fourier transform lens:

$$k_R \lambda f_F / a < p$$

where $k_R$ is a number of components of each multiplex portion of the multiplexed vector information; p is a pitch between zero-order portions of Fourier transformed information concerning adjacent multiplex portions obtained in a Fourier transform plane; a is an effective display size of each multiplex portion; $\lambda$ is a wavelength of light used; and $f_F$ is a focal length of said Fourier transform lens.

2. A multiplexing optical system for performing a Fourier transform in parallel on multiplexed vector information as an object to be processed and further performing an inverse Fourier transform in parallel on the Fourier transformed vector information, said multiplexing optical system including at least:
   a lens array for performing an inverse Fourier transform in parallel,
   wherein the following condition is satisfied in an arbitrary cross-section containing an optical axis of said lens array:

$$k_d p_d \leq p_t$$

where $p_t$ is a pitch of said lens array for inverse Fourier transform; $p_d$ is a sampling pitch of transformed information in a feature transform plane where information transformed by said optical system is obtained; and $k_d$ is a number of components of transformed information in the feature transform plane which corresponds to one multiplex portion.

3. A multiplexing optical system for multiplexing vector information as an object to be processed, and performing a Fourier transform in parallel on the multiplexed vector information, and further performing an inverse Fourier transform in parallel on the Fourier transformed vector information, said multiplexing optical system comprising:
   object vector multiplexing means for multiplexing object vector information as an object to be processed by placing the object vector information on parallel beams of light traveling in various directions;
   multiple Fourier transform means consisting essentially of a large-aperture lens for performing a Fourier transform on the multiplexed object vector information in parallel and simultaneously; and
   multiple inverse Fourier transform means consisting essentially of a lens array for performing an inverse Fourier transform in parallel and simultaneously on the object vector information Fourier transformed by said multiple Fourier transform means;
   wherein the following condition is satisfied:

$$(r_F - \alpha_{max}\lambda f_F)/f_F - w_T/f_T \geq 2h/f_F$$

where $f_F$ is a focal length of said large-aperture lens; $r_F$ is an overall effective aperture of said large-aperture lens; $f_T$ is a focal length of each lens element constituting said lens array for inverse Fourier transform; $w_T$ is a width of a light beam emanating from said lens array for inverse Fourier transform in correspondence to each multiplex region and reaching a feature transform plane; h is a distance from an optical axis extending through a center of said large-aperture lens to a center of that lens element in said lens array for inverse Fourier transform which is the farthest from the optical axis; $\alpha_{max}$ is a maximum spatial frequency needed by a filter serving as feature transform means installed in a Fourier transform plane; and $\lambda$ is a wavelength of light used.

4. A multiplexing optical system according to claim 1, wherein the following condition is satisfied:

$$p \geq r_F \geq a + 2\alpha_{max}\lambda f_F$$

where $r_F$ is an effective aperture of said Fourier transform lens, and $\alpha_{max}$ is a maximum spatial frequency needed by a filter serving as feature transform means installed in a Fourier transform plane.

5. A multiplexing optical system according to claim 2, wherein the following condition is satisfied:

$$0.25 \text{ millimeter} \leq k_d p_d \leq p_t.$$

6. A multiplexing optical system according to claim 3, wherein the following condition is satisfied:

$$\alpha_{max}\lambda f_F + w_T/2 \leq r_T/2$$

where $r_T$ is an effective aperture of each lens element constituting said lens array for inverse Fourier transform.

7. A multiplexing optical system according to claim 3, wherein the following condition is satisfied:

$$w_T \geq 0.25 \text{ millimeter}.$$

8. In a feature vector transformation apparatus comprising object vector input and display means for entering vector information into a system as an object to be processed; object vector multiplexing means for multiplexing the entered vector information; multiple Fourier transform means for performing a Fourier transform in parallel on the multiplexed vector information to an extent corresponding to a multiplex level of the multiplexed vector information; multiple inverse Fourier transform means having a lens array consisting essentially of a number of lens elements which corresponds to said multiplex level for performing an inverse Fourier transform in parallel on Fourier transformed images obtained by said multiple Fourier transform means to an extent corresponding to said multiplex level; and feature transform means for performing feature transformation in parallel on the Fourier transformed images obtained by said multiple Fourier transform means, said feature transform means being disposed in a Fourier transform plane, thereby outputting images containing finally transformed features to a feature transform plane, the improvement wherein said multiple Fourier transform means includes a multiplexing optical system, said multiplexing optical system including a Fourier transform lens for performing a Fourier transform in parallel, wherein the following condition is satisfied in an arbitrary cross-section containing an optical axis of said Fourier transform lens:

$$k_R \lambda f_F/a < p$$

where $k_R$ is a number of components of each multiplex portion of the multiplexed vector information; p is a pitch between zero-order portions of Fourier transformed information concerning adjacent multiplex portions obtained in the Fourier transform plane; a is an effective display size of each multiplex portion; $\lambda$ is a wavelength of light used; and $f_F$ is a focal length of said Fourier transform lens.

9. In a feature vector transformation apparatus comprising object vector input and display means for entering vector information into a system as an object to be processed; object vector multiplexing means for multiplexing the entered vector information; multiple Fourier transform means for performing a Fourier transform in parallel on the multiplexed vector information to an extent corresponding to a multiplex level of the multiplexed vector information; multiple inverse Fourier transform means having a lens array consisting essentially of a number of lens elements which corresponds to said multiplex level for performing an inverse Fourier transform in parallel on Fourier transformed images obtained by said multiple Fourier transform means to an extent corresponding to said multiplex level; and feature transform means for performing feature transformation in parallel on the Fourier transformed images obtained by said multiple Fourier transform means, said feature transform means being disposed in a Fourier transform plane, thereby outputting images containing finally transformed features to a feature transform plane, the improvement which includes a multiplexing optical system for performing a Fourier transform in parallel on multiplexed vector information as an object to be processed and further performing an inverse Fourier transform in parallel on the Fourier transformed vector information, said multiplexing optical system including at least:

a lens array for performing an inverse Fourier transform in parallel, wherein the following condition is satisfied in an arbitrary cross-section containing an optical axis of said lens array:

$$k_d p_d \leq p_t$$

where $p_t$ is a pitch of said lens array for inverse Fourier transform; $p_d$ is a sampling pitch of transformed information in the feature transform plane where information transformed by said optical system is obtained; and $k_d$ is a number of components of transformed information in the feature transform plane which corresponds to one multiplex portion.

10. In a feature vector transformation apparatus comprising object vector input and display means for entering vector information into a system as an object to be processed; object vector multiplexing means for multiplexing the entered vector information; multiple Fourier transform means for performing a Fourier transform in parallel on the multiplexed vector information to an extent corresponding to a multiplex level of the multiplexed vector information; multiple inverse Fourier transform means having a lens array consisting essentially of a number of lens elements which corresponds to said multiplex level for performing an inverse Fourier transform in parallel on Fourier transformed images obtained by said multiple Fourier transform means to an extent corresponding to said multiplex level; and feature transform means for performing feature transformation in parallel on the Fourier transformed images obtained by said multiple Fourier transform means, said feature transform means being disposed in a Fourier transform plane, thereby outputting images containing finally transformed features to a feature transform plane, the improvement which includes a multiplexing optical system for multiplexing vector information as an object to be processed, and performing a Fourier transform in parallel on the multiplexed vector information, and further performing an inverse Fourier transform in parallel on the Fourier transformed vector information, said multiplexing optical system comprising:

object vector multiplexing means for multiplexing object vector information as an object to be processed by placing the object vector information on parallel beams of light traveling in various directions;

multiple Fourier transform means consisting essentially of a large-aperture lens for performing a Fourier transform on the multiplexed object vector information in parallel and simultaneously; and multiple inverse Fourier transform means consisting essentially of a lens array for performing an inverse Fourier transform in parallel and simultaneously on the object vector information Fourier transformed by said multiple Fourier transform means;

wherein the following condition is satisfied:

$$(r_F - 2\alpha_{max}\lambda f_F)/f_F - w_T/f_T \geq 2h/f_F$$

where $f_F$ is a focal length of said large-aperture lens; $r_F$ is an overall effective aperture of said large-aperture lens; $f_T$ is a focal length of each lens element constituting said lens array for inverse Fourier transform; $w_T$ is a width of a light beam emanating from said lens array for inverse Fourier transform in correspondence to each multiplex region and reaching the feature transform plane; h is a distance from an optical axis extending through a center of said large-aperture lens to a center of that lens element in said lens array for inverse Fourier transform which is the farthest from the optical axis; $\alpha_{max}$ is a maximum spatial frequency needed by a filter serving as said feature transform means installed in the Fourier transform plane; and $\lambda$ is a wavelength of light used.

11. A feature vector detecting and transmitting apparatus comprising:

feature vector selecting means for taking out, with respect to each individual feature vector obtained by the feature vector transformation apparatus of claim 8, a feature vector of a region arbitrarily selected from each multiplex portion;

feature vector detecting means for acquiring the feature vector obtained by said feature vector transformation apparatus or the feature vector obtained by said feature vector selecting means; and feature vector transmitting means for transmitting data obtained by said feature vector detecting means to a subsequent stage;

wherein information obtained by said feature vector transformation apparatus is transformed into information useful for recognition and classification and transmitted to the subsequent stage for processing.

12. A feature vector detecting and transmitting apparatus comprising:

feature vector selecting means for taking out, with respect to each individual feature vector obtained by the feature vector transformation apparatus of claim 9, a feature vector of a region arbitrarily selected from each multiplex portion;

feature vector detecting means for acquiring the feature vector obtained by said feature vector transformation apparatus or the feature vector obtained by said feature vector selecting means; and feature vector transmitting means for transmitting data obtained by said feature vector detecting means to a subsequent stage;

wherein information obtained by said feature vector transformation apparatus is transformed into information useful for recognition and classification and transmitted to the subsequent stage for processing.

13. A feature vector detecting and transmitting apparatus comprising:

feature vector selecting means for taking out, with respect to each individual feature vector obtained by the feature vector transformation apparatus of claim 10, a feature vector of a region arbitrarily selected from each multiplex portion;

feature vector detecting means for acquiring the feature vector obtained by said feature vector transformation apparatus or the feature vector obtained by said feature vector selecting means; and feature vector transmitting means for transmitting data obtained by said feature vector detecting means to a subsequent stage;

wherein information obtained by said feature vector transformation apparatus is transformed into information useful for recognition and classification and transmitted to the subsequent stage for processing.

14. A recognition and classification system comprising a feature vector transformation apparatus, a feature vector detecting and transmitting apparatus, and recognition and classification means, wherein the apparatus of claim 8 is used as said feature vector transformation apparatus.

15. A recognition and classification system comprising a feature vector transformation apparatus, a feature vector detecting and transmitting apparatus, and recognition and classification means, wherein the apparatus of claim 9 is used as said feature vector transformation apparatus.

16. A recognition and classification system comprising a feature vector transformation apparatus, a feature vector detecting and transmitting apparatus, and recognition and classification means, wherein the apparatus of claim 10 is used as said feature vector transformation apparatus.

17. A recognition and classification system comprising a feature vector transformation apparatus, a feature vector detecting and transmitting apparatus, and recognition and classification means, wherein the apparatus of claim 11 is used as said feature vector detecting and transmitting apparatus.

18. A recognition and classification system comprising a feature vector transformation apparatus, a feature vector detecting and transmitting apparatus, and recognition and classification means, wherein the apparatus of claim 12 is used as said feature vector detecting and transmitting apparatus.

19. A recognition and classification system comprising a feature vector transformation apparatus, a feature vector detecting and transmitting apparatus, and recognition and classification means, wherein the apparatus of claim 13 is used as said feature vector detecting and transmitting apparatus.

20. A feature vector transformation apparatus according to claim 8, wherein the following condition is satisfied:

$$p \geq r_F \geq a + 2\alpha_{max}\lambda f_F$$

where $r_F$ is an effective aperture of said Fourier transform lens, and $\alpha_{max}$ is a maximum spatial frequency needed by a filter serving as said feature transform means installed in the Fourier transform plane.

21. A feature vector detecting and transmitting apparatus according to claim 11, wherein the following condition is satisfied:

$$p \geq r_F \geq a + 2\alpha_{max}\lambda f_F$$

where $r_F$ is an effective aperture of said Fourier transform lens, and $\alpha_{max}$ is a maximum spatial frequency needed by a filter serving as said feature transform means installed in the Fourier transform plane.

22. A recognition and classification system according to claim 14, wherein the following condition is satisfied:

$$p \geq r_F \geq a + 2\alpha_{max}\lambda f_F$$

where $r_F$ is an effective aperture of said Fourier transform lens, and $\alpha_{max}$ is a maximum spatial frequency needed by a filter serving as said feature transform means installed in the Fourier transform plane.

23. A recognition and classification system according to claim 17, wherein the following condition is satisfied:

$$p \geq r_F \geq a + 2\alpha_{max}\lambda f_F$$

where $r_F$ is an effective aperture of said Fourier transform lens, and $\alpha_{max}$ is a maximum spatial frequency needed by a filter serving as said feature transform means installed in the Fourier transform plane.

24. A feature vector transformation apparatus according to claim 9, wherein the following condition is satisfied:

$$0.25 \text{ millimeter} \leq k_d p_d \leq p_r.$$

25. A feature vector detecting and transmitting apparatus according to claim 12, wherein the following condition is satisfied:

$$0.25 \text{ millimeter} \leq k_d p_d \leq p_r.$$

26. A recognition and classification system according to claim 15, wherein the following condition is satisfied:

$$0.25 \text{ millimeter} \leq k_d p_d \leq p_r.$$

27. A recognition and classification system according to claim 18, wherein the following condition is satisfied:

$$0.25 \text{ millimeter} \leq k_d p_d \leq p_r.$$

28. A feature vector transformation apparatus according to claim 10, wherein the following condition is satisfied:

$$\alpha_{max}\lambda f_F + w_T/2 \leq r_T/2$$

where $r_T$ is an effective aperture of each lens element constituting said lens array for inverse Fourier transform.

29. A feature vector detecting and transmitting apparatus according to claim 13, wherein the following condition is satisfied:

$$\alpha_{max}\lambda f_F + w_T/2 \leq r_T/2$$

where $r_T$ is an effective aperture of each lens element constituting said lens array for inverse Fourier transform.

30. A recognition and classification system according to claim 16, wherein the following condition is satisfied:

$$\alpha_{max}\lambda f_F + w_T/2 \leq r_T/2$$

where $r_T$ is an effective aperture of each lens element constituting said lens array for inverse Fourier transform.

31. A recognition and classification system according to claim 19, wherein the following condition is satisfied:

$$\alpha_{max}\lambda f_F + w_T/2 \leq r_T/2$$

where $r_T$ is an effective aperture of each lens element constituting said lens array for inverse Fourier transform.

32. A feature vector transformation apparatus according to claim 10, wherein the following condition is satisfied:

$$w_T \geq 0.25 \text{ millimeter}.$$

33. A feature vector detecting and transmitting apparatus according to claim 13, wherein the following condition is satisfied:

$$w_T \geq 0.25 \text{ millimeter}.$$

34. A recognition and classification system according to claim 16, wherein the following condition is satisfied:

$$w_T \geq 0.25 \text{ millimeter}.$$

35. A recognition and classification system according to claim 19, wherein the following condition is satisfied:

$$w_T \geq 0.25 \text{ millimeter}.$$

* * * * *

UNITED STATES PATENT AND TRADEMARK OFFICE
CERTIFICATE OF CORRECTION

PATENT NO. : 5,963,667
DATED : October 5, 1999
INVENTOR(S) : Takeshi HASHIMOTO; Ikutoshi FUKUSHIMA; Mitsuru NAMIKI It is certified that error appears in the above-identified patent and that said Letters Patent is hereby corrected as shown below:

Column 42, line 51, "$(r_F - \alpha_{max} \lambda f_F) / f_F - w_T/f_T \geq 2h/f_F$"

to

--$(r_F - 2\alpha_{max} \lambda f_F) / f_F - w_T/f_T \geq 2h/f_F$--.

Signed and Sealed this

Thirtieth Day of January, 2001

Q. TODD DICKINSON

Attest:

Attesting Officer

Director of Patents and Trademarks